United States Patent
Kang et al.

(10) Patent No.: US 12,402,189 B2
(45) Date of Patent: *Aug. 26, 2025

(54) APPARATUS AND METHOD FOR COMMUNICATION USING SIDELINK IN WIRELESS COMMUNICATION SYSTEM

(71) Applicant: Samsung Electronics Co., Ltd., Suwon-si (KR)

(72) Inventors: Hyunjeong Kang, Suwon-si (KR); Sangkyu Baek, Suwon-si (KR); Sangyeob Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/410,492

(22) Filed: Jan. 11, 2024

(65) Prior Publication Data

US 2024/0147562 A1 May 2, 2024

Related U.S. Application Data

(63) Continuation of application No. 17/090,708, filed on Nov. 5, 2020, now Pat. No. 11,877,336.

(30) Foreign Application Priority Data

Nov. 8, 2019 (KR) ........................ 10-2019-0142691

(51) Int. Cl.
*H04W 76/27* (2018.01)
*H04W 28/02* (2009.01)
(Continued)

(52) U.S. Cl.
CPC ....... *H04W 76/18* (2018.02); *H04W 28/0268* (2013.01); *H04W 76/27* (2018.02); *H04W 80/02* (2013.01); *H04W 92/18* (2013.01)

(58) Field of Classification Search
CPC . H04W 76/18; H04W 28/0268; H04W 76/27; H04W 80/02; H04W 92/18;
(Continued)

(56) References Cited

U.S. PATENT DOCUMENTS

2017/0048643 A1 2/2017 Lee et al.
2017/0064693 A1 3/2017 Kim et al.
(Continued)

FOREIGN PATENT DOCUMENTS

CN 107926069 A 4/2018
CN 110225547 A 9/2019
(Continued)

OTHER PUBLICATIONS

Spectrum (Discussion on SLRB configuration alignment, R2-1912231, Oct. 2019).*

(Continued)

*Primary Examiner* — Lakeram Jangbahadur

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure is to configure configuration parameter information of a sidelink radio bearer in a wireless communication system. An operation of a terminal may include: determining whether there is a need of an SLRB configuration; obtaining the SLRB configuration; performing sidelink data transmission or reception by using the SLRB configuration; determining whether there is a colli- (Continued)

sion of the SLRB configuration; and performing a procedure of adjusting the collision of the SLRB configuration.

18 Claims, 30 Drawing Sheets

(51) Int. Cl.
*H04W 76/18* (2018.01)
*H04W 80/02* (2009.01)
*H04W 92/18* (2009.01)

(58) Field of Classification Search
CPC ... H04W 76/14; H04W 4/46; H04W 28/0252; H04W 76/11
See application file for complete search history.

(56) References Cited

U.S. PATENT DOCUMENTS

| | | | |
|---|---|---|---|
| 2017/0181206 A1 | 6/2017 | Lee et al. | |
| 2020/0252989 A1* | 8/2020 | Chen | H04W 76/19 |
| 2020/0351699 A1 | 11/2020 | Pan et al. | |
| 2020/0359428 A1 | 11/2020 | Pan et al. | |
| 2020/0413467 A1* | 12/2020 | Pan | H04W 72/04 |
| 2022/0272778 A1 | 8/2022 | Zhao et al. | |

FOREIGN PATENT DOCUMENTS

| | | | |
|---|---|---|---|
| CN | 110366140 A | 10/2019 | |
| CN | 111918401 A | 11/2020 | |
| CN | 112351458 A | 2/2021 | |
| EP | 3737198 A1 | 11/2020 | |
| EP | 4013110 A1 | 6/2022 | |
| WO | 2015163624 A1 | 10/2015 | |
| WO | 2018084199 A1 | 5/2018 | |
| WO | 2019061180 A1 | 4/2019 | |
| WO | WO-2020068991 A1 * | 4/2020 | H04W 4/40 |
| WO | 2021147780 A1 | 7/2021 | |

OTHER PUBLICATIONS

Huawei et al. (Remaining issues on SLRB configuration, R2-1913712, Oct. 2019).*
OPPO (Summary of [105bis#32] PC5-RRC signalling, May 2019).*
Huawei et al., "Remaining issues on SLRB configuration," R2-1913712, 3GPP TSG-RAN WG2 Meeting #107 bis, Oct. 14-18, 2019, 12 pages.
OPPO, "Left issues on PC5-RRC based AS layer configuration procedure," R2-1912073, 3GPP TSG-RAN WG2 Meeting #107bis, Oct. 14-18, 2019, 6 pages.
Spreadtrum Communications, "Discussion on SLRB configuration alignment," R2-1912231, 3GPP TSG-RAN WG2 #107bis, Oct. 14-18, 2019, 3 pages.
OPPO (rapporteur), "Summary of [105bis#32] PC5-RRC signalling," R2-1905585, 3GPP TSG-RAN WG2 Meeting #106, May 13-17, 2019, 24 pages.
InterDigital Inc., "AS-Level Link Management for NR V2X," R2-1904221, 3GPP RAN WG2 Meeting #105bis, Apr. 8-12, 2019, 4 pages.
International Search Report dated Jan. 26, 2021 in connection with International Application No. PCT/KR2020/015250, 2 pages.
Written Opinion of the International Searching Authority dated Jan. 26, 2021 in connection with International Patent Application No. PCT/KR2020/015250, 4 pages.
Ericsson, "Discussion on SL RLC AM support," TDoc R2-1910298, 3GPP TSG-RAN WG2 #107, Aug. 26-30, 2019, 4 pages.
Ericsson, "On the sidelink QoS flow and radio bearer," R2-1907364, 3GPP TSG-RAN WG2 #106, May 13-17, 2019, 5 pages.
CATT, "Open Issues for the Bi-directional SLRB," R2-1914450, 3GPP TSG-RAN WG2 Meeting #108, Nov. 18-22, 2019, 6 pages.
Supplementary European Search Report dated Oct. 6, 2022 in connection with European Patent Application No. 20 88 5672, 16 pages.
Li-Te Pan, et al., "Method and Apparatus for Requesting SLRB Configuration of Unicast Transmission in a Wireless Communication System," U.S. Appl. No. 62/842,179, filed May 2, 2019, 8 pages.
Notification of the First Office Action dated Apr. 25, 2024, in connection with Chinese Patent Application No. 202080063256.0, 21 pages.
Decision of Rejection issued Dec. 27, 2024, in connection with Chinese Patent Application No. 202080063256.0, 15 pages.
Office Action issued Jan. 9, 2025, in connection with Korean Patent Application No. 10-2019-0142691, 9 pages.
Communication pursuant to Article 94(3) EPC dated Nov. 25, 2024, in connection with European Application No. 20885672.4, 7 pages.
Examination report dated Oct. 18, 2024, in connection with Indian Application No. 202217022342, 5 pages.
Notification of the Second Office Action dated Sep. 29, 2024, in connection with Chinese Application No. 202080063256.0, 13 pages.
Communication pursuant to Article 94(3) EPC dated Apr. 2, 2025, in connection to European Application No. 20885672.4, 8 pages.

* cited by examiner

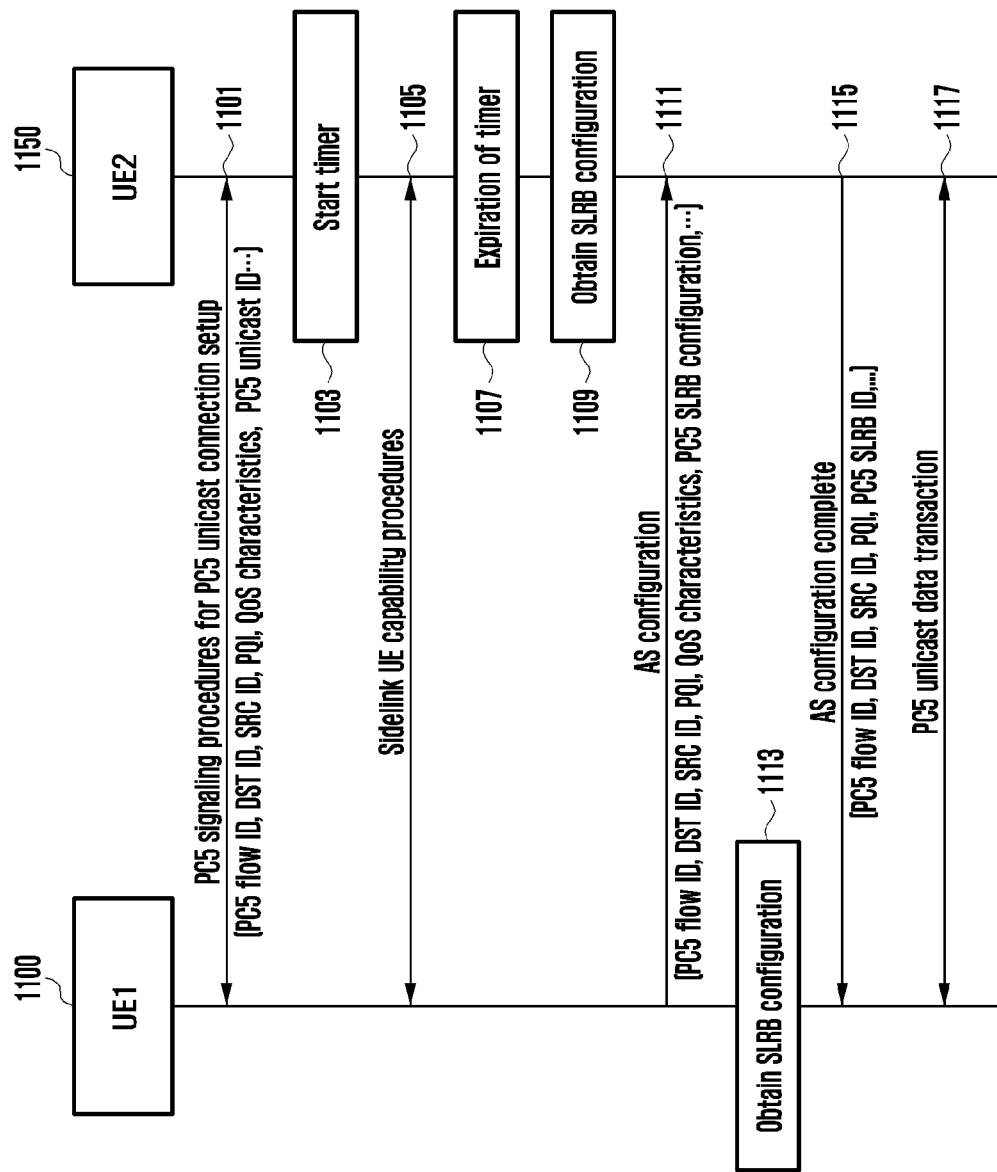

APPARATUS AND METHOD FOR COMMUNICATION USING SIDELINK IN WIRELESS COMMUNICATION SYSTEM

CROSS-REFERENCE TO RELATED APPLICATION

This application is a continuation of application Ser. No. 17/090,708, filed Nov. 5, 2020, now U.S. Pat. No. 11,877,336, which is based on and claims priority under 35 U.S.C. 119 to Korean Patent Application No. 10-2019-0142691, filed on Nov. 8, 2019, in the Korean Intellectual Property Office, the disclosure of which is herein incorporated by reference in its entirety.

BACKGROUND

1. Field

The disclosure relates to a method and an apparatus for a communication using sidelink in a wireless communication system. The disclosure relates, more specifically, to an apparatus and a method for processing sidelink radio bearer configuration information in a wireless communication system. Also, the disclosure relates to a method and an apparatus for configuring sidelink radio bearer information in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (millimeter Wave or "mmWave") bands, e.g., 60 giga-Hertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Furthermore, terminal-to-terminal direct communication (sidelink communication) using a 5G communication system has been studied. The terminal-to-terminal direct communication is expected to be applied to, for example, vehicle communication (vehicle-to-everything, hereinafter, "V2X") and provide various services to a user.

The above information is presented as background information only to assist with an understanding of the disclosure. No determination has been made, and no assertion is made, as to whether any of the above might be applicable as prior art with regard to the disclosure.

SUMMARY

In accordance with the above discussion, the disclosure provides an apparatus and a method for processing sidelink configuration information in a wireless communication system.

In addition, the disclosure provides an apparatus and a method for configuring radio bearer configuration information between terminals performing transmission or reception, based on sidelink unicast, sidelink groupcast, and sidelink broadcast in a wireless communication system.

According to various embodiments, an operation method of a terminal in a wireless communication system may include: determining whether there is a need to obtain a sidelink radio bearer (SLRB) configuration; obtaining the SLRB configuration from a network (NW) or a system; and performing sidelink data transmission or reception with an opposite terminal of a sidelink unicast by using the obtained SLRB configuration.

In addition, the operation method of the terminal according to various embodiments may include: determining whether there is a collision between SLRB configurations; and if it is determined that there is a collision between the SLRB configurations, determining failure of a sidelink unicast configuration procedure.

In addition, the operation method of the terminal according to various embodiments may include: determining whether there is a collision between SLRB configurations; determining whether there is a need to adjust a collided configuration parameter; and performing a configuration parameter adjustment procedure.

In addition, the operation method of the terminal according to various embodiments may include: if it is determined that there is a need to adjust the SLRB configuration, reporting the need to the NW; and identifying a configuration parameter of the NW.

In addition, a terminal in a wireless communication system according to various embodiments includes: a transceiver; and at least one processor connected to the transceiver. The at least one processor may: determine whether there is a need to obtain an SLRB configuration; obtain the SLRB configuration; transmit or receive sidelink data by using the SLRB configuration; determine whether there is a need to adjust an SLRB configuration parameter; and perform a procedure of adjusting the SLRB configuration parameter.

In addition, according to an embodiment of the disclosure, a method performed by a first terminal is provided. The method comprises receiving, from a second terminal, a first message including a sidelink radio bearer (SLRB) configuration, identifying a failure of an access stratum (AS) configuration based on the SLRB configuration and transmitting, to the second terminal, a second message including information indicating the failure of the AS configuration, in case that the failure of the AS configuration is identified.

In addition, according to an embodiment of the disclosure, a method performed by a second terminal is provided. The method comprises transmitting, to a first terminal, a first message including a sidelink radio bearer (SLRB) configuration, receiving, from the first terminal, a second message as a response to the second message, and identifying a failure of an access stratum (AS) configuration based on the SLRB configuration in case that information indicating the failure of the AS configuration is included in the second message.

Through an apparatus and a method according to various embodiments, the problem of terminal operation errors caused by a mismatch in configuration information between terminals performing direct communication, and the problem of service quality degradation caused by service interruption can be effectively resolved.

Effects which can be acquired by the disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 11 illustrates a method of SLRB configuration coordination determined and decided by a terminal itself according to various embodiments;

DETAILED DESCRIPTION

Figure 1:
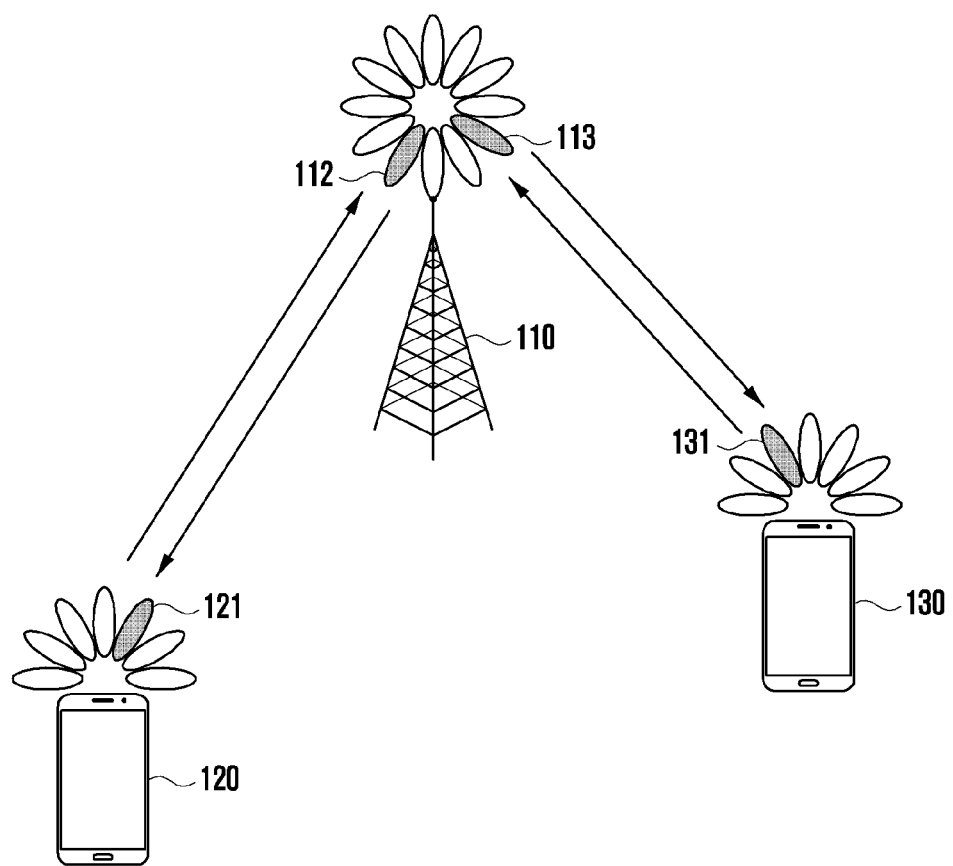
FIG. 1 illustrates a wireless communication system according to various embodiments.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for processing sidelink configuration information in a wireless communication system. Specifically, the disclosure is to configure a bi-directional radio bearer or a uni-directional radio bearer in sidelink communication between a terminal and a terminal, and the disclosure relates to an apparatus and a method wherein a piece of configuration information, which is required to be matched between the two terminals, among pieces of configuration information of a radio bearer between the terminals may be processed.

In the disclosure, sidelink configuration information may be, for example, configuration information of a sidelink radio bearer, and may include configuration information for processing at least one of a signaling radio bearer and a data radio bearer. Specifically, the configuration information may include at least one of PDCP layer configuration information, RLC layer configuration information, MAC layer configuration information, and physical layer configuration information of a signaling radio bearer with which sidelink RRC signaling or sidelink PC5-S signaling is transmitted. The configuration information may include at least one of SDAP layer configuration information, PDCP layer configuration information, RLC layer configuration information, MAC layer configuration information, and physical layer configuration information of a data radio bearer with which sidelink user data is transmitted.

In the following description, a term indicating a signal, a term indicating a channel, a term indicating control information, terms indicating network entities, terms indicating elements of a device, and the like are exemplified for convenience of explanation. Accordingly, the disclosure is not limited to the following terms and other terms having the same technical meaning may be used.

In the following description, a physical channel and a signal may be used together with data or a control signal. For example, a physical downlink shared channel (PDSCH) is a term indicating a physical channel through which data is transmitted, but a PDSCH may be also used to indicate data. That is, in the disclosure, the expression "transmit a physical channel" may be interpreted equivalent to the expression "transmit data or a signal through a physical channel".

Hereinafter, in the disclosure, higher signaling means a signal transfer method by which a signal is transferred to a terminal by a base station by using a physical layer downlink data channel, or a signal is transferred to a base station by a terminal by using a physical layer uplink data channel. Higher signaling may be interpreted as radio resource control (RRC) signaling or a media access control (MAC) control element (CE).

In addition, in the disclosure, although the expression "more than" or "less than" is used in order to determine whether or not a particular condition is fulfilled or satisfied, this is only an example and does not exclude the expression "equal to or more than" or "equal to or less than". The expression "equal to or more than" can be replaced with "more than", the expression "equal to or less than" can be replaced with "less than", and the expression "equal to or more than and less than" can be replaced with "more than and equal to or less than" under the conditions above.

In addition, the disclosure includes terms used in some communication protocols (e.g. 3rd generation partnership project (3GPP)) to explain various embodiments, but the terms merely correspond to examples. Various embodiments may also be easily modified and then applied to other communication systems.

FIG. 1 illustrates a wireless communication system according to various embodiments.

FIG. 1 illustrates a base station 110, a terminal 120, and a terminal 130 as a part of nodes using wireless channels in a wireless communication system. Although, FIG. 1 illustrates only one base station, another base station identical to or similar to the base station 110 may be further included.

The base station 110 is a network infrastructure that provides wireless connection to the terminals 120 and 130. The base station 110 has a coverage defined as a particular geographic area based on a distance by which the base station can transmit a signal. The base station 110 may be called "an access point (AP)", "an eNodeB (eNB)", "a 5th generation node", "an gNodeB (a next generation node B; gNB)", "a wireless point", "a transmission/reception point (TRP)" or other terms having a technical meaning equivalent thereto.

Each of the terminals 120 and 130 is a device used by a user and communicates with the base station 110 through wireless channels. A link oriented from the base station 110 to the terminal 120 or 130 is referred to as a downlink (DL), and a link oriented from the terminal 120 or 130 to the base station 110 is referred to as an uplink (UL). In addition, the terminals 120 and 130 may perform communication with each other through a wireless channel. The link between the terminals 120 and 130 is called a sidelink, and a sidelink may be used together with a PC5 interface. In some cases, at least one of the terminals 120 and 130 may be operated without involvement of a user. That is, at least one of the terminals 120 and 130 is a device configured to perform machine-type communication (MTC) and may not be carried by a user. Each of the terminals 120 and 130 may be called "a user equipment (UE)", "a mobile station", "a subscriber station", "a remote terminal", "a wireless terminal", "a user device", or another term having a technical meaning equivalent thereto.

The base station 110 and the terminals 120 and 130 may transmit and receive a wireless signal in millimeter wave (mmWave) bands (e.g. 28 GHz, 30 GHz, 38 GHz, and 60 GHz). To improve a channel gain, the base station 110 and the terminals 120 and 130 may perform beamforming. Beamforming may include transmission beamforming and reception beamforming. That is, the base station 110 and the terminals 120 and 130 may give directivity to a transmission signal or a reception signal. To this end, the base station 110 and the terminals 120 and 130 may select serving beams 112, 113, 121, and 131 through a beam search procedure or a beam management procedure. Communication after the serving beams 112, 113, 121, and 131 are selected may be performed through resources having a quasi-co-located (QCL) relationship with resources used for transmission of the serving beams 112, 113, 121, and 131.

If large-scale characteristics of a channel having transferred a symbol on a first antenna port can be inferred from a channel having transferred a symbol on a second antenna port, the first antenna port and the second antenna port may be considered to have a QCL relationship therebetween. For example, the large-scale characteristics may include at least one of delay spread, Doppler spread, Doppler shift, average gain, average delay, and spatial receiver parameter.

The terminals 120 and 130 illustrated in FIG. 1 may support vehicle communication. In a case of vehicle communication, a standardization work for V2X technology has been completed in 3GPP release 14 and 15, based on a device-to-device (D2D) communication structure in an LTE system. Currently, work is being done in developing V2X technology, based on 5G NR. NR V2X will support terminal-to-terminal unicast communication, groupcast (or multicast) communication, and broadcast communication. In addition, unlike LTE V2X aiming to transmit and receive basic safety information required for road driving of a vehicle, NR V2X aims to provide further-evolved services such as platooning, advanced driving, sensing by an extended sensor, and remote driving.

A V2X service may be divided into a basic safety service and an advanced service. The basic safety service may include a detailed service such as a car notification (cooperative awareness messages (CAMs) or basic safety messages (BSMs)) service, a left-turn notification service, a front-car collision warning service, an emergency car access notification service, a front obstacle warning service, and an intersection traffic light information service. V2X information may be transmitted or received using a broadcast, unicast, or groupcast transmission scheme. The advanced service not only has enhanced quality of service (QoS) requirements compared to the basic safety service, but also requires a method for transmitting or receiving V2X information by using unicast and groupcast transmission schemes rather than a broadcast transmission scheme, so as to allow V2X information to be transmitted or received in a particular vehicle group or between two vehicles. The advanced service may include a detailed service such as a platooning service, a self-driving service, a remote driving service, and an extended sensor-based V2X service.

Hereinafter, a sidelink (SL) indicates a signal transmission/reception path between terminals, and may be used together with a PC5 interface. Hereinafter, a base station is a subject performing terminal resource allocation, and may support both V2X communication and general cellular communication, or only V2X communication. That is, a base station may imply an NR base station (e.g. gNB), an LTE base station (e.g. eNB), or a road site unit (RSU). A terminal may include not only a general user equipment and a mobile station but also all of a vehicle supporting vehicular-to-vehicular (V2V) communication, a vehicle or a pedestrian's handset (e.g. smartphone) supporting vehicular-to-pedestrian (V2P) communication, a vehicle supporting vehicular-to-network (V2N) communication, or a vehicle supporting communication between a vehicle and a transportation infrastructure (vehicular-to-infrastructure (V2I) communication), and an RSU equipped with a terminal function, an RSU equipped with a base station function, or an RSU equipped with a part of a base station function and a part of a terminal function. In addition, a V2X terminal used in the following description may be referred to as a terminal. That is, a terminal may be used as a V2X terminal in relation to V2X communication.

A base station and a terminal are connected to each other through a Uu interface. An uplink (UL) may imply a wireless link through which a terminal transmits data or a control signal to a base station, and a downlink (DL) may imply a wireless link through which a base station transmits data or a control signal to a terminal.

Figure 2:
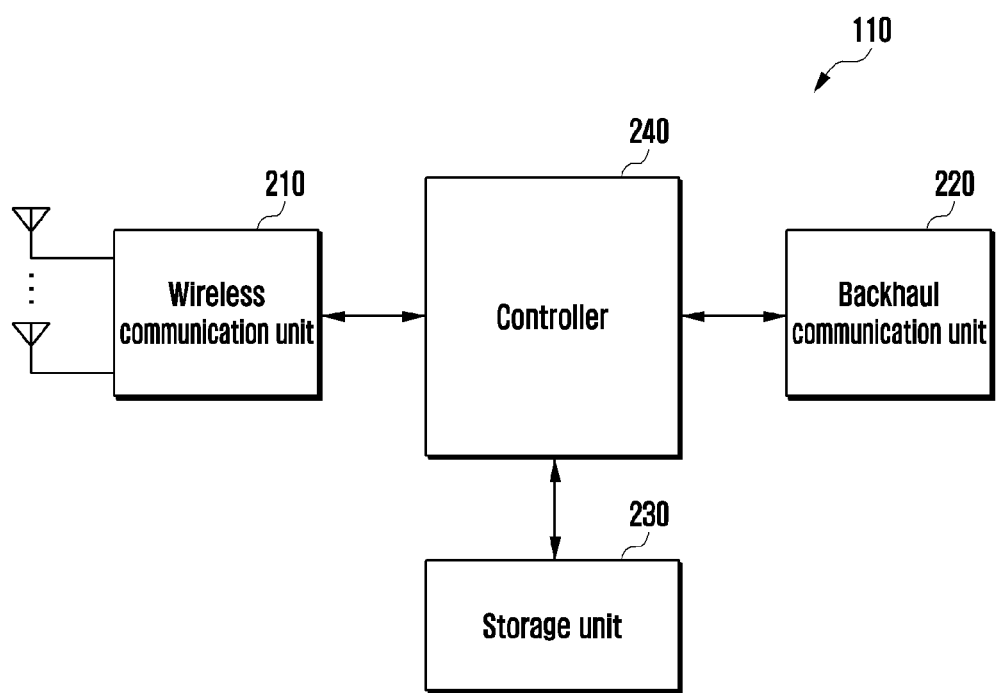
FIG. 2 illustrates a configuration of a base station in a wireless communication system according to various embodiments.

FIG. 2 illustrates a configuration of a base station in a wireless communication system according to various embodiments. The configuration illustrated in FIG. 2 may be understood as a configuration of the base station 110. The term " . . . unit" or the ending of a word, such as " . . . or", " . . . er", or the like used hereinafter may indicate a unit of processing at least one function or operation, and this may be embodied by hardware, software, or a combination of hardware and software.

Referring to FIG. 2, the base station 110 includes a wireless communication unit 210, a backhaul communication unit 220, a storage unit 230, and a controller 240.

The wireless communication unit 210 performs functions for transmitting or receiving a signal through a wireless channel. For example, the wireless communication unit 210 performs a function of conversion between a baseband signal and a bit stream according to a physical layer protocol of the system. For example, when data is transmitted, the wireless communication unit 210 generates complex symbols by encoding and modulating a transmission bit stream. Furthermore, when data is received, the wireless communication unit 210 reconstructs a reception bit stream by demodulating and decoding a baseband signal.

Furthermore, the wireless communication unit 210 up-converts a baseband signal into a radio-frequency (RF) band signal and then transmits the converted RF band signal through an antenna, and down-converts an RF band signal received through an antenna into a baseband signal. To this end, the wireless communication unit 210 may include a transmission filter, a reception filter, an amplifier, a mixer, an oscillator, a digital-to-analog converter (DAC), an analog-to-digital converter (ADC), and the like. In addition, the wireless communication unit 210 may include a plurality of transmission/reception paths. Furthermore, the wireless communication unit 210 may include at least one antenna array configured by multiple antenna elements.

In view of hardware, the wireless communication unit 210 may be configured by a digital unit and an analog unit, and the analog unit may include a plurality of sub-units according to operating power, operating frequency, etc. The digital unit may be implemented as at least one processor (e.g. a digital signal processor (DSP)).

The wireless communication unit 210 transmits and receives a signal as described above. Accordingly, the entirety or a part of the wireless communication unit 210 may be called "a transmitter", "a receiver", or "a transceiver". Furthermore, in the following description, transmission and reception through a wireless channel may be understood to include the aforementioned processing of the wireless communication unit 210.

The backhaul communication unit 220 provides an interface for performing communication with other nodes within a network. That is, the backhaul communication unit 220 converts, into a physical signal, a bit stream transmitted from the base station 110 to another node, for example, another access node, another base station, a higher node, a core network, etc., and converts a physical signal received from another node into a bit stream.

The storage unit 230 stores data such as a basic program, an application program, and configuration information for the operation of the base station 110. The storage unit 230 may be configured as a volatile memory, a nonvolatile memory, or a combination of a volatile memory and a nonvolatile memory. The storage unit 230 provides stored data in response to a request of the controller 240.

The controller 240 controls overall operations of the base station 110. For example, the controller 240 transmits and receives a signal through the wireless communication unit 210 or the backhaul communication unit 220. Further, the controller 240 records and reads data in and from the storage unit 230. In addition, the controller 240 may perform functions of a protocol stack required in a communication protocol. According to another embodiment, a protocol stack may be included in the wireless communication unit 210. To this end, the controller 240 may include at least one processor. According to various embodiments, the controller 240 may control the base station 110 to perform operations according to various embodiments described later.

Figure 3:
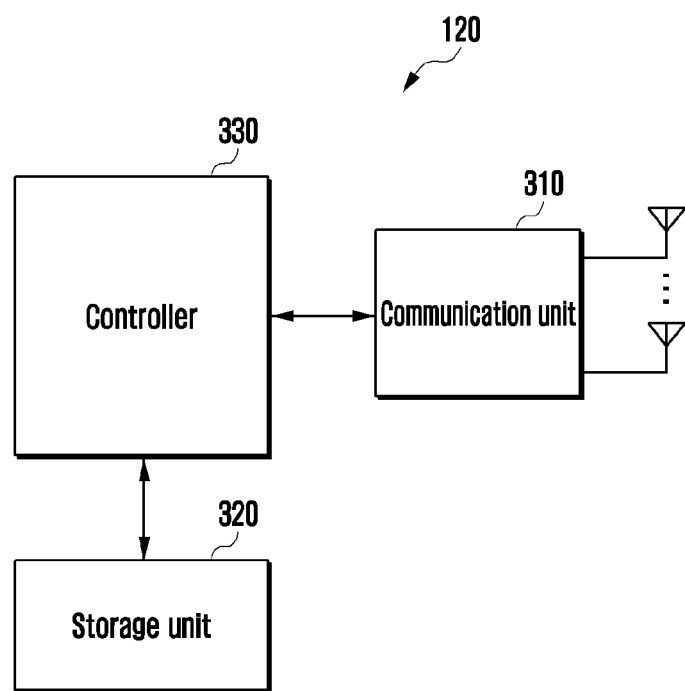
FIG. 3 illustrates a configuration of a terminal in a wireless communication system according to various embodiments.

FIG. 3 illustrates a configuration of a terminal in a wireless communication system according to various embodiments.

The configuration illustrated in FIG. 3 may be understood as a configuration of the terminal 120. The term " . . . unit" or the ending of a word, such as " . . . or", " . . . er", or the like used hereinafter may indicate a unit of processing at least one function or operation, and this may be embodied by hardware, software, or a combination of hardware and software.

Referring to FIG. 3, the terminal 120 includes a communication unit 310, a storage unit 320, and a controller 330.

The communication unit 310 performs functions for transmitting or receiving a signal through a wireless channel. For example, the communication unit 310 performs a function of conversion between a baseband signal and a bit stream according to a physical layer protocol of the system. For example, when data is transmitted, the communication unit 310 generates complex symbols by encoding and modulating a transmission bit stream. Furthermore, when data is received, the communication unit 310 reconstructs a reception bit stream by demodulating and decoding a baseband signal. Furthermore, the communication unit 310 up-converts a baseband signal into an RF band signal and then transmits the converted RF band signal through an antenna, and down-converts an RF band signal received through an antenna into a baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. Furthermore, the communication unit 310 may include at least one antenna array including a plurality of antenna elements. In view of hardware, the communication unit 310 may be configured by a digital circuit and an analog circuit (e.g. radio-frequency integrated circuit (RFIC)). The digital circuit and the analog circuit may be implemented as a single package. In addition, the communication unit 310 may include a plurality of RF chains. Moreover, the communication unit 310 may perform beamforming.

The communication unit 310 transmits and receives a signal as described above. Accordingly, the entirety or a part of the communication unit 310 may be called "a transmitter", "a receiver", or "a transceiver". In addition, in the following description, transmission and reception through a wireless channel may be understood to include the processing performed by the communication unit 310, as described above.

The storage unit 320 stores data such as a basic program, an application program, and configuration information for the operation of the terminal 120. The storage unit 320 may be configured as a volatile memory, a nonvolatile memory, or a combination of a volatile memory and a nonvolatile memory. The storage unit 320 provides stored data in response to a request of the controller 330.

The controller 330 controls overall operations of the terminal 120. For example, the controller 330 transmits and receives a signal through the communication unit 310. In addition, the controller 330 records and reads data in and from the storage unit 320. Moreover, the controller 330 may perform functions of a protocol stack required in a communication protocol. To this end, the controller 330 may include at least one processor or microprocessor, or may be a part of a processor. In addition, the controller 330 and a part of the communication unit 310 may be called a communication processor (CP). According to various embodiments, the controller 330 may control the terminal 120 to perform operations according to various embodiments described later.

According to various embodiments of the disclosure, the controller 330 is configured to a controller configured to receive, from a second terminal via the transceiver, a first message including sidelink radio bearer (SLRB) configuration, to identify a failure of an access stratum (AS) configuration based on the SLRB configuration, and to transmit, to the second terminal via the transceiver, a second message including information indicating the failure of the AS configuration, in case that the failure of the AS configuration is identified.

The SLRB configuration includes at least one of a radio link control (RLC) mode or a logical channel identity associated with the RLC mode, and the failure of the AS configuration is identified based on the RLC mode. Also, the failure of the AS configuration is identified based on the SLRB configuration received from the second terminal and another SLRB configuration received from a base station.

The controller 330 is configured to transmit, to a base station via the transceiver, sidelink terminal information including at least one information included in the SLRB configuration as a response to the first message, and to receive, from the base station via the transceiver, a radio resource control (RRC) reconfiguration message including new SLRB configuration associated with the SLRB configuration. Also, the sidelink terminal information includes an RLC mode or parameters associated with the RLC mode, the RLC mode and the parameters associated with the RLC mode being included in the SLRB configuration, and a third message indicating the application of the SLRB configuration is transmitted to the second terminal, in case that the failure of the AS configuration is not identified based on the RRC reconfiguration.

According to various embodiments of the disclosure, the controller 330 is configured to transmit, to a first terminal via the transceiver, a first message including a sidelink radio bearer (SLRB) configuration, to receive, from the first terminal via the transceiver, a second message as a response to the second message, and to identify a failure of an access stratum (AS) configuration based on the SLRB configuration in case that information indicating the failure of the AS configuration is included in the second message. Also, the SLRB configuration includes at least one of a radio link control (RLC) mode or a logical channel identity associated with the RLC mode, and wherein the failure of the AS configuration is identified based on the RLC mode.

The controller 330 is configured to transmit, to a base station via the transceiver, sidelink terminal information including the information indicating the failure of the AS configuration, in case that the failure of the AS configuration is identified. The sidelink terminal information further includes a sidelink destination identity associated with the failure of the AS configuration. Also, a timer is started as a response to a transmission of the first message, the timer is stopped as a response to a reception of the second message, and wherein a procedure for the AS configuration associated with the first terminal is stopped in case that the information indicating the failure of the AS configuration is included in the second message.

Figure 4:
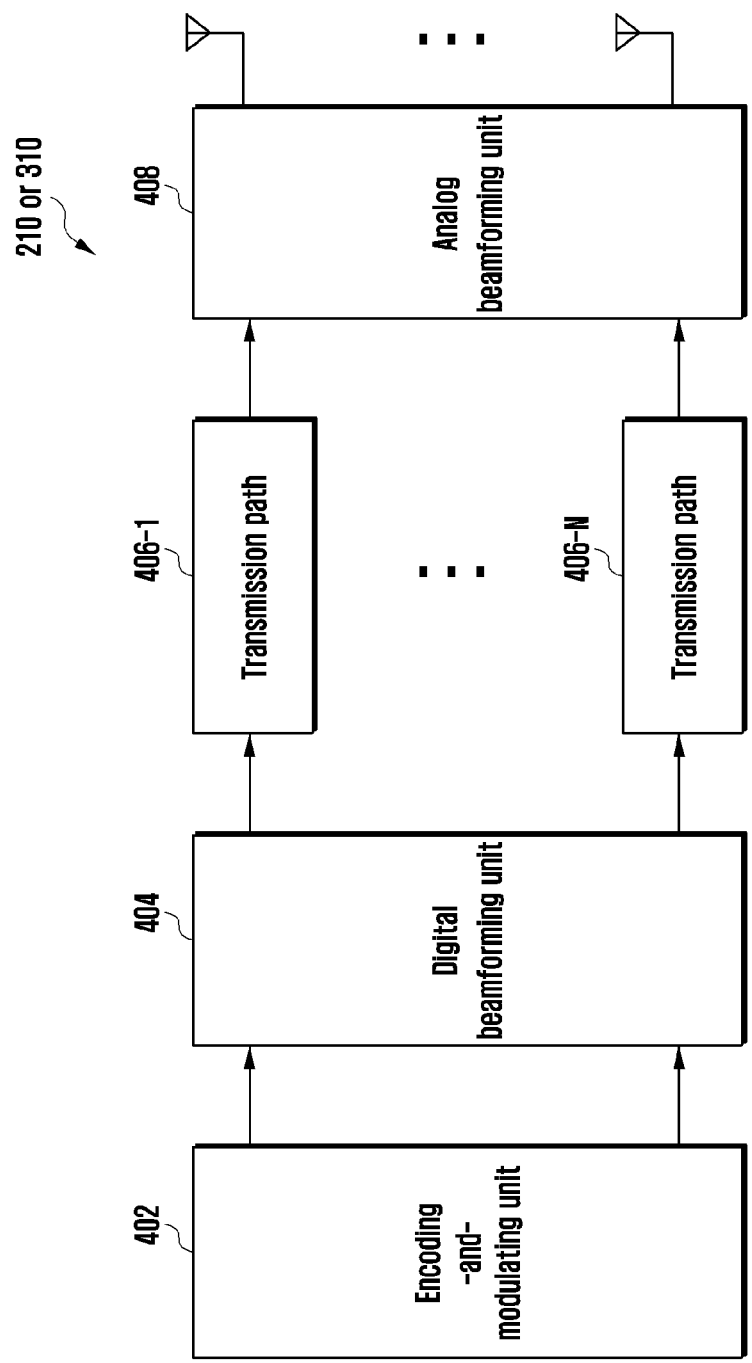
FIG. 4 illustrates a configuration of a communication unit in a wireless communication system according to various embodiments.

FIG. 4 illustrates a configuration of a communication unit in a wireless communication system according to various embodiments.

FIG. 4 illustrates an example of a specific configuration of the wireless communication unit 210 illustrated in FIG. 2 or the communication unit 310 illustrated in FIG. 3. Specifically, FIG. 4 illustrates elements performing beamforming, which are a part of the wireless communication unit 210 in FIG. 2 or the communication unit 310 in FIG. 3.

Referring to FIG. 4, the wireless communication unit 210 or the communication unit 310 includes an encoding-and-modulating unit 402, a digital beamforming unit 404, a plurality of transmission paths 406-1 to 406-N, and an analog beamforming unit 408.

The encoding-and-modulating unit 402 performs channel encoding. For channel encoding, at least one of a low density parity check (LDPC) code, a convolution code, and a polar code may be used. The encoding-and-modulating unit 402 generates modulation symbols by performing constellation mapping.

The digital beamforming unit 404 performs beamforming on a digital signal (e.g. modulation symbols). To this end, the digital beamforming unit 404 multiplies beamforming weights to the modulation symbols. Beamforming weights are used for changing the size and the phase of a signal, and may be called "a precoding matrix", "a precoder", etc. The digital beamforming unit 404 outputs, to the plurality of transmission paths 406-1 to 406-N, the modulation symbols, which have been subjected to digital beamforming. According to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert, into analog signals, digital signals having been subjected to digital beamforming. To this end, each of the plurality of transmission paths 406-1 to 406-N may include an inverse fast Fourier transform (IFFT) calculator, a cyclic prefix (CP) insertion unit, a DAC, and an up converter. The CP insertion unit is designed for an orthogonal frequency division multiplexing (OFDM) scheme, and may be excluded in another physical layer scheme (e.g. filter bank multi-carrier (FBMC)). That is, the plurality of transmission paths 406-1 to 406-N provide independent signal processing processes for multiple streams generated through digital beamforming, respectively. However, according to an implementation method, a part of the elements of the plurality of transmission paths 406-1 to 406-N may be shared.

The analog beamforming unit 408 performs beamforming on an analog signal. To this end, the digital beamforming unit 404 multiplies beamforming weights to analog signals. The beamforming weights are used for changing the size and the phase of a signal. Specifically, according to a connection structure between the plurality of transmission paths 406-1 to 406-N and antennas, the analog beamforming unit 440 may be variously configured. For example, each of the plurality of transmission paths 406-1 to 406-N may be connected to one antenna array. As another example, the plurality of transmission paths 406-1 to 406-N may be connected to one antenna array. As yet other example, the plurality of transmission paths 406-1 to 406-N may be adaptively connected to one antenna array or two or more antenna arrays.

Figure 5:
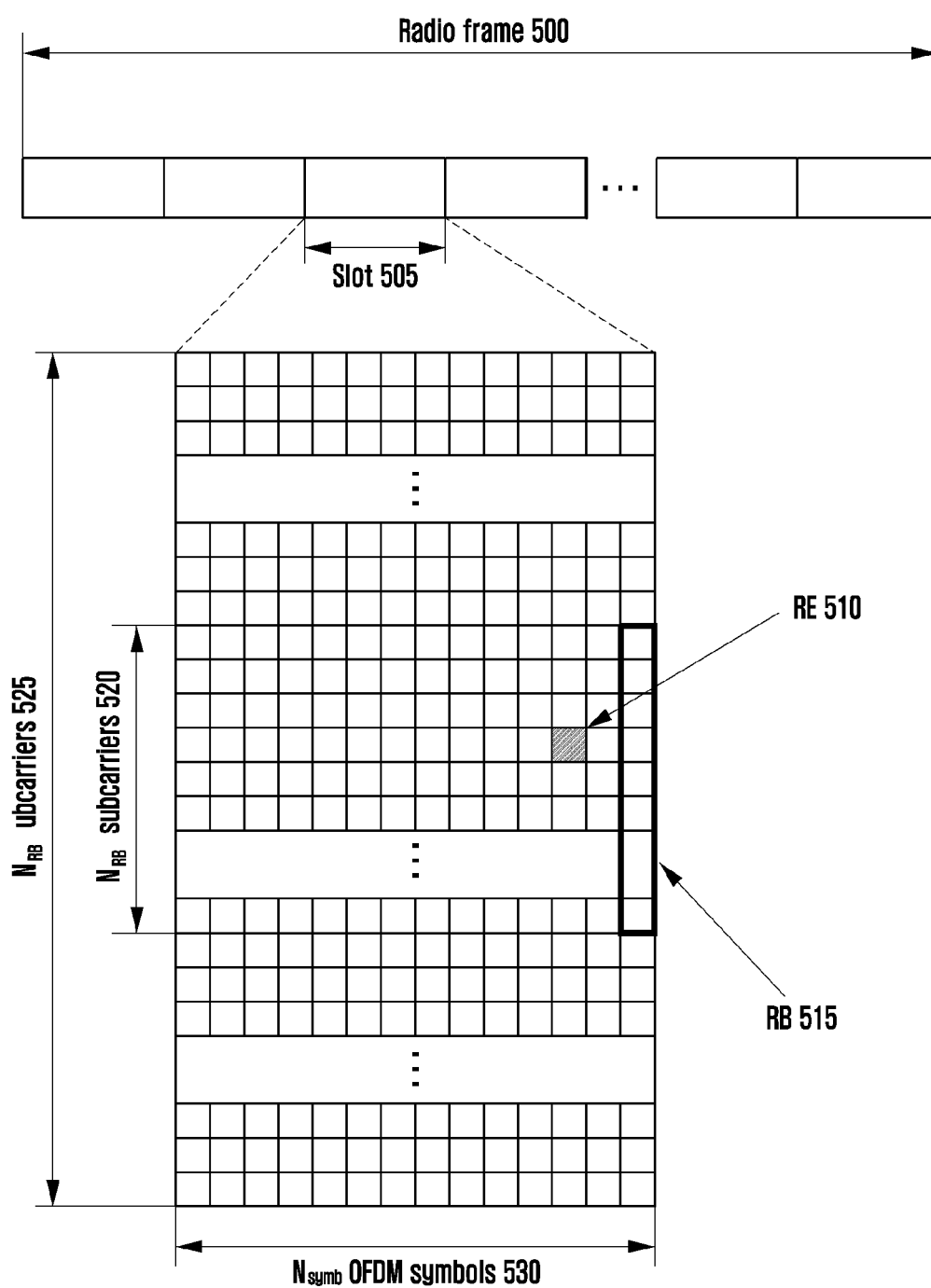
FIG. 5 illustrates a structure of wireless time-frequency resources of a wireless communication system according to various embodiments.

FIG. 5 illustrates a structure of wireless time-frequency resources of a wireless communication system according to various embodiments.

Referring to FIG. 5, in the wireless resource region, the horizontal axis indicates a time domain and the vertical axis indicates a frequency domain. In the time domain, a minimum transmission unit is an OFDM symbol or a DFT-S-OFDM symbol, and Nsymb number of OFDM symbols or DFT-S-OFDM symbols 530 may be included in one slot 505. Unlike a slot, in an NR system, the length of a subframe may be defined as 1.0 milliseconds (ms), and the length of a radio frame 500 may be defined as 10 ms. In the frequency domain, a minimum transmission unit is a subcarrier, and the bandwidth of the entire system transmission band may include a total of NBW subcarriers 525. Specific numerical values for Nsymb, NBW, or the like may be variably applied according to a system.

A basic unit of the time-frequency resource region is a resource element (RE) 510 which may be represented by an OFDM symbol index or DFT-S-OFDM symbol index, and a subcarrier index. A resource block (RB) 515 may be defined as NRB number of consecutive subcarriers 520 in the frequency domain. In general, a minimum transmission unit of data is an RB unit, and in an NR system, Nsymb is 14 and NRB is 12 in general.

The structure of wireless time-frequency resources as illustrated in FIG. 5 is applied to a Uu interface. In addition, the structure of wireless time-frequency resources as illustrated in FIG. 5 may be also similarly applied to a sidelink.

Figure 6A:
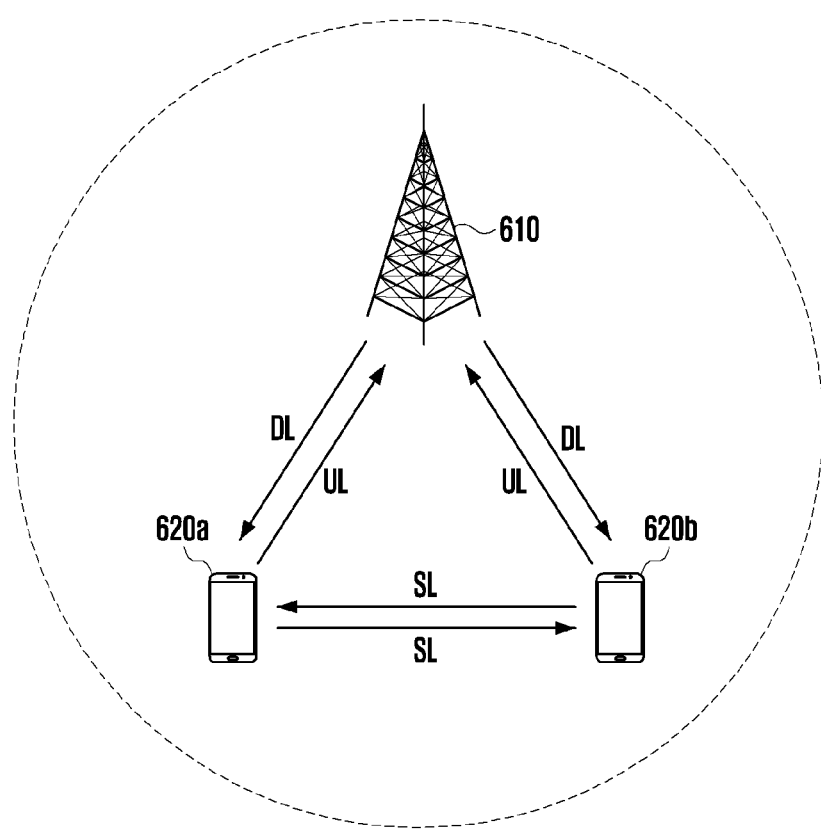
FIG. 6A illustrates an example of a scenario of sidelink communication in a wireless communication system according to various embodiments.
Figure 6B:
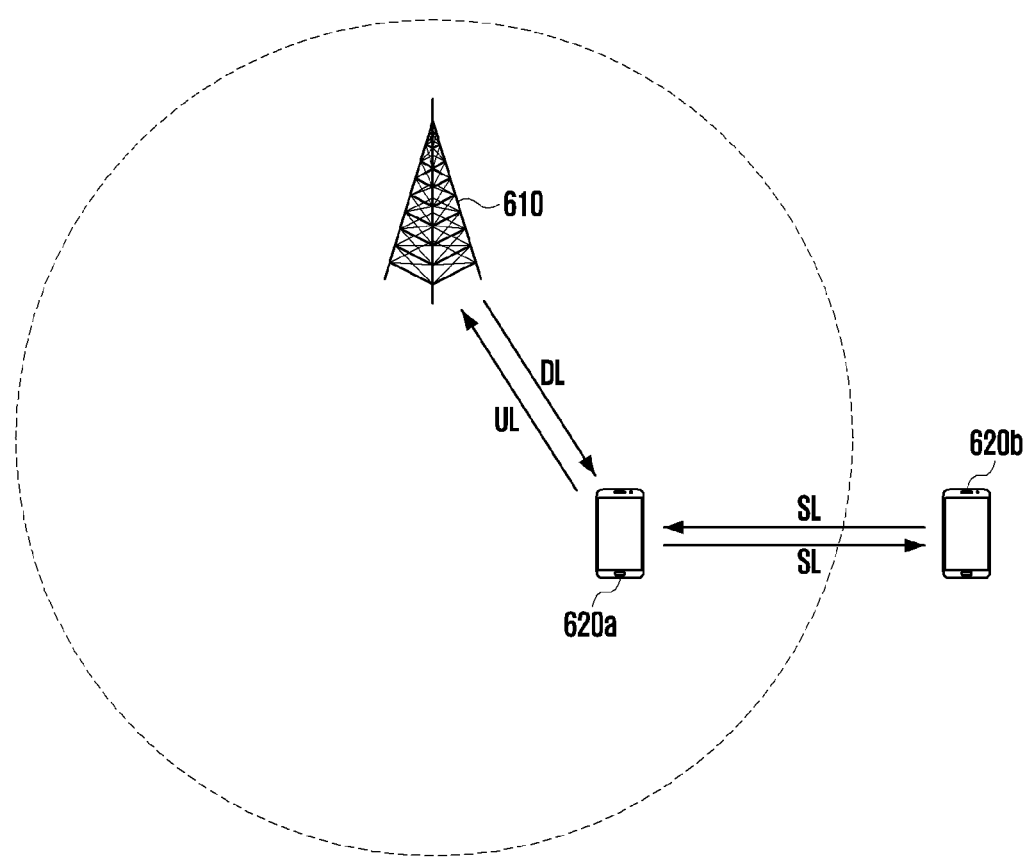
FIG. 6B illustrates an example of a scenario of sidelink communication in a wireless communication system according to various embodiments.
Figure 6C:
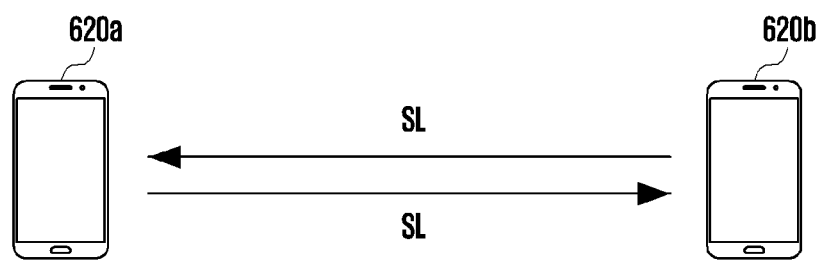
FIG. 6C illustrates an example of a scenario of sidelink communication in a wireless communication system according to various embodiments.
Figure 6D:
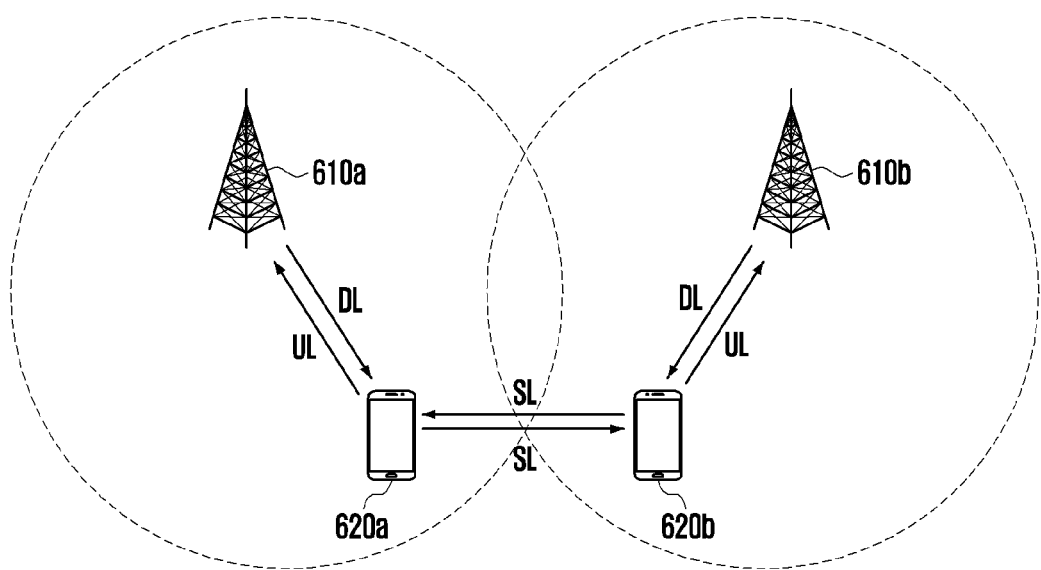
FIG. 6D illustrates an example of a scenario of sidelink communication in a wireless communication system according to various embodiments.

FIG. 6A illustrates an example of a scenario of sidelink communication in a wireless communication system according to various embodiments, FIG. 6B illustrates an example of a scenario of sidelink communication in a wireless communication system according to various embodiments, FIG. 6C illustrates an example of a scenario of sidelink communication in a wireless communication system according to various embodiments, and FIG. 6D illustrates an example of a scenario of sidelink communication in a wireless communication system according to various embodiments.

FIG. 6A illustrates an in-coverage scenario in which sidelink terminal (UE)s 620a and 620b are located in the coverage of a base station 610. The sidelink UEs 620a and 620b may receive data and control information through a downlink (DL) from the base station 610, or may transmit data and control information through an uplink (UL) to the base station 610. The data and control information may be data and control information for sidelink communication, or may be data and control information for general cellular communication rather than sidelink communication. In addition, in FIG. 6A, the sidelink UEs 620a and 620b may transmit or receive data and control information for sidelink communication through a sidelink.

FIG. 6B illustrates a partial coverage case in which the first UE 620a among the sidelink UEs is located in the coverage of the base station 610, and the second UE 620b is located out of the coverage of the base station 610. The first UE 620a located in the coverage of the base station 610 may receive data and control information through a downlink from the base station, or may transmit data and control information through an uplink to the base station. The second UE 620b located out of the coverage of the base station 610 is unable to receive data and control information through a downlink from the base station, or is unable to transmit data and control information through an uplink to the base station. The second UE 620b may transmit or receive data and control information to or from the first UE 620a for sidelink communication through a sidelink.

FIG. 6C illustrates a case in which sidelink UEs (e.g. the first UE 620a and the second UE 620b) are located out of the coverage of a base station. Therefore, the first UE 620a and the second UE 620b are unable to receive data and control information through a downlink from the base station, or are unable to transmit data and control information through an uplink to the base station. The first UE 620a and the second UE 620b may transmit and receive data and control information for sidelink communication through a sidelink.

FIG. 6D illustrates a case of inter-cell sidelink communication performed by the first UE 620a and the second UE 620b performing sidelink communication, which are connected to (e.g. an RRC connection state) or are camped in (e.g. an RRC disconnection state, i.e. an RRC idle state) different base stations (e.g. a first base station 610a and a second base station 610b). The first UE 620a may be a sidelink transmission UE, and the second UE 620b may be a sidelink reception UE. Alternatively, the first UE 620a may be a sidelink reception UE, and the second UE 620b may be a sidelink transmission UE. The first UE 620a may receive a sidelink-dedicated system information block (SIB) from the base station 610a to which the first UE is connected (or in which the first UE is camped). The second UE 620b may receive a sidelink-dedicated SIB from the different base station 610b to which the second UE is connected (or in which the second UE is camped). Information of the sidelink-dedicated SIB received by the first UE 620a and information of the sidelink-dedicated SIB received by the second UE 620b may be different from each other. Therefore, pieces of information are required to be unified in order to perform sidelink communication between UEs located in different cells.

For convenience of explanation, the examples illustrated in FIGS. 6A to 6D have been explained for a sidelink system including two UEs (e.g. the first UE 620a and the second UE 620b). However, the disclosure is not limited thereto, and may be also applied to a sidelink system in which three or more UEs participate. In addition, uplinks and downlinks between the base station 610 and sidelink UEs may be referred to as Uu interfaces, and sidelinks between sidelink UEs may called PC-5 interfaces. In the following description, an uplink or downlink and an Uu interface, and a sidelink and PC-5 may be used together.

In the disclosure, a UE may imply a vehicle supporting vehicular-to-vehicular (V2V) communication, a vehicle or a pedestrian's handset (e.g. smartphone) supporting vehicular-to-pedestrian (V2P) communication, a vehicle supporting vehicular-to-network (V2N) communication, or a vehicle supporting vehicular-to-infrastructure (V2I) communication. In addition, in the disclosure, a UE may imply a road side unit (RSU) equipped with a UE function, an RSU equipped with a base station function, or an RSU equipped with a part of a base station function and a part of a UE function.

Figure 7A:
FIG. 7A illustrates an example of a sidelink communication transmission scheme in a wireless communication system according to various embodiments.
Figure 7B:
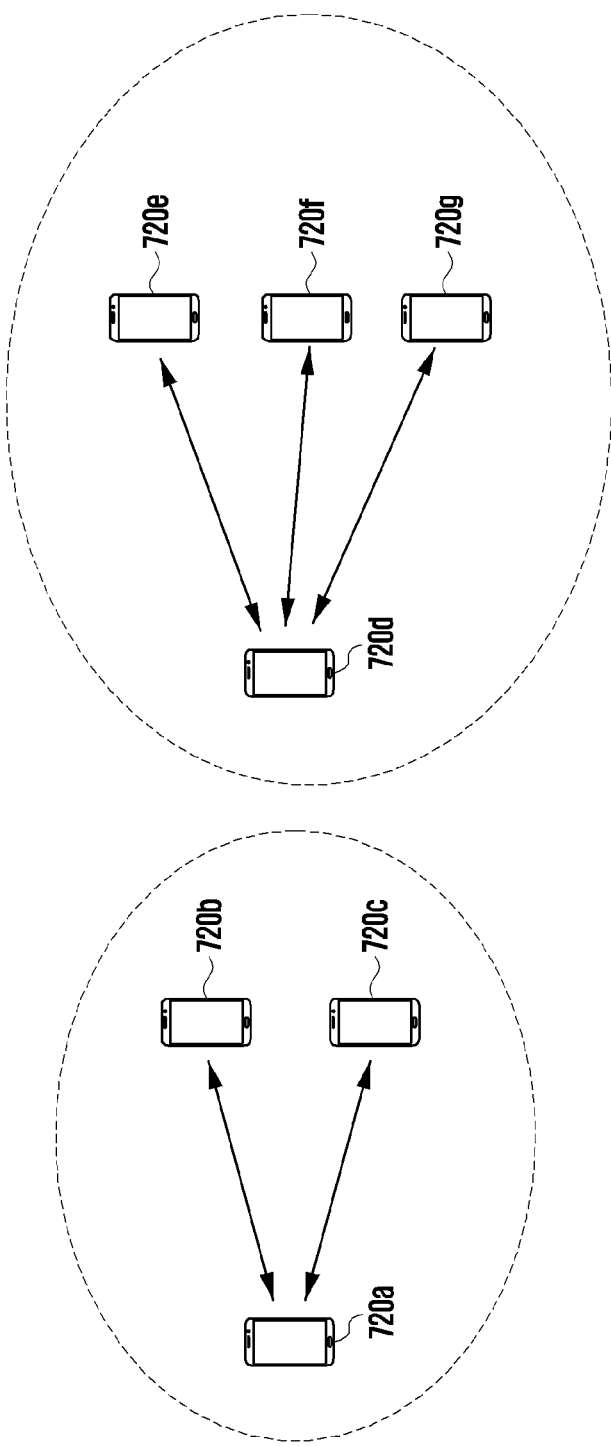
FIG. 7B illustrates an example of a sidelink communication transmission scheme in a wireless communication system according to various embodiments.

FIG. 7A illustrates an example of a sidelink communication transmission scheme in a wireless communication system according to various embodiments, and FIG. 7B illustrates an example of a sidelink communication transmission scheme in a wireless communication system according to various embodiments. FIG. 7A illustrates a unicast scheme, and FIG. 7B illustrates a groupcast scheme.

As illustrated in FIG. 7A, a transmission UE 720*a* and a reception UE 720*b* may perform one-to-one communication with each other. A transmission scheme as illustrated in FIG. 7A may be called unicast communication. As illustrated in FIG. 7B, a transmission UE 720*a* or 720*d* and reception UEs 720*b*, 720*c*, 720*e*, 720*f*, and 720*g* may perform one-to-many communication with each other. A transmission scheme as illustrated in FIG. 7B may be called groupcast or multicast. In FIG. 7B, the first UE 720*a*, the second UE 720*b*, and the third UE 720*c* form one group, and performs groupcast communication. The fourth UE 720*d*, the fifth UE 720*e*, the sixth UE 720*f*, and the seventh UE 720*g* form another group, and perform groupcast communication. The UEs may perform groupcast communication in a group to which the UEs belong, and may perform unicast, groupcast, or broadcast communication with at least one other UE belonging to a different group. FIG. 7B illustrates two groups, but the disclosure is not limited thereto, and may be applied to more groups.

Although not illustrated in FIG. 7A or 7B, sidelink UEs may perform broadcast communication. Broadcast communication implies a scheme by which all sidelink UEs receive data and control information transmitted through a sidelink by a sidelink transmission UE. For example, in FIG. 7B, if the first UE 720*a* is a transmission UE, the other UEs 720*b*, 720*c*, 720*d*, 720*e*, 720*f*, and 720*g* may receive data and control information transmitted by the first UE 720*a*.

Sidelink unicast communication, groupcast communication, and broadcast communication described above may be supported in an in-coverage scenario, a partial-coverage scenario, or an out-of-coverage scenario.

Unlike an LTE sidelink, a NR sidelink may consider supporting of a transmission type in which a vehicle UE transmits data to only one particular UE through unicast, and a transmission type in which a vehicle UE transmits data to particular multiple UEs through groupcast. For example, in consideration of a service scenario, for example, a platooning technology in which two or more vehicles are connected to one network, and move while being bound in a group, unicast and groupcast technologies described above may be useful. Specifically, unicast communication may be used to allow the leader UE of a group, in which the connection is formed by platooning, to control one particular UE, and groupcast communication may be used to control a group including particular multiple UEs at the same time.

A V2X system may use the methods as described below for resource allocation.

(1) Mode 1 Resource Allocation

Scheduled resource allocation corresponds to a method by which a base station allocates resources used for sidelink transmission to RRC-connected UEs according to a dedicated scheduling scheme. The scheduled resource allocation method may be effective for interference management and resource pool management (dynamic allocation and/or semi-persistent transmission) because a base station can manage resources of a sidelink. If there is data to be transmitted to another UE(s), an RRC connection mode UE may transmit information notifying a base station of that there is data to be transmitted to the other UE(s), by using an RRC message or an MAC control element (hereinafter, "CE"). For example, an RRC message transmitted by a UE to a base station may be a sidelink UE information (SidelinkUEInformation) message and a UE assistance information (UEAssistanceInformation) message. An MAC CE may correspond to at least one of a scheduling request (SR) including information of the size of data buffered for sidelink communication, or a buffer status report (BSR) MAC CE including at least one of an indicator informing of a BSR for V2X communication.

(2) Mode 2 Resource Allocation

Secondly, UE autonomous resource selection is a method by which a sidelink transmission/reception resource pool for V2X is provided to a UE through system information or an RRC message (e.g. an RRC reconfiguration (RRCReconfiguration) message, or a PC5-RRC message), and the UE selects a resource pool and a resource according to a set rule. The UE autonomous resource selection may correspond to one or multiple methods among the following resource allocation methods.

a UE may autonomously select a sidelink resource for transmission.
   a UE assists sidelink resource selection for other UEs.
   a UE is configured with NR configured grant for sidelink transmission.
   a UE schedules sidelink transmission of other UEs.
   a resource selection method of a UE may include zone mapping, sensing-based resource selection, random selection, etc.
   Additionally, even if a UE exists in the coverage of a base station, resource allocation or resource selection based on scheduled resource allocation or UE autonomous resource selection modes may fail. In this case, the UE may perform V2X sidelink communication through a pre-configured sidelink transmission/reception resource pool (preconfiguration resource pool).
   In addition, if UEs for V2X communication exist out of the coverage of a base station, a UE may perform V2X sidelink communication through a pre-configured sidelink transmission/reception resource pool.

An SLRB configuration and an SLRB for transmitting a sidelink flow or packet may be mapped to an SL logical channel group (LCG), and the SL LCG may be mapped to an SL logical channel. The SLRB configuration and the SLRB may be distinguished by a combination of a source index, a destination index, a cast type, a QoS flow identifier (QFI)/ProSe flow identifier or PC5 flow identifier (PFI), or priority, etc.

In a wireless communication system according to various embodiments, a sidelink radio bearer may be configured to transmit or receive data, based on a sidelink between UEs. The sidelink radio bearer may be used for at least one of sidelink unicast, sidelink groupcast, and sidelink broadcast. When packet transmission or reception based on a sidelink between a UE and a UE is performed, the sidelink radio bearer may be configured by a bi-directional connection or a uni-directional connection. If the sidelink radio bearer is configured by a bi-directional connection, each of the UEs may serve as both a transmission UE and a reception UE. If a sidelink radio bearer between two UEs is configured by a bi-directional connection, a part of configuration information used for data transmission or reception between the two UEs may be configured to be the same. For example, an RLC layer mode (RLC mode) may be configured to be an RLC AM or RLC UM. With respect to the sidelink radio bearer configured by the bi-directional connection, it is required that a bi-directional RLC AM is configured identically for the two UEs, or a bi-directional RLC UM is configured identically for the two UEs. As another example, if a sidelink radio bearer between two UEs is configured by a uni-directional connection, a part of configuration information used for data transmission or reception between the two UEs may be configured to be the same. With respect to the sidelink radio bearer configured by the uni-directional connection, it is required that a uni-directional RLC AM is configured identically for the two UEs, or a uni-directional RLC UM is configured identically for the two UEs. As another example, if an RLC AM is configured for a sidelink radio bearer configured by a bi-directional connection, a sidelink logical channel configured for the two UEs is required to be a logical channel corresponding to a bi-directional RLC AM. If an RLC UM is configured for a sidelink radio bearer configured by a bi-directional connection, a sidelink logical channel configured for the two UEs is required to be a logical channel corresponding to a bi-directional RLC UM. As another example, if an RLC AM is configured for a sidelink radio bearer configured by a uni-directional connection, a sidelink logical channel configured for the two UEs is required to be a logical channel corresponding to a uni-directional RLC AM. If an RLC UM is configured for a sidelink radio bearer configured by a uni-directional connection, a sidelink logical channel configured for the two UEs is required to be a logical channel corresponding to a uni-directional RLC UM. Transmission parameter configuration information configured for each of the UEs and/or transmission/reception parameter configuration information required to be synchronized between the two UEs may be configured by information (at least one of information obtained from an RRC-dedicated message, information obtained from an SIB message, and information from a preconfiguration) obtained from a system. Reception parameter configuration information configured for each of the UEs may be randomly configured by a corresponding UE. Therefore, if the UEs obtain, from a system, configuration information of a sidelink radio bearer configured by a bi-directional connection, a method by which the UEs can obtain the same configuration information is required. If the UEs obtain, from a system, configuration information of a sidelink radio bearer configured by a uni-directional connection, a method by which the UEs can obtain the same configuration information is required. This is because: the two UEs may obtain configuration information from different base stations, respectively; one UE may obtain configuration information from an RRC-dedicated message of a base station and the other UE may obtain configuration information from an SIB; or one UE may obtain configuration information from an RRC-dedicated message/SIB of a base station and the other UE may obtain configuration information from a preconfiguration.

In a wireless communication system according to various embodiments, NW coordination may be applied as a method for configuring the same configuration information on a bi-directional or uni-directional sidelink radio bearer between UEs. An NW coordination method may be applied to at least one of a system using the same PLMN, a system of the same service provider, a system of a region to which the same regulation is applied, and the same NW. In the NW coordination method, the same sidelink radio bearer configuration information is required to be used for the same ProSe QoS indicator (PQI) in at least one of the same PLMN or the same service provider system, the same regulation system, and the same NW. In another embodiment, the same sidelink radio bearer configuration information is required to be used for at least one of the same destination ID, the same PC5 flow ID, or the same unicast ID, instead of a PQI. Two UEs performing sidelink-based communication may exchange at least one of PLMN information, service provider information, regulation information, or NW information in order to determine information indicating that the UEs belong to a network using the same sidelink radio bearer configuration information, according to NW coordination. If it is determined that the two UEs do not belong to the same NW, the two UEs may perform a configuration coordination operation to have the same configuration information on a bi-directional or uni-directional sidelink radio bearer.

Use information of a bi-directional or uni-directional sidelink radio bearer between two UEs deciding to perform direct communication may be exchanged in a PC5-S signaling setup procedure used for configuring a sidelink unicast connection between the two UEs. In another embodiment, use information of a bi-directional or uni-directional sidelink radio bearer between two UEs may be exchanged in a PC5 RRC connection procedure used for a sidelink unicast connection between the two UEs. If a bi-directional or uni-directional sidelink radio bearer is determined to be used, based on the information exchanged between the two UEs, whether there is a need of an SLRB configuration coordination operation in a procedure of configuring an SLRB configuration for a sidelink unicast connection between the two UEs may be determined based on at least one of PLMN information, service provider information, regulation information, or NW information.

Figure 8A:
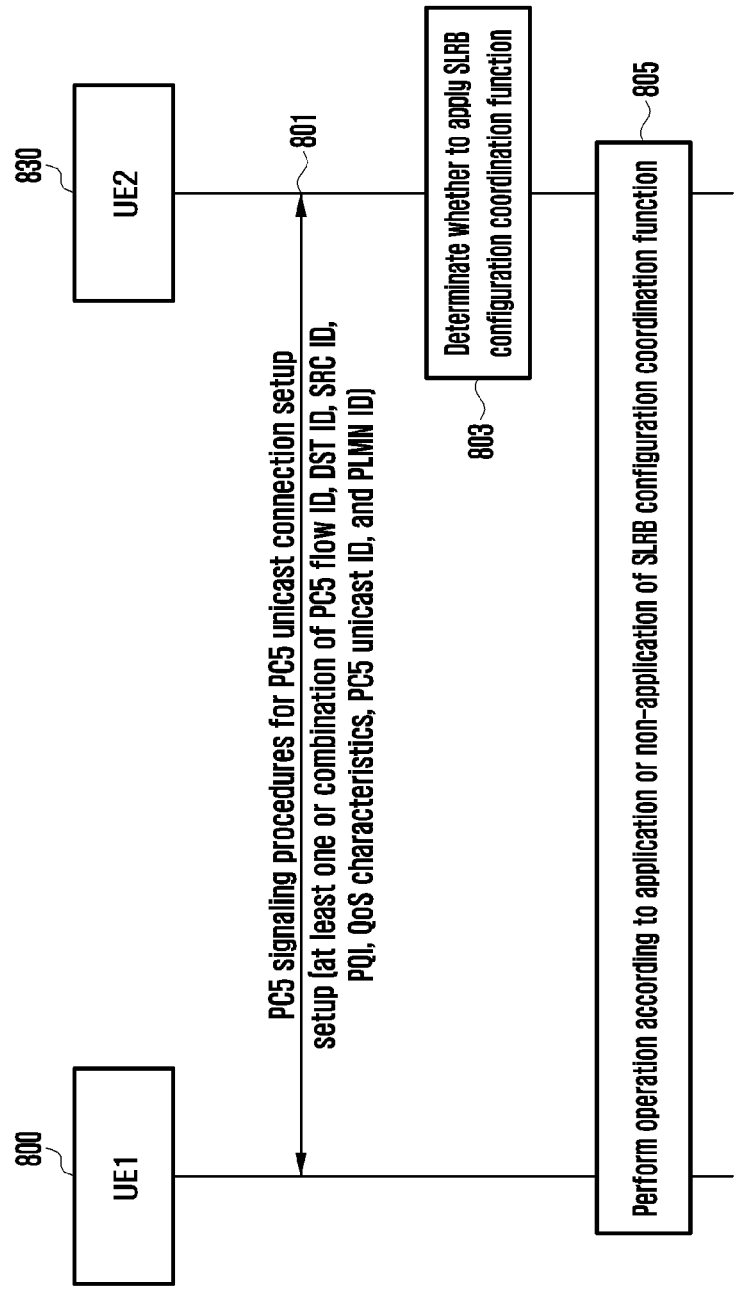
FIG. 8A illustrates a signal flow diagram between terminals using a NW coordination method according to various embodiments.
Figure 8B:
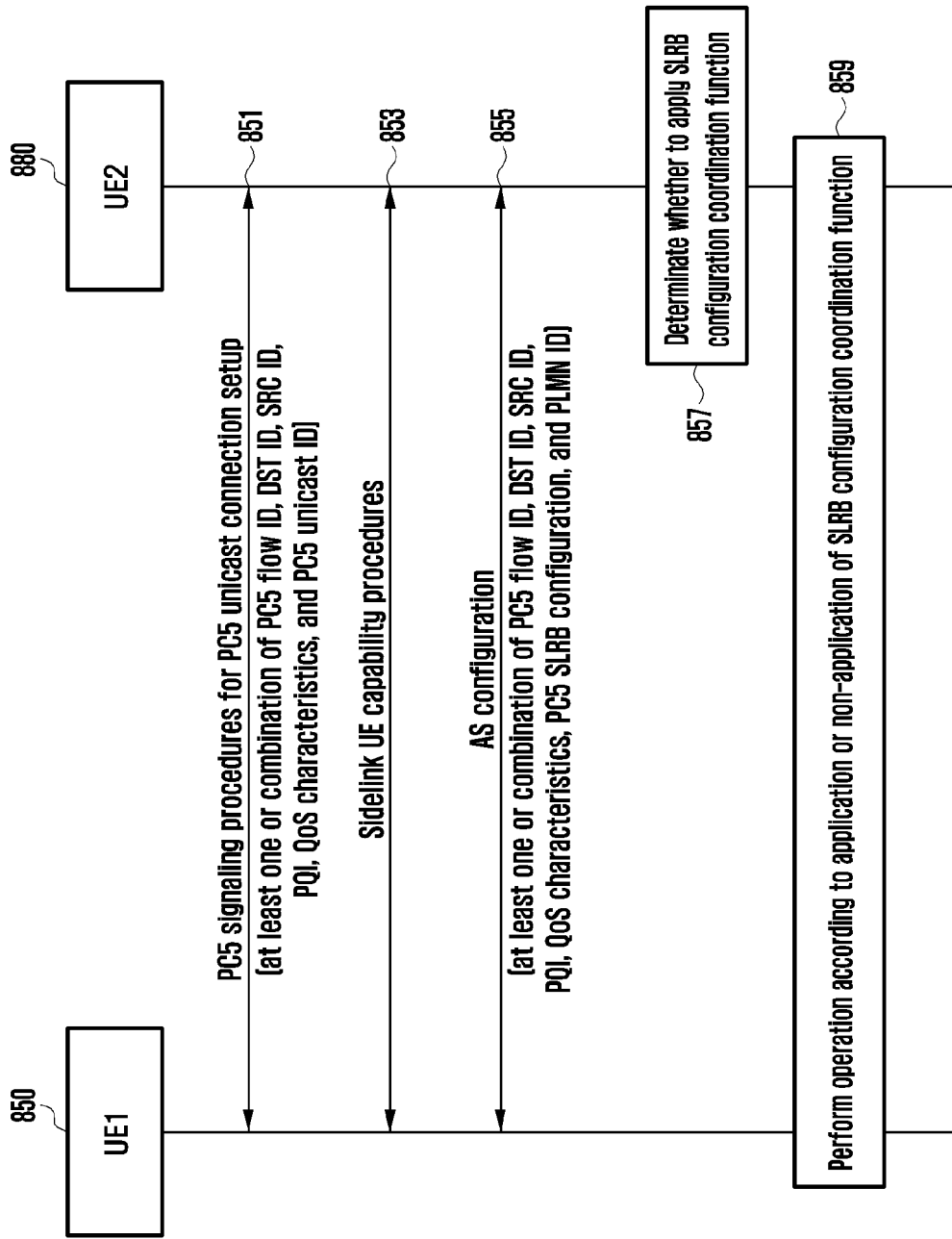
FIG. 8B is a signal flow diagram between terminals using a NW coordination method according to various embodiments.

FIG. 8A is a signal flow diagram between UEs using a NW coordination method according to various embodiments, and FIG. 8B is a signal flow diagram between UEs using a NW coordination method according to various embodiments. FIG. 8A illustrates an embodiment in which, while two UEs perform a PC5-S signaling setup procedure to configure a PC5 unicast connection, the two UEs exchange NW coordination information, and FIG. 8B illustrates an embodiment in which, while two UEs performs a PC5-RRC configuration procedure to configure a PC5 unicast connection, the two UEs exchange NW coordination information.

Referring to FIG. 8A, a UE1 800 and UE2 830 may perform a PC5 signaling procedure for configuring a sidelink-based unicast connection, in operation 801. Information exchanged between the two UEs 800 and 830 in the PC5 signaling procedure may include at least one or a combination of a PC5 flow ID, a destination ID, a source ID, a PQI, QoS characteristics, and a PC5 unicast ID. In the PC5 signaling procedure, the two UEs 800 and 830 may exchange bi-directional bearer indication information or uni-directional bearer indication information. In the PC5 signaling procedure, the two UEs 800 and 830 may exchange NW coordination information. The NW coordination information may include at least one or a combination of a PLMN ID, a service provider identifier, a regulation identifier, and an NW identifier.

The UE 830 having received the NW coordination information may determine whether to apply an SLRB configuration coordination function, in operation 803. In the embodiment illustrated in FIG. 8A, the UE2 830 determines whether to apply the SLRB configuration coordination function. However, the UE1 800 may also determine whether to apply the SLRB configuration coordination function. The determination on whether to apply the SLRB configuration coordination function corresponds to an operation of determining whether the UE1 800 and the UE2 830 belong to the same NW or different NWs, based on the NW coordination information. If it is determined according to a determination performed in operation 803, that the application of the SLRB configuration coordination function is necessary, the UE1 800 and the UE2 830 may perform an operation for applying the SLRB configuration coordination function, in operation 805. Alternatively, if it is determined according to a determination performed in operation 803, that the application of the SLRB configuration coordination function is not necessary, the UE1 800 and the UE2 830 may perform an operation corresponding to non-applying of the SLRB configuration coordination function, in operation 805. In a case of non-applying of the SLRB configuration coordination function, the two UEs 800 and 830 may perform a PC5-RRC connection setup procedure (at least one of a UE capability negotiation procedure and an AS configuration procedure). According to a result of a determination performed in operation 803, the UE1 800 and the UE2 830 may exchange information indicating applying or non-applying the SLRB configuration coordination function. The SLRB configuration coordination function which can be performed by the UE1 800 and the UE2 830 in operation 805 may include at least one or a combination of methods, as illustrated in FIGS. 9 to 20, of: determining and deciding by UE itself; using coordination of a base station; using a designated UE; and processing as an AS configuration failure.

Referring to FIG. 8B, a UE1 850 and UE2 880 may perform a PC5 signaling procedure for configuring a sidelink-based unicast connection, in operation 851. Information exchanged between the two UEs 850 and 880 in the PC5 signaling procedure may include at least one or a combination of a PC5 flow ID, a destination ID, a source ID, a PQI, QoS characteristics, and a PC5 unicast ID. The UE1 850 and the UE2 880 having performed the PC5-S signaling setup procedure may perform a sidelink UE capability information exchange procedure in a PC5 RRC connection procedure, in operation 853. The UE1 850 and the UE2 880 may perform an AS configuration procedure in the PC5 RRC connection procedure, in operation 855. The AS configuration procedure may correspond to a procedure of configuring configuration information of a sidelink radio bearer between the two UEs 850 and 880. Information exchanged in the AS configuration procedure may include at least one or a combination of a PC5 flow ID, a destination ID, a source ID, a PQI, QoS characteristics, and a PC5 SLRB configuration. In the AS configuration procedure, the two UEs 850 and 880 may exchange bi-directional bearer indication information or uni-directional bearer indication information. In the AS configuration procedure, the two UEs may exchange NW coordination information. The NW coordination information may include at least one or a combination of a PLMN ID, a service provider identifier, a regulation identifier, and an NW identifier.

The UE 880 having received the NW coordination information may determine whether to apply an SLRB configuration coordination function, in operation 857. In the embodiment illustrated in FIG. 8B, the UE2 880 determines whether to apply the SLRB configuration coordination function. However, the UE1 850 may also determine whether to apply the SLRB configuration coordination function. The determination on whether to apply the SLRB configuration coordination function corresponds to an operation of determining whether the UE1 850 and the UE2 880 belong to the same NW or different NWs, based on the NW coordination information.

If it is determined according to a determination performed in operation 857, that the application of the SLRB configuration coordination function is necessary, the UE1 850 and the UE2 880 may perform an operation for applying the SLRB configuration coordination function, in operation 859. Alternatively, if it is determined according to a determination performed in operation 857, that the application of the SLRB configuration coordination function is not necessary, the UE1 850 and the UE2 880 may perform an operation corresponding to non-applying of the SLRB configuration coordination function, in operation 859. In a case of non-applying of the SLRB configuration coordination function, the two UEs 850 and 880 may perform a PC5-RRC connection setup procedure (at least one of a UE capability negotiation procedure and an AS configuration procedure). According to a result of a determination performed in operation 857, the UE1 850 and the UE2 880 may exchange information indicating applying or non-applying the SLRB configuration coordination function. The SLRB configuration coordination function which can be performed by the UE1 850 and the UE2 880 in operation 859 may include at least one or a combination of methods, as illustrated in FIGS. 9 to 20, of: determining and deciding by UE itself; using coordination of a base station; using a designated UE; and processing as an AS configuration failure.

According to various embodiments, a method for coordinating configuration information of a sidelink radio bearer between UEs performing sidelink-based direct communication may include at least one or a combination of the following methods.

(1) Determination and decision made by a UE itself: Radio bearer configuration information may be coordinated through signaling exchange between two UEs. The two UEs may correspond to an initiating UE or a peer UE which performs a PC5-S signaling procedure for configuring a sidelink connection. In various embodiments, a UE transmitting the first message of a PC5-S signaling procedure will be called an initiating UE, and a UE receiving the first message of the PC5-S signaling procedure and transmitting a response (acceptance of connection configuration) message to the first message will be called a peer UE.

(2) Decision made through coordination by a base station: Two UEs may coordinate radio bearer configuration information by reporting the radio bearer configuration information to a base station accessed by the two UEs, and obtaining identification and adjustment information relating to the radio bearer configuration information from the base station.

(3) Designation of a UE deciding a sidelink radio bearer (SLRB) configuration, and determination and decision made by the designated UE: For example, a designated UE may correspond to a UE that obtains and provides a bi-directional SLRB configuration and/or a uni-directional SLRB configuration. Another UE may receive, from the designated UE, a bi-directional SLRB configuration and/or a uni-directional SLRB configuration and use the received configuration. For example, the designated UE may correspond to a UE that determines a match or mismatch between bi-directional SLRB configurations and/or uni-directional SLRB configurations obtained by the UEs, and notifies the other UE of the determined match or mismatch. If SLRB configuration mismatch information is received from the designated UE, the other UE may perform a bi-directional SLRB configuration and/or uni-directional SLRB configuration coordination procedure together with the designated UE. For example, the designated UE may correspond to a UE that, when the UE determines whether bi-directional SLRB configurations and/or uni-directional SLRB configurations obtained by the UEs mismatch each other, performs SLRB configuration coordination and fixes SLRB configurations to be used by the UEs. The other UE may receive, from the designated UE, a final bi-directional SLRB configuration and/or uni-directional SLRB configuration and use the received configuration.

The designated UE may: decide a bi-directional SLRB configuration and/or uni-directional SLRB configuration, based on sidelink radio bearer configuration information obtained by the designated UE itself (obtained through at least one of a dedicated RRC message of an NW, an SIB, and a preconfiguration); determine coordination with an SLRB configuration received from the other UE, based on the obtained SLRB configuration, and decide a bi-directional SLRB configuration and/or uni-directional SLRB configuration; report SLRB configuration information received from the other UE to a base station of the designated UE, and decide a bi-directional SLRB configuration and/or uni-directional SLRB configuration, based on information identified by the base station; or report SLRB configuration information received from the other UE to the base station of the designated UE, and obtain a final bi-directional SLRB configuration and/or uni-directional SLRB configuration from the base station. If a final bi-directional SLRB configuration and/or uni-directional SLRB configuration is obtained, the designated UE may transfer the information to the other UE.

An embodiment of a method for selecting a designated UE may include at least one of methods of: selecting an initiating UE as a designated UE; selecting a peer UE as a designated UE; or selecting an RRC_Connected UE as a designated UE. According to various embodiments, a method of selecting an SLRB configuration deciding UE will be described with reference to FIG. 9.

(4) Determination as configuration information acquisition failure (AS configuration failure): If it is determined to be difficult to coordinate bi-directional SLRB configurations and/or uni-directional SLRB configurations of two UEs, and/or it is determined that bi-directional SLRB configuration and/or uni-directional SLRB configuration information obtained by the two UEs mismatch, an AS configuration failure may be determined, and the UEs may perform an AS configuration failure procedure. An AS configuration failure processing method may be used while being combined with method (1), (2), or (3), or may be used alone. A UE which determines an AS configuration failure caused by a collision between bi-directional SLRB configurations and/or uni-directional SLRB configurations may transmit an AS configuration failure message to an opponent UE, and the AS configuration failure message may include at least one of AS configuration failure indication information and collided SLRB configuration parameter information.

Figure 9:
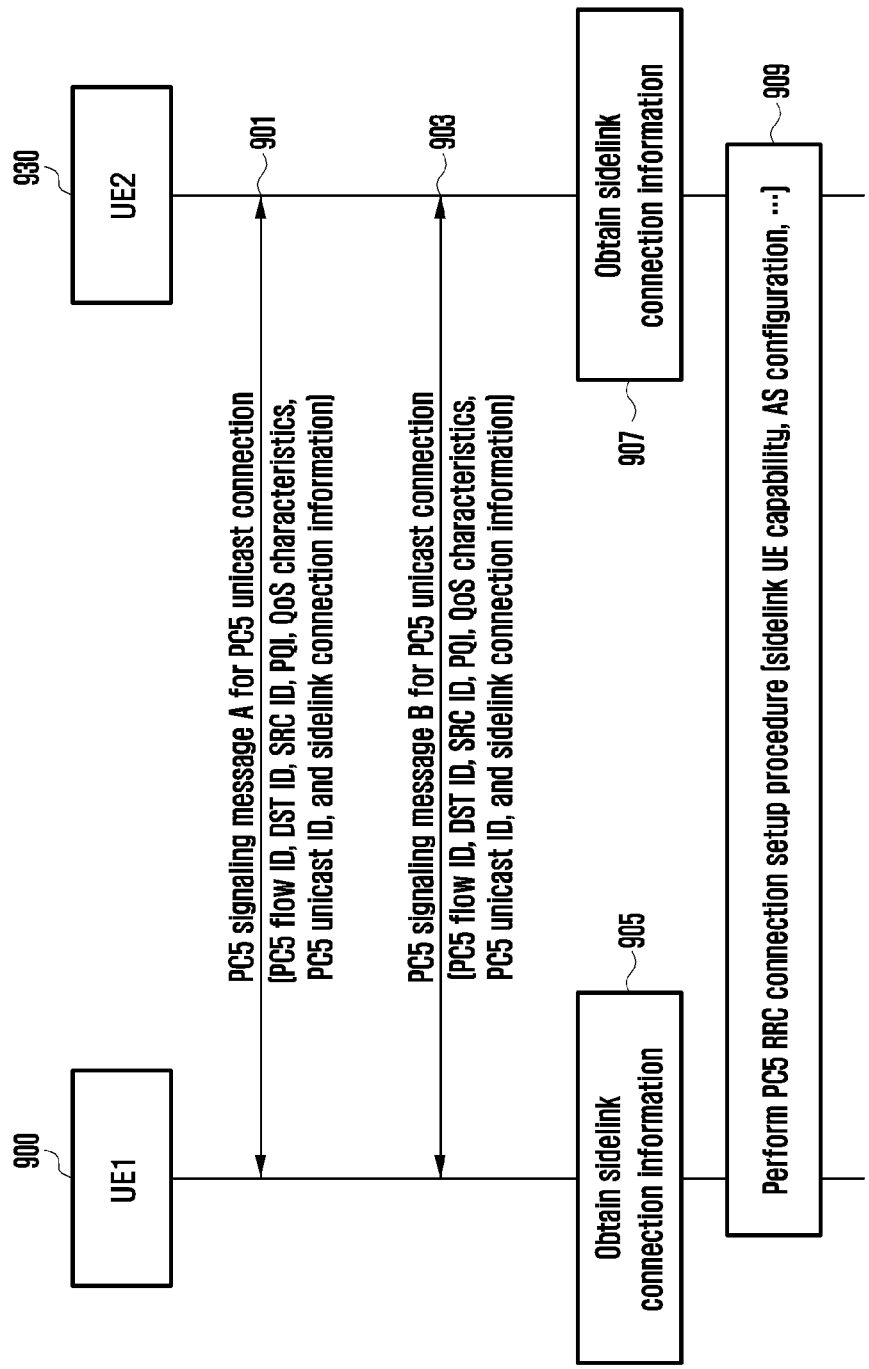
FIG. 9 illustrates a method of selecting a terminal deciding an SLRB configuration according to various embodiments.

FIG. 9 illustrates a method of selecting a UE deciding an SLRB configuration according to various embodiments.

A UE1 900 may transmit a PC5-S signaling message A to start a sidelink unicast connection setup procedure, in operation 901. The message A may include at least one or a combination of a PC5 flow ID, a destination ID, a source ID, a PQI, QoS characteristics, and a PC5 unicast ID. The message A may include information indicating a bi-directional connection and/or uni-directional connection. The message A may include information indicating an SLRB-configuration designated UE for a bi-directional connection and/or uni-directional connection. For example, the information indicating the designated UE may indicate that the UE1 900 is to serve as the designated UE. For example, the information indicating the designated UE may indicate that a peer UE is to serve as the designated UE. For example, the information indicating the designated UE may indicate that if a peer UE is an RRC_Connected UE, the peer UE is to serve as the designated UE.

If a UE2 930 receives the message A and accepts sidelink connection setup requested by the message A, the UE2 may transmit a PC5-S signaling message B to the UE1 900 in operation 903, and may serve as a peer UE. If the UE2 930 receives the message A and does not accept the sidelink connection setup requested by the message A, the UE2 may not transmit a response message to the UE1 900, or may transmit a connection setup rejection message to the UE1. If the sidelink connection setup requested by the message A is accepted, the message B may include at least one or a combination of a PC5 flow ID, a destination ID, a source ID, a PQI, QoS characteristics, and a PC5 unicast ID, which corresponds to the message A. The message B may include bi-directional connection and/or uni-directional connection response information. The message B may include designated UE response information responding to the SLRB-configuration designated UE for a bi-directional connection and/or uni-directional connection. For example, the designated UE response information may include an ack that the UE1 900 is to serve as the designated UE. For example, the designated UE response information may include information of responding that the UE2 930 is to serve as the designated UE. For example, the designated UE response information may include information of responding that UE2 930 is unable to serve as the designated UE. If the UE2 930 responds that the UE2 is unable to serve as the designated UE, the UE1 900 may serve as the designated UE.

If a response message of operation 903 is received, the UE1 900 may identify information relating to a bi-directional connection and/or uni-directional connection, and designated UE information (operation 905). If the response message of operation 903 is transmitted, the UE2 930 may identify the information relating to a bi-directional connection and/or uni-directional connection, and the designated UE information (operation 907). The UE1 900 and the UE2 930 may perform an RRC connection setup procedure for a sidelink bi-directional radio bearer connection and/or sidelink uni-directional radio bearer connection (operation 909). The sidelink RRC connection setup procedure may include at least one of a UE capability procedure of exchanging sidelink UE capability information, and an AS configuration procedure of exchanging sidelink radio bearer configuration information. In the AS configuration procedure, the designated UE may: obtain and decide a bi-directional SLRB configuration and/or uni-directional SLRB configuration; and/or determine whether there is a need to coordinate a bi-directional SLRB configuration and/or uni-directional SLRB configuration, and decide a bi-directional SLRB configuration and/or uni-directional SLRB configuration which is to be used by each of the two UEs.

Figure 10A:
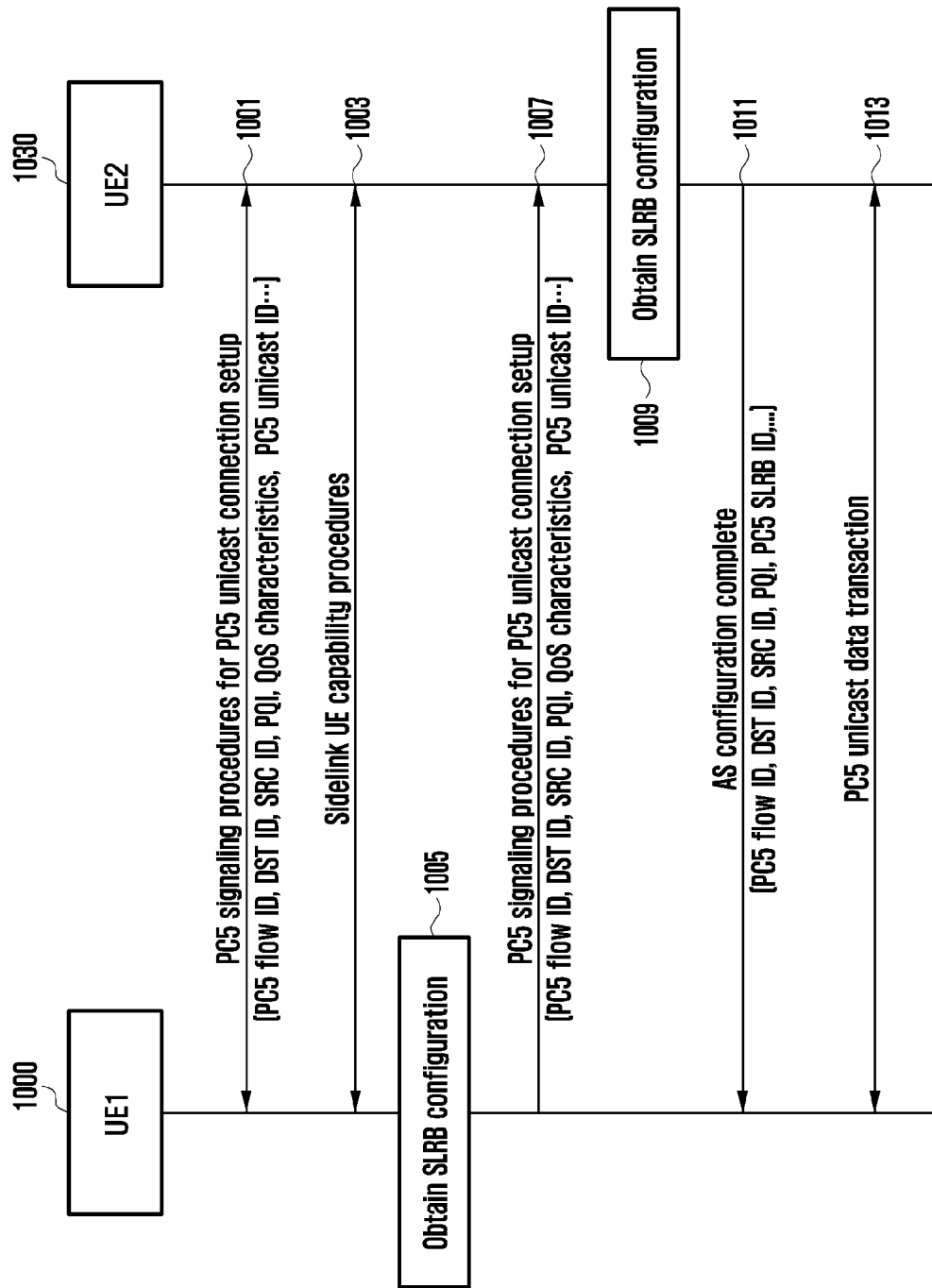
FIG. 10A illustrates a method of SLRB configuration coordination determined and decided by a terminal itself according to various embodiments.
Figure 10B:
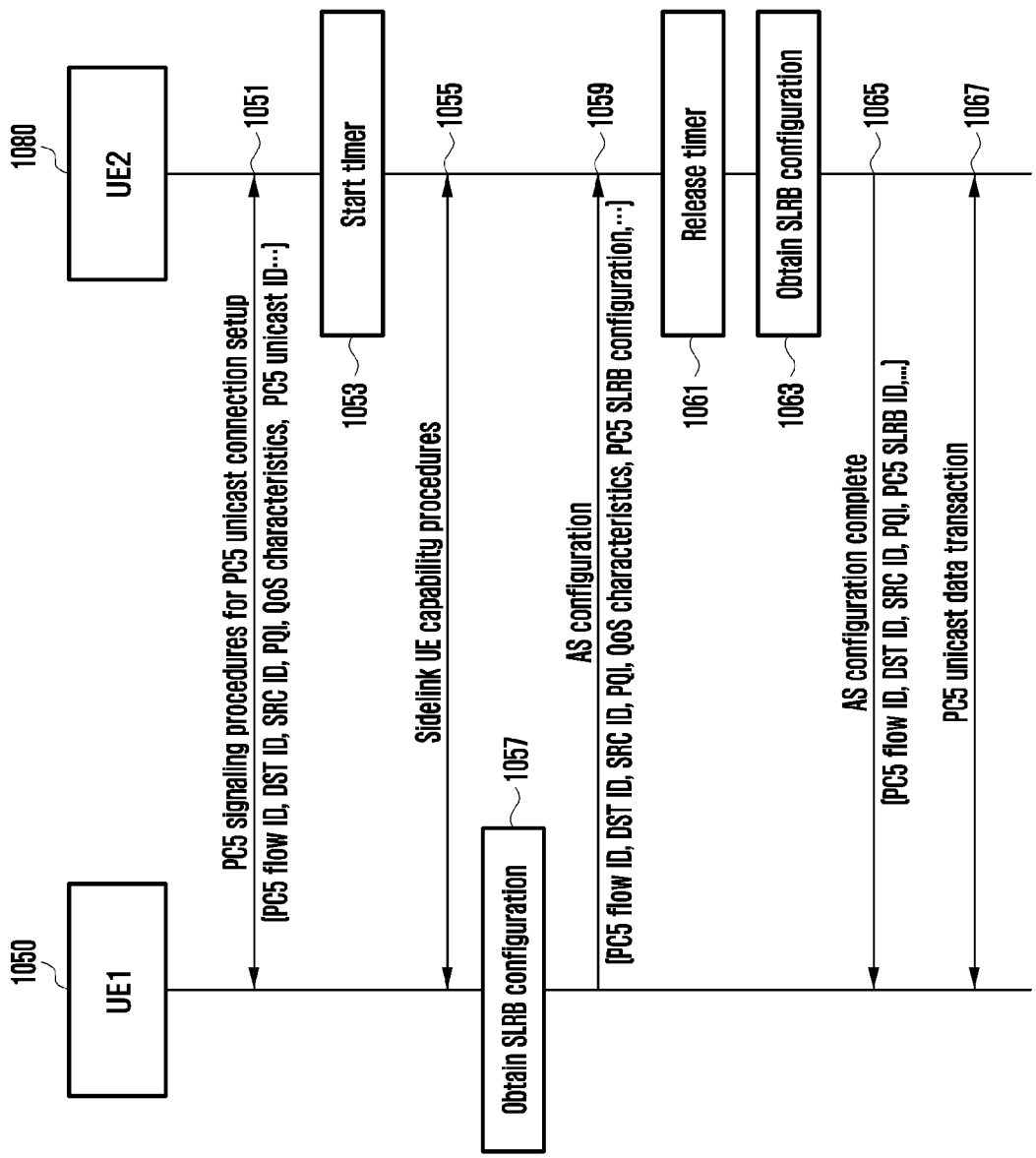
FIG. 10B illustrates a method of SLRB configuration coordination determined and decided by a terminal itself according to various embodiments.
Figure 12:
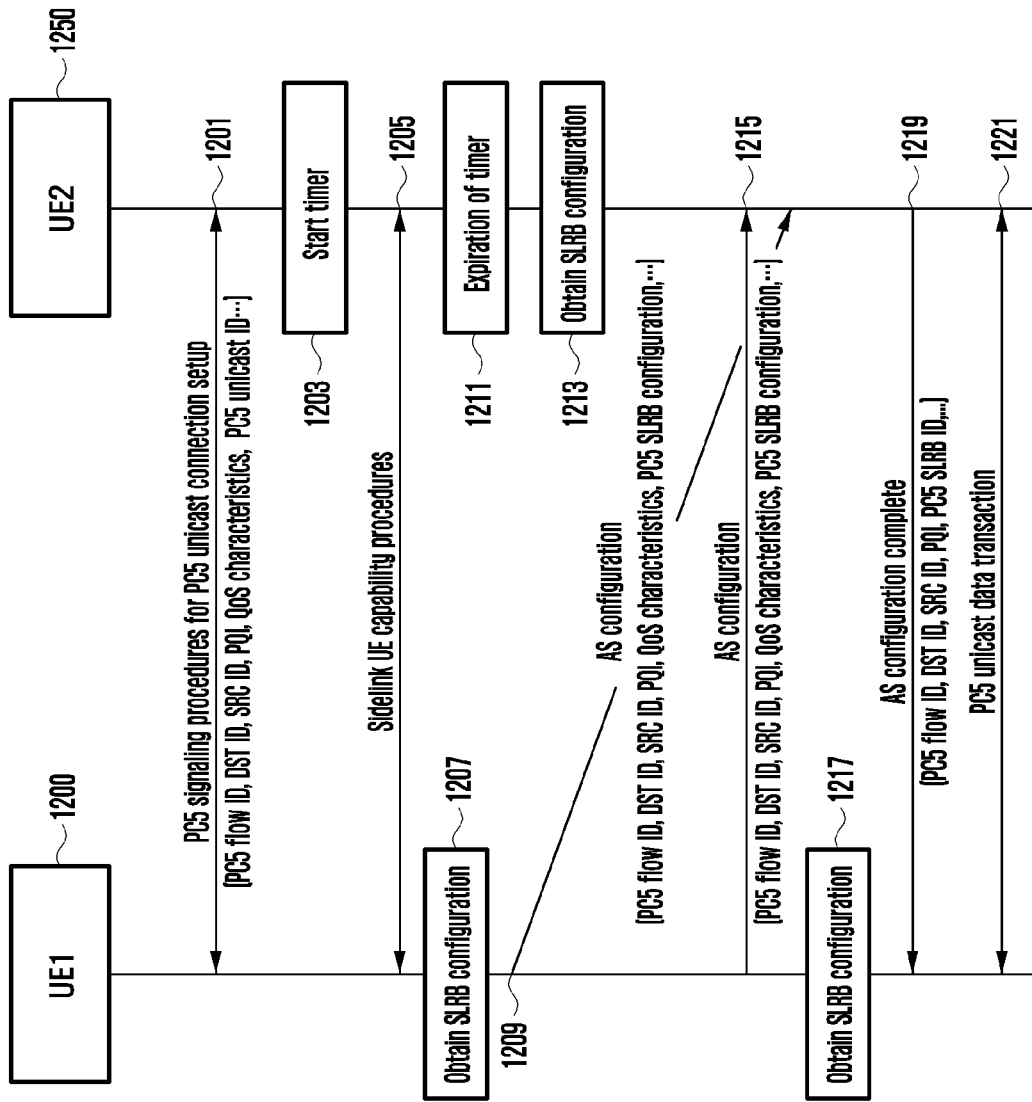
FIG. 12 illustrates a method of SLRB configuration coordination determined and decided by a terminal itself according to various embodiments.

FIG. 10A illustrates a method of SLRB configuration coordination determined and decided by a terminal itself according to various embodiments, FIG. 10B illustrates a method of SLRB configuration coordination determined and decided by a terminal itself according to various embodiments, FIG. 11 illustrates a method of SLRB configuration coordination determined and decided by a terminal itself according to various embodiments, and FIG. 12 illustrates a method of SLRB configuration coordination determined and decided by a terminal itself according to various embodiments.

The UE may correspond to an initiating UE and/or a peer UE that is to perform data transmission or reception through a sidelink unicast connection, and may decide a bi-directional SLRB configuration or uni-directional SLRB configuration which UEs is to use in the sidelink unicast connection. A UE transmitting the first message of PC5-S signaling to start a sidelink unicast connection setup procedure is called an initiating UE. A peer UE indicates a UE receiving the first message of PC5-S signaling, starting the sidelink unicast connection setup procedure, and transmitting a response (acceptance of connection setup) message corresponding to the message. In an embodiment, the initiating UE may include a bi-directional SLRB configuration or uni-directional SLRB configuration in an AS configuration message, and transfer the AS configuration message to the peer UE. In an embodiment, the SLRB configuration may include at least one or a combination of an RLC mode, a bi-directional RLC, a uni-directional RLC, a logical channel corresponding to the RLC mode, and an operational parameter corresponding to the RLC mode. In an embodiment, the peer UE may wait until an AS configuration is received from the initiating UE, and if an AS configuration including a bi-directional SLRB configuration or uni-directional SLRB configuration is received from the initiating UE, the peer UE may perform data transmission or reception based on a sidelink according to the SLRB configuration. In an embodiment, during a wait time interval taken to receive an AS configuration including a bi-directional SLRB configuration or uni-directional SLRB configuration from the initiating UE, the peer UE may operate a timer, and if the AS configuration is received, the peer UE may release the timer. In an embodiment, if the peer UE determines that an AS configuration including a bi-directional SLRB configuration or uni-directional SLRB configuration fails to be received until the timer has expired, the peer UE may obtain a bi-directional SLRB configuration or uni-directional SLRB configuration, and transfer an AS configuration including the bi-directional SLRB configuration or uni-directional SLRB configuration to the initiating UE. In an embodiment, the peer UE may include, in an AS configuration message including a bi-directional SLRB configuration or uni-directional SLRB configuration, information indicating that the transmission of the message is an AS configuration transmission performed after the expiration of the timer, and may transmit the message to the initiating UE. In an embodiment, if an AS configuration including a bi-directional SLRB configuration or uni-directional SLRB configuration is received from the peer UE, the initiating UE may determine to follow the bi-directional SLRB configuration or uni-directional SLRB configuration obtained from the peer UE. In an embodiment, if an AS configuration including a bi-directional SLRB configuration or uni-directional SLRB configuration is received from the peer UE, the initiating UE may perform a configuration information coordination procedure for configuration information required to be coordinated, together with the peer UE. In an embodiment, if the initiating UE receives an AS configuration including a bi-directional SLRB configuration or uni-directional SLRB configuration from the peer UE, and determines that the SLRB configuration is unable to be applied, the initiating UE may transmit a message indicating an AS configuration failure to the peer UE.

In an embodiment, if the peer UE determines that an AS configuration including a bi-directional SLRB configuration or uni-directional SLRB configuration fails to be received until the timer has expired, the peer UE may determine an AS configuration failure, and transfer the AS configuration failure to the initiating UE. In an embodiment, if a message indicating an AS configuration failure is received from the peer UE, the initiating UE may determine not to proceed with the AS configuration setup procedure any longer. In an embodiment, if an AS configuration complete message fails to be received from the peer UE, the initiating UE may determine not to proceed with the AS configuration setup procedure any longer. The initiating UE may operate a separate timer (by starting the timer when an AS configuration message is transmitted, and releasing the timer when an AS configuration complete message is received) to determine whether an AS configuration complete message is received. In an embodiment, in a case where the initiating UE operates a separate timer until an AS configuration complete message is received as a response to an AS configuration message, if it is determined that an AS configuration including a bi-directional SLRB configuration or uni-directional SLRB configuration is received from the peer UE, the initiating UE may release the separate timer. In an embodiment, if the peer UE transmits an AS configuration message including a bi-directional SLRB configuration or uni-directional SLRB configuration to the initiating UE, the peer UE may operate a separate timer (by starting the timer when an AS configuration message is transmitted, and releasing the timer when an AS configuration complete message is received). If the peer UE fails to receive an AS configuration complete message from the initiating UE before the expiration of the separate timer, the peer UE may determine not to proceed with the AS configuration setup procedure any longer. In an embodiment, if the peer UE transmits an AS configuration message including a bi-directional SLRB configuration or uni-directional SLRB configuration, and then receives a message notifying of an AS configuration failure from the initiating UE, the peer UE may determine not to proceed with the AS configuration setup procedure any longer.

A timer operation performed by a UE for configuring a bi-directional SLRB configuration or uni-directional SLRB configuration may employ at least one of the following methods. The timer may be operated for a corresponding sidelink connection requiring the configuring of a bi-directional SLRB configuration or uni-directional SLRB configuration. The corresponding sidelink connection may be distinguished by at least one or a combination of a destination ID, a source ID, a PC5 flow ID, a PC5 unicast ID, and a PQI. In an embodiment, a timer operated by the peer UE until a bi-directional SLRB configuration or uni-directional SLRB configuration is received may start after a PC5-S unicast connection setup procedure. In an embodiment, a timer operated by the peer UE until a bi-directional SLRB configuration or uni-directional SLRB configuration is received may start after UE capability information of the peer UE is transmitted to the initiating UE. In an embodiment, a timer operated by the peer UE until a bi-directional SLRB configuration or uni-directional SLRB configuration is received may start after UE capability information is received from the initiating UE. The timer may be released when an AS configuration message including a bi-directional SLRB configuration or uni-directional SLRB configuration is received from the initiating UE.

In a case where the initiating UE or the peer UE receives an AS configuration message including a bi-directional SLRB configuration or uni-directional SLRB configuration, and transmits a message indicating an AS configuration failure in response to the message, the AS configuration complete message described above may include at least one of an AS configuration failure indicator, and/or indication information (the information is at least one of an RLC mode, a bi-directional RLC, a uni-directional RLC, and logical channel information mapped to an RLC mode) relating to configuration information causing an AS configuration failure.

Referring to FIG. 10A, a UE1 1000 and UE2 1030 may perform a PC5 signaling procedure for configuring a sidelink-based unicast connection, in operation 1001. Information exchanged between the two UEs 1000 and 1030 in the PC5 signaling procedure may include at least one or a combination of a PC5 flow ID, a destination ID, a source ID, a PQI, QoS characteristics, and a PC5 unicast ID. The UE1 1000 and the UE2 1030 may perform a sidelink UE capability information exchange procedure in a PC5 RRC connection procedure, in operation 1003.

The UE1 1000 may obtain an SLRB configuration including a bi-directional SLRB configuration or uni-directional SLRB configuration, in operation 1005. According to an embodiment, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration. In operation 1007, the UE1 1000 may transmit an AS configuration message to the UE2 1030 to perform an AS configuration procedure in the PC5 RRC connection procedure together with the UE2 1030. The AS configuration message may include at least one or a combination of a PC5 flow ID, a destination ID, a source ID, a PQI, QoS characteristics, a PC5 SLRB configuration, and a PC5 SLRB ID.

When the AS configuration message is received, the UE2 1030 may obtain the SLRB configuration including the bi-directional SLRB configuration or uni-directional SLRB configuration, in operation 1009. The UE2 1030 may transmit an AS configuration complete message to the UE1 1000 as a response to the AS configuration message, in operation 1011. The AS configuration complete message may include at least one or a combination of information corresponding to the AS configuration message, a PC5 flow ID, a destination ID, a source ID, a PQI, a PC5 SLRB configuration, and a PC5 SLRB ID. In operation 1013, the UE1 1000 and the UE2 1030 may perform sidelink data transmission or reception by applying an AS configuration including the bi-directional SLRB configuration or uni-directional SLRB configuration.

Referring to FIG. 10B, a UE1 1050 and UE2 1080 may perform a PC5 signaling procedure for configuring a sidelink-based unicast connection, in operation 1051. Information exchanged between the two UEs 1050 and 1080 in the PC5 signaling procedure may include at least one or a combination of a PC5 flow ID, a destination ID, a source ID, a PQI, QoS characteristics, and a PC5 unicast ID. The UE2 1080 may start a timer for configuring an AS configuration, in operation 1053. The UE1 1050 and the UE2 1080 may perform a sidelink UE capability information exchange procedure in a PC5 RRC connection procedure, in operation 1055.

The UE1 1050 may obtain an SLRB configuration including a bi-directional SLRB configuration or uni-directional SLRB configuration, in operation 1057. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration. In operation 1059, the UE1 1050 may transmit an AS configuration message to the UE2 1080 to perform an AS configuration procedure in the PC5 RRC connection procedure together with the UE2 1080. The AS configuration message may include at least one or a combination of a PC5 flow ID, a destination ID, a source ID, a PQI, QoS characteristics, a PC5 SLRB configuration, and a PC5 SLRB ID.

If an AS configuration message including a bi-directional SLRB configuration or uni-directional SLRB configuration is received, the UE2 1080 may release the timer in operation 1061. The UE2 1080 may obtain the bi-directional SLRB configuration or uni-directional SLRB configuration included in the AS configuration message, in operation 1063. The UE2 1080 may transmit an AS configuration complete message to the UE1 1050 as a response to the AS configuration message, in operation 1065. The AS configuration complete message may include at least one or a combination of information corresponding to the AS configuration message, a PC5 flow ID, a destination ID, a source ID, a PQI, a PC5 SLRB configuration, and a PC5 SLRB ID. In operation 1067, the UE1 1050 and the UE2 1080 may perform sidelink data transmission or reception by applying an AS configuration including the bi-directional SLRB configuration or uni-directional SLRB configuration.

Referring to FIG. 11, a UE1 1100 and UE2 1150 may perform a PC5 signaling procedure for configuring a sidelink-based unicast connection, in operation 1101. Information exchanged between the two UEs 1100 and 1150 in the PC5 signaling procedure may include at least one or a combination of a PC5 flow ID, a destination ID, a source ID, a PQI, QoS characteristics, and a PC5 unicast ID. The UE2 1150 may start a timer for configuring an AS configuration, in operation 1103. The UE1 1105 and the UE2 1107 may perform a sidelink UE capability information exchange procedure in a PC5 RRC connection procedure, in operation 1105.

The UE2 1150 may determine the expiration of the timer in operation 1107, and may determine that an AS configuration message including a bi-directional SLRB configuration or uni-directional SLRB configuration is not received from the UE1 1100. The UE2 1150 may obtain an SLRB configuration including a bi-directional SLRB configuration or uni-directional SLRB configuration, in operation 1109. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

The UE2 1150 may transmit an AS configuration message including the obtained bi-directional SLRB configuration or uni-directional SLRB configuration to the UE1 1100, in operation 1111. The AS configuration message may include at least one or a combination of a PC5 flow ID, a destination ID, a source ID, a PQI, QoS characteristics, a PC5 SLRB configuration, and a PC5 SLRB ID. According to an embodiment, the AS configuration message may include information indicating that the transmission of the message is an AS configuration transmission performed after the expiration of the timer.

When the AS configuration message is received, the UE1 1100 may obtain the SLRB configuration including the bi-directional SLRB configuration or uni-directional SLRB configuration, in operation 1113. The UE1 1100 may transmit an AS configuration complete message to the UE2 1150 as a response to the AS configuration message, in operation 1115. The AS configuration complete message may include at least one or a combination of information corresponding to the AS configuration message, a PC5 flow ID, a destination ID, a source ID, a PQI, a PC5 SLRB configuration, and a PC5 SLRB ID. In operation 1117, the UE1 1100 and the UE2 1150 may perform sidelink data transmission or reception by applying an AS configuration including the bi-directional SLRB configuration or uni-directional SLRB configuration.

Referring to FIG. 12, a UE1 1200 and UE2 1250 may perform a PC5 signaling procedure for configuring a sidelink-based unicast connection, in operation 1201. Information exchanged between the two UEs 1200 and 1250 in the PC5 signaling procedure may include at least one or a combination of a PC5 flow ID, a destination ID, a source ID, a PQI, QoS characteristics, and a PC5 unicast ID. The UE2 1250 may start a timer for configuring an AS configuration, in operation 1203. The UE1 1200 and the UE2 1250 may perform a sidelink UE capability information exchange procedure in a PC5 RRC connection procedure, in operation 1205.

The UE1 1200 may obtain an SLRB configuration including a bi-directional SLRB configuration or uni-directional SLRB configuration, in operation 1207. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration. In operation 1209, the UE1 1200 may transmit an AS configuration message to the UE2 1250 to perform an AS configuration procedure in the PC5 RRC connection procedure together with the UE2 1250. The AS configuration message may include at least one or a combination of a PC5 flow ID, a destination ID, a source ID, a PQI, QoS characteristics, a PC5 SLRB configuration, and a PC5 SLRB ID.

The UE2 1250 may determine the expiration of the timer in operation 1211, and may determine that an AS configuration message including a bi-directional SLRB configuration or uni-directional SLRB configuration is not received from the UE1 1210. The UE2 1250 may obtain an SLRB configuration including a bi-directional SLRB configuration or uni-directional SLRB configuration, in operation 1213. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

The UE2 1250 may transmit an AS configuration message including the obtained bi-directional SLRB configuration or uni-directional SLRB configuration to the UE1 1200, in operation 1215. The AS configuration message may include at least one or a combination of a PC5 flow ID, a destination ID, a source ID, a PQI, QoS characteristics, a PC5 SLRB configuration, and a PC5 SLRB ID. Information including at least one or a combination of the PC5 flow ID, the destination ID, the source ID, the PQI, and the QoS characteristics may be configured to be the same as the information exchanged between the UE1 1200 and the UE2 1250 in operation 1201. According to an embodiment, the UE2 1250 may include, in the AS configuration message transmitted in operation 1215, information indicating that the transmission of the message is an AS configuration transmission after the expiration of a bi-directional SLRB configuration setup timer or the expiration of a uni-directional SLRB configuration setup timer.

If, after the AS configuration message including the bi-directional SLRB configuration or the uni-directional SLRB configuration is transmitted in operation 1215, the AS configuration message transmitted by the UE1 1200 is received (operation 1209), the UE2 1250 may ignore the AS configuration message transmitted by the UE1 1200. If, after the AS configuration message including the bi-directional SLRB configuration or the uni-directional SLRB configuration is transmitted in operation 1209, a bi-directional SLRB configuration or uni-directional SLRB configuration related to the same sidelink connection is received from the UE2 1250, the UE1 1200 may determine to ignore the SLRB configuration transmitted in operation 1209, and may obtain the bi-directional SLRB configuration or uni-directional SLRB configuration received from the UE2 1250 in operation 1215, in operation 1217.

The UE1 1200 may transmit an AS configuration complete message to the UE2 1250 as a response to the AS configuration message of operation 1215, in operation 1219. The AS configuration complete message may include at least one or a combination of information corresponding to the AS configuration message of the operation 1215, a PC5 flow ID, a destination ID, a source ID, a PQI, a PC5 SLRB configuration, and a PC5 SLRB ID. In operation 1221, the UE1 1200 and the UE2 1250 may perform sidelink data transmission or reception by applying an AS configuration including the bi-directional SLRB configuration or uni-directional SLRB configuration.

In the embodiments illustrated in FIGS. 10, 11, and 12, if after transmitting an AS configuration message, the UE1 fails to receive an AS configuration complete message from the UE2, or the UE1 receives an AS configuration complete message indicating an AS configuration failure from the UE2, the UE1 and the UE2 may not proceed with the AS configuration setup procedure any longer. In the embodiment illustrated in FIG. 12, if after transmitting an AS configuration message, the UE2 fails to receive an AS configuration complete message from the UE1, or the UE2 receives an AS configuration complete message indicating an AS configuration failure from the UE1, the UE1 and the UE2 may not proceed with the AS configuration setup procedure any longer.

Figure 13:
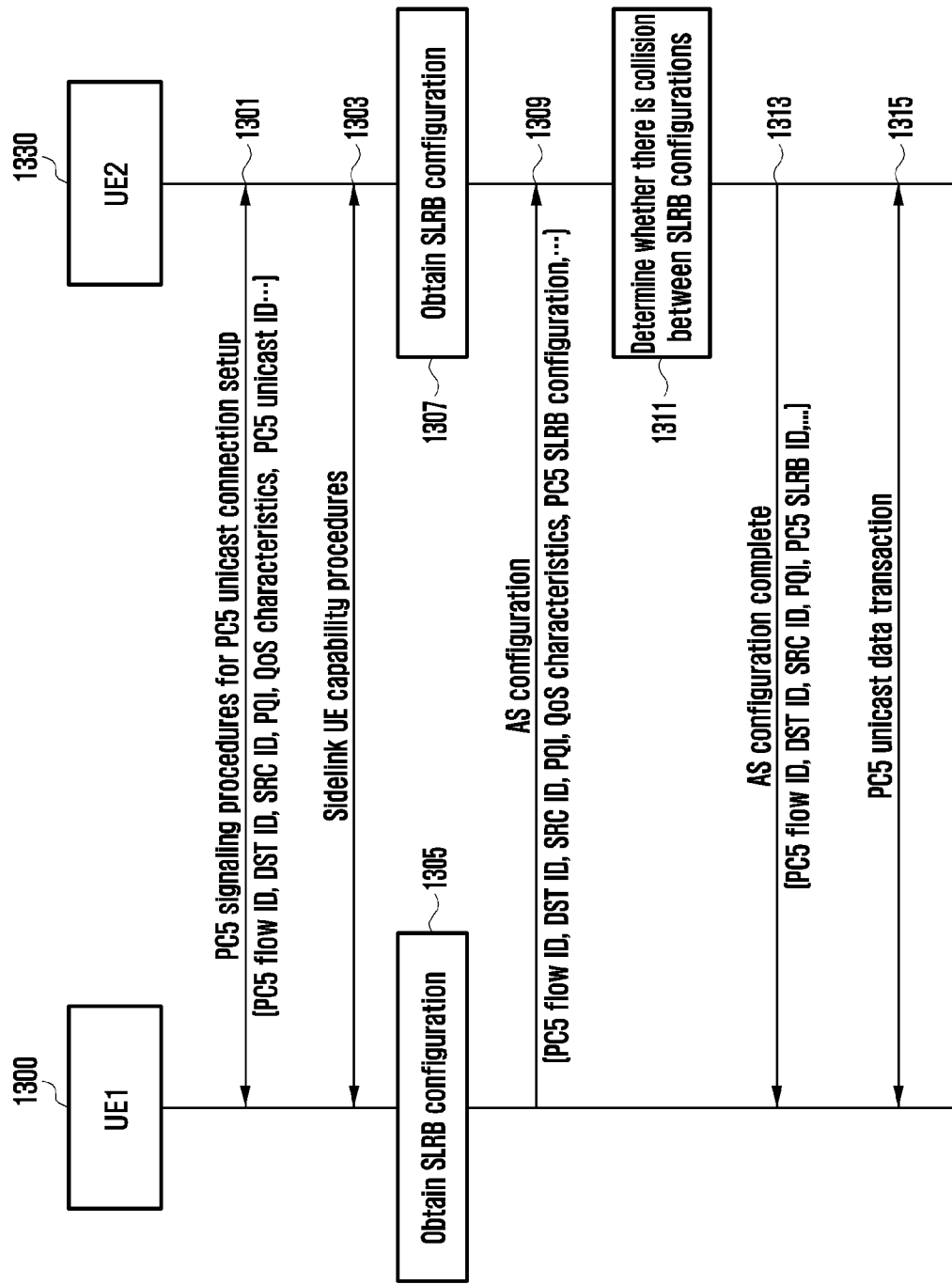
FIG. 13 illustrates a method of SLRB configuration coordination determined and decided by a terminal itself according to various embodiments.
Figure 14:
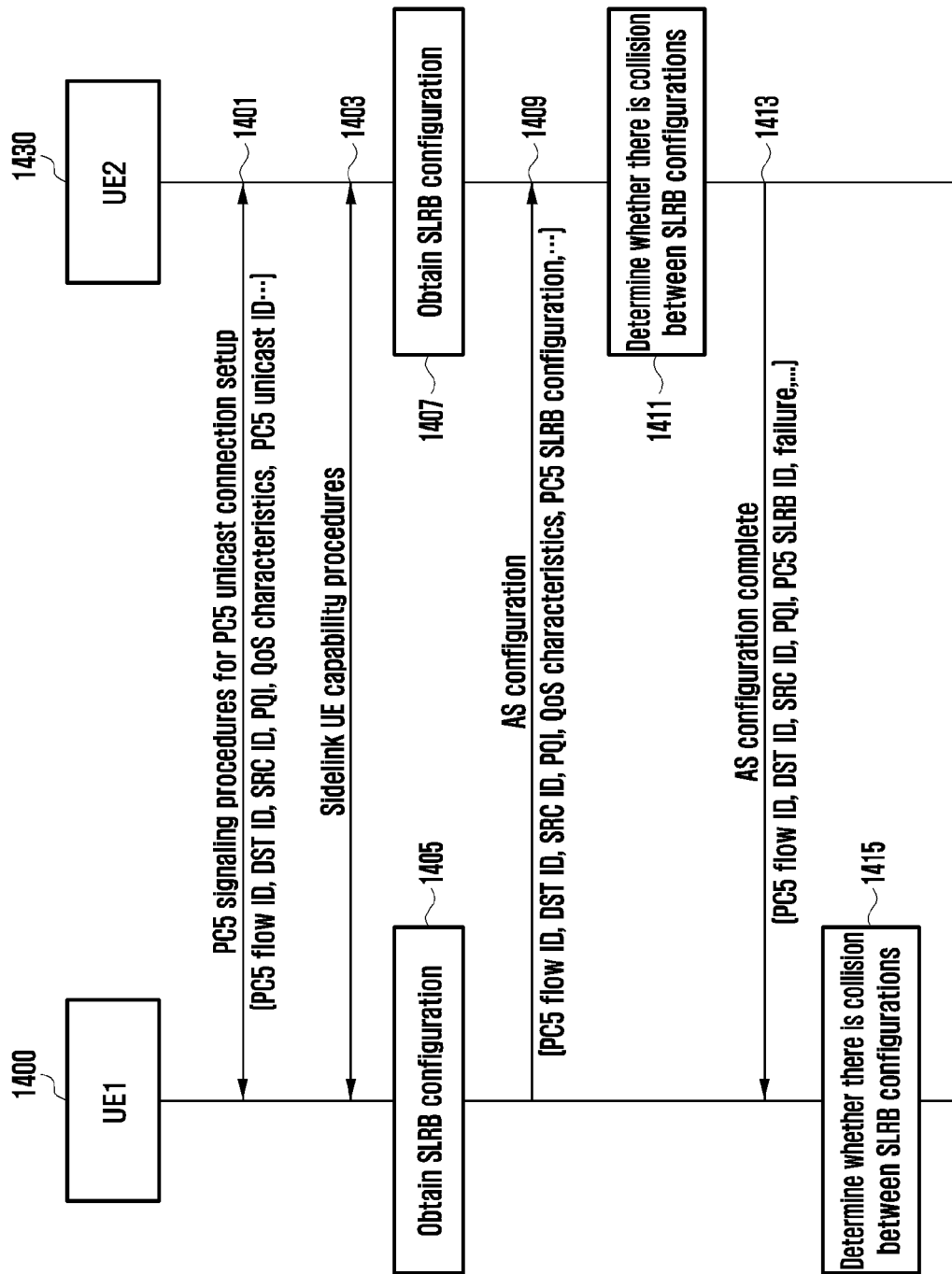
FIG. 14 illustrates a method of SLRB configuration coordination determined and decided by a terminal itself according to various embodiments.
Figure 15A:
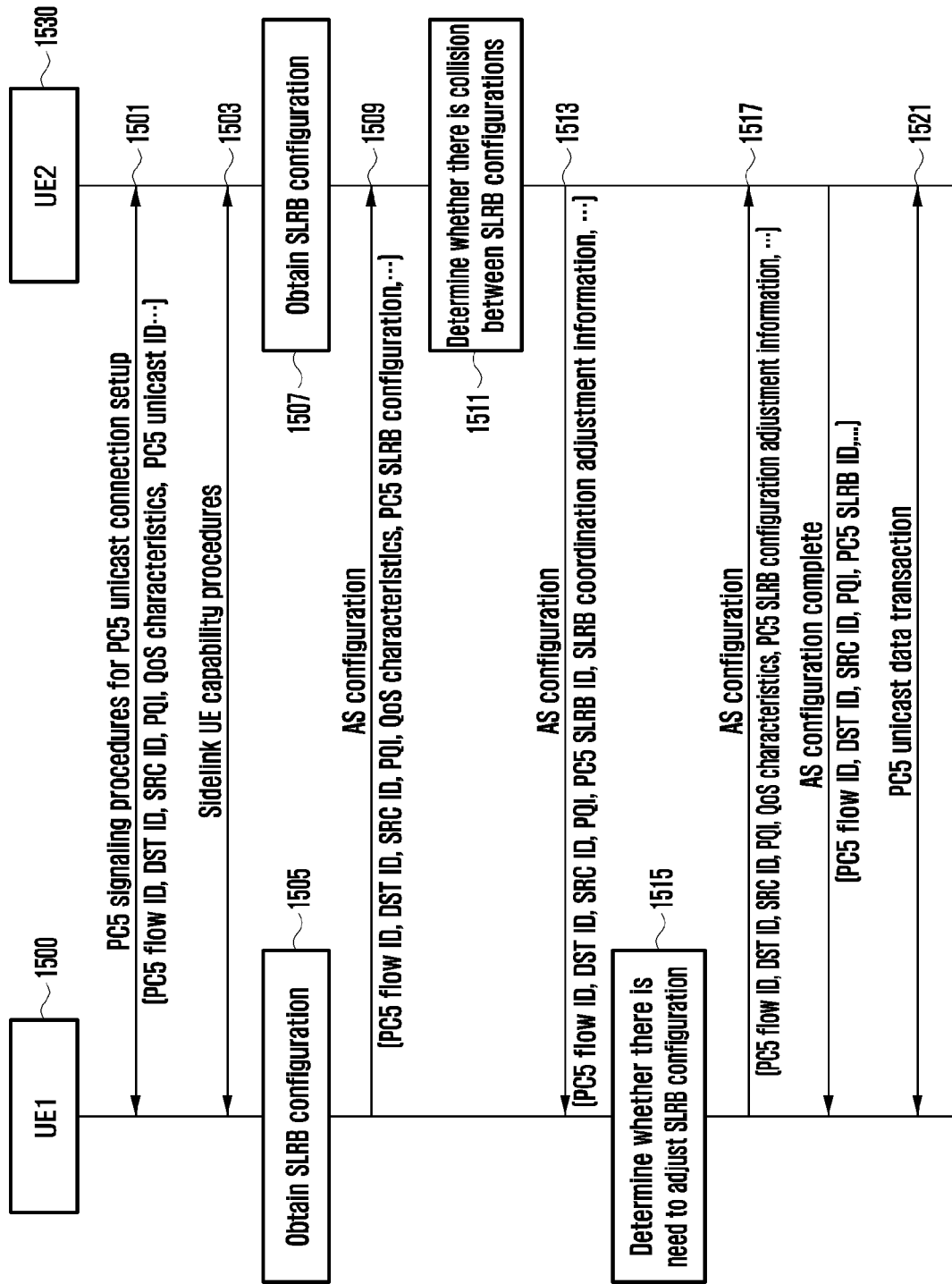
FIG. 15A illustrates a method of SLRB configuration coordination determined and decided by a terminal itself according to various embodiments.
Figure 15B:
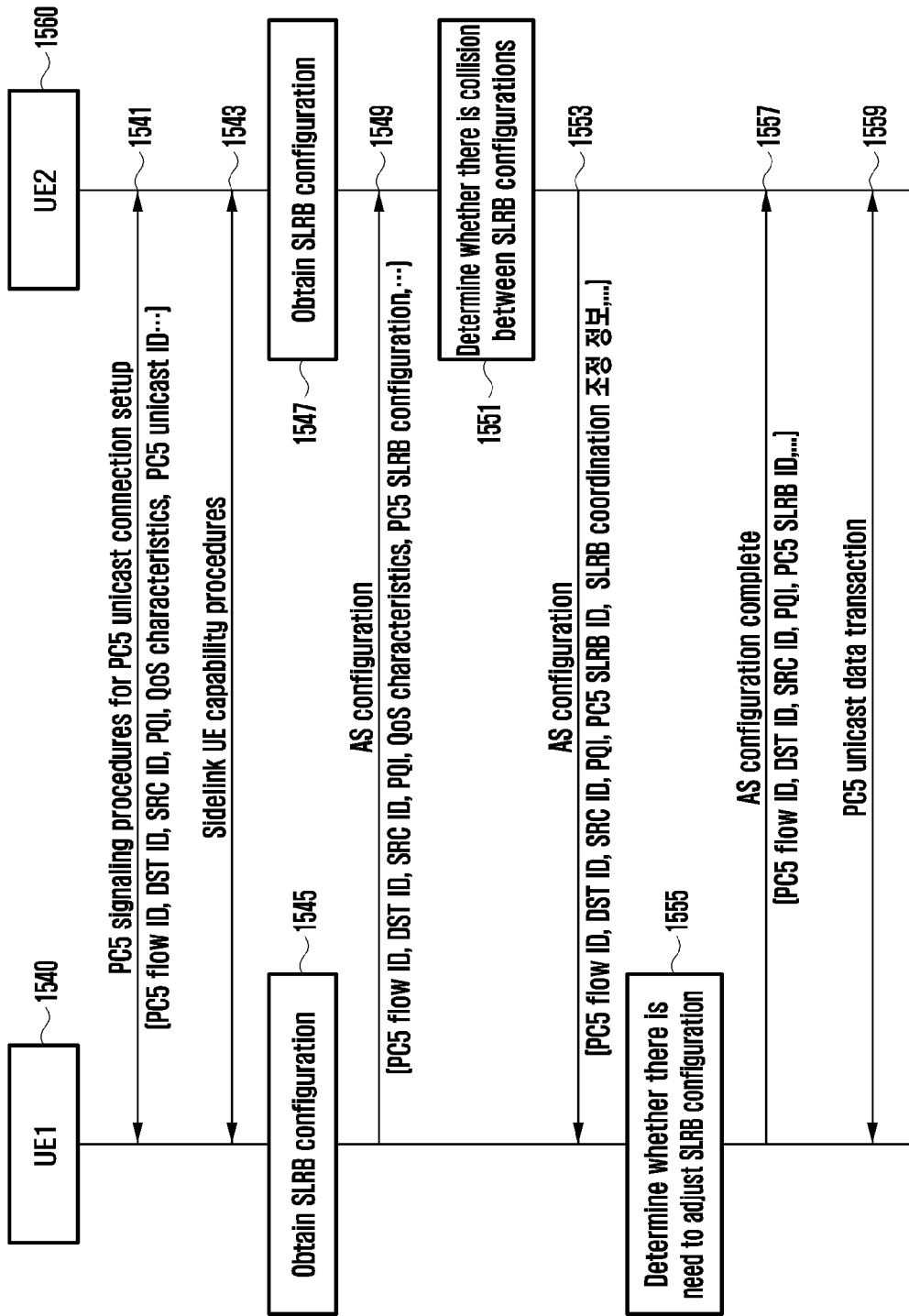
FIG. 15B illustrates a method of SLRB configuration coordination determined and decided by a terminal itself according to various embodiments.
Figure 15C:
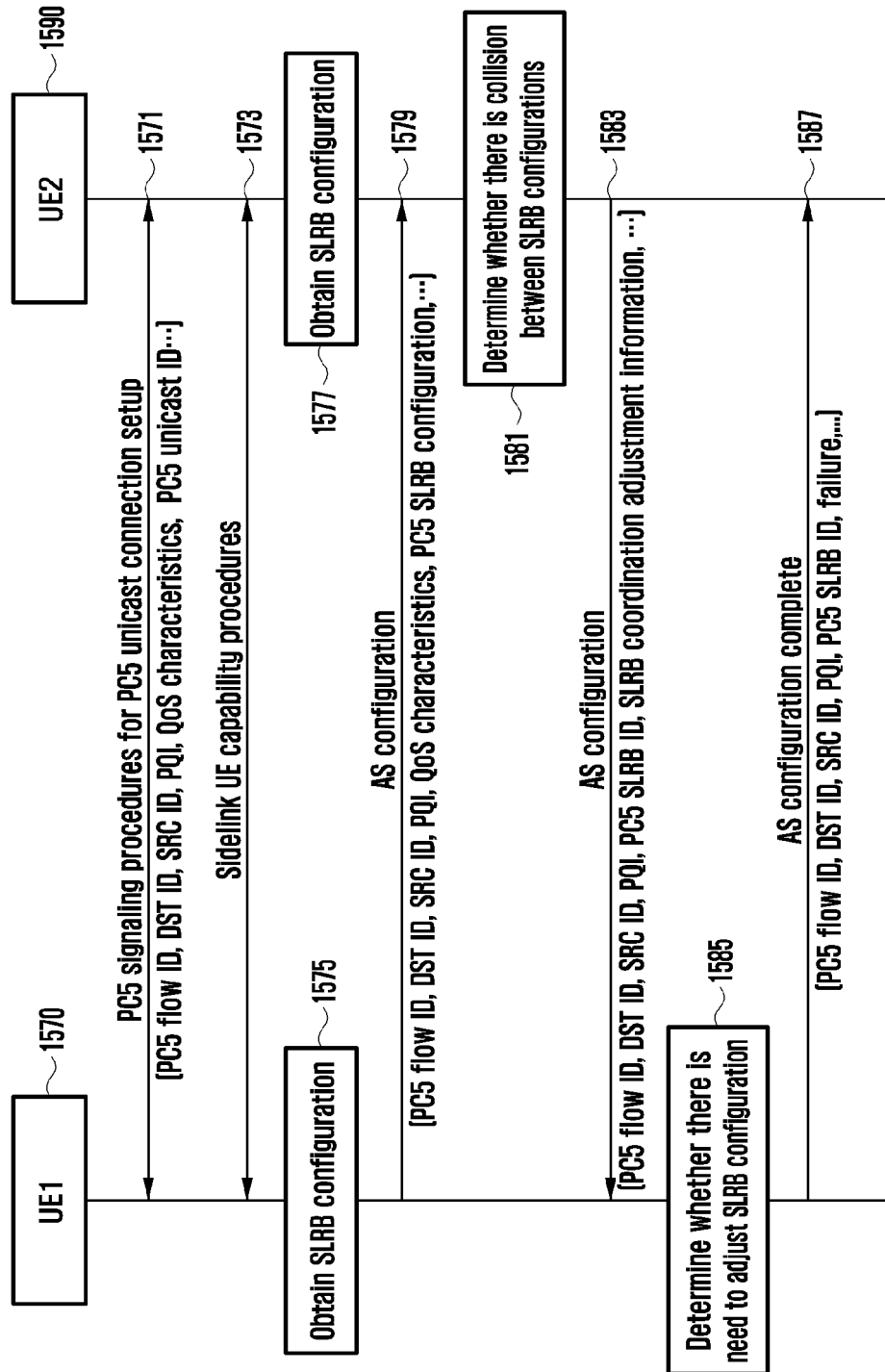
FIG. 15C illustrates a method of SLRB configuration coordination determined and decided by a terminal itself according to various embodiments.

FIG. 13 illustrates a method of SLRB configuration coordination determined and decided by a terminal itself according to various embodiments, FIG. 14 illustrates a method of SLRB configuration coordination determined and decided by a terminal itself according to various embodiments, FIG. 15A illustrates a method of SLRB configuration coordination determined and decided by a terminal itself according to various embodiments, FIG. 15B illustrates a method of SLRB configuration coordination determined and decided by a terminal itself according to various embodiments, and FIG. 15C illustrates a method of SLRB configuration coordination determined and decided by a terminal itself according to various embodiments.

The embodiments illustrated in FIGS. 13 to 15 provide a method for obtaining, by an initiating UE and a peer UE configuring a sidelink unicast connection, respective sidelink configuration information, determining whether there is a collision of bi-directional SLRB configuration information or uni-directional SLRB configuration information in an AS configuration setup procedure performed between the two UEs, and processing a collision/non-collision.

For example, the initiating UE may transfer an SLRB configuration obtained by itself to the peer UE, and the peer UE may determine whether an SLRB configuration obtained by itself collides with the SLRB configuration received from the initiating UE. For example, if it is determined that the SLRB configuration received from the initiating UE and the SLRB configuration obtained by the peer UE itself do not collide, the peer UE may transfer, to the initiating UE, a response message confirming the application of the SLRB configuration. For example, if it is determined that the SLRB configuration received from the initiating UE and the SLRB configuration obtained by the peer UE itself collide with each other, the peer UE may transmit, to the initiating UE, a message indicating an AS configuration failure.

For example, if it is determined that the SLRB configuration received from the initiating UE and the SLRB configuration obtained by the peer UE itself collide with each other, the peer UE may determine to perform an SLRB configuration adjustment procedure together with the initiating UE. For example, the peer UE may transfer an SLRB configuration adjustment message including adjustable parameter information to the initiating UE. For example, the initiating UE may receive a response message confirming the application of the SLRB configuration obtained by the initiating UE itself, from the peer UE. For example, the initiating UE may receive a message indicating an AS configuration failure from the peer UE. For example, the initiating UE may receive an SLRB configuration adjustment message including adjustable parameter information to from the peer UE.

For example, when an SLRB configuration adjustment message including adjustable parameter information is received from the peer UE, the initiating UE may determine whether the initiating UE can accept an adjustable parameter, and may transmit an SLRB configuration adjustment response message including the acceptance of the parameter to the peer UE. For example, when an SLRB configuration adjustment message including adjustable parameter information is received from the peer UE, the initiating UE may determine whether the initiating UE can accept an adjustable parameter, and may transmit an SLRB configuration adjustment response message indicating an AS configuration failure caused by "unable to accept the parameter" to the peer UE.

For example, when an SLRB configuration adjustment message including adjustable parameter set information is received from the peer UE, the initiating UE may select a parameter to be applied in an adjustable parameter set, and may transmit an SLRB configuration adjustment message including information of the selected parameter to the peer UE. The peer UE may receive, from the initiating UE, an SLRB configuration adjustment message including information of a parameter to be applied in the adjustable parameter set. For example, if the initiating UE fails to receive, from the peer UE, a response message related to an AS configuration including a bi-directional SLRB configuration obtained by the initiating UE itself, the initiating UE may determine an AS configuration failure.

Referring to FIG. 13, a UE1 1300 and UE2 1330 may perform a PC5 signaling procedure for configuring a sidelink-based unicast connection, in operation 1301. Information exchanged between the two UEs 1300 and 1330 in the PC5 signaling procedure may include at least one or a combination of a PC5 flow ID, a destination ID, a source ID, a PQI, QoS characteristics, and a PC5 unicast ID. The UE1 1300 and the UE2 1330 may perform a sidelink UE capability information exchange procedure in a PC5 RRC connection procedure, in operation 1303. The UE1 1300 may obtain an SLRB configuration including a bi-directional SLRB configuration or uni-directional SLRB configuration, in operation 1305. The UE2 1330 may obtain an SLRB configuration including a bi-directional SLRB configuration or uni-directional SLRB configuration, in operation 1307. The SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

In operation 1309, the UE1 1300 may transmit an AS configuration message to the UE2 1330 to perform an AS configuration procedure in the PC5 RRC connection procedure together with the UE2 1330. The AS configuration message may include at least one or a combination of a PC5 flow ID, a destination ID, a source ID, a PQI, QoS characteristics, a PC5 SLRB configuration, and a PC5 SLRB ID.

If the AS configuration message is received, the UE2 1330 may determine whether the SLRB configuration obtained in operation 1307 collides with the SLRB configuration included in the AS configuration message, in operation 1311. A target parameter determining whether the SLRB configurations collide with each other may include at least one of configuration parameters of RLC mode operations in addition to at least one or a combination of an RLC mode (RLC AM or RLC UM), a bi-directional RLC, a uni-directional RLC, and a logical channel corresponding to the RLC mode.

If it is determined that the SLRB configurations do not collide with each other in operation 1311, the UE 2 1330 may transfer an AS configuration complete message to the UE1 1300 as a response to the AS configuration message received in operation 1309, in operation 1313. The AS configuration complete message may include at least one or a combination of information corresponding to the AS configuration message, a PC5 flow ID, a destination ID, a source ID, a PQI, a PC5 SLRB configuration, and a PC5 SLRB ID. In operation 1315, the UE1 1300 and the UE2 1330 may perform sidelink data transmission or reception by applying an AS configuration including the SLRB configuration.

Referring to FIG. 14, a UE1 1400 and UE2 1430 may perform a PC5 signaling procedure for configuring a sidelink-based unicast connection, in operation 1401. Information exchanged between the two UEs 1400 and 1430 in the PC5 signaling procedure may include at least one or a combination of a PC5 flow ID, a destination ID, a source ID, a PQI, QoS characteristics, and a PC5 unicast ID. The UE1 1400 and the UE2 1430 may perform a sidelink UE capability information exchange procedure in a PC5 RRC connection procedure, in operation 1403.

The UE1 1400 may obtain an SLRB configuration including a bi-directional SLRB configuration or uni-directional SLRB configuration, in operation 1405. The UE2 1430 may obtain an SLRB configuration including a bi-directional SLRB configuration or uni-directional SLRB configuration, in operation 1407. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

In operation 1409, the UE1 1400 may transmit an AS configuration message to the UE2 1430 to perform an AS configuration procedure in the PC5 RRC connection procedure together with the UE2 1430. The AS configuration message may include at least one or a combination of a PC5 flow ID, a destination ID, a source ID, a PQI, QoS characteristics, a PC5 SLRB configuration, and a PC5 SLRB ID.

If the AS configuration message is received, the UE2 1430 may determine whether the SLRB configuration obtained in operation 1407 collides with the SLRB configuration included in the AS configuration message, in operation 1411. A target parameter determining whether the SLRB configurations collide with each other may include at least one of configuration parameters of RLC mode operations in addition to at least one or a combination of an RLC mode (RLC AM or RLC UM), a bi-directional RLC, a uni-directional RLC, and a logical channel corresponding to the RLC mode. If it is determined that the SLRB configurations collide with each other in operation 1411, the UE 2 1430 may determine an AS configuration failure, and transfer an AS configuration complete message to the UE1 1400 as a response to the AS configuration message received in operation 1409, in operation 1413. The AS configuration complete message may include at least one or a combination of information corresponding to the AS configuration message, a PC5 flow ID, a destination ID, a source ID, a PQI, a PC5 SLRB ID, and failure indication information. For example, the UE2 1430 may include, in the AS configuration complete message, information of a parameter causing the collision between the SLRB configurations.

If the AS configuration complete message indicating an AS configuration failure is received from the UE2 1430, the UE1 1400 may determine an AS configuration failure and stop the AS configuration procedure (operation 1413). If the AS configuration complete message includes information indicating that the cause of an AS configuration failure corresponds to an SLRB configuration parameter, the UE1 1400 may determine that there has been a collision between the SLRB configurations (operation 1415). In an embodiment, the UE1 1400 may report, to an NW, that an AS configuration failure has occurred due to a collision between the SLRB configurations. Information reported to the NW may include at least one or a combination of a PQI, PC5 QoS characteristics, a PC5 flow ID, and a configuration parameter by which the collision has occurred, such as, an RLC mode, a bi-directional RLC, a uni-directional RLC, a logical channel corresponding to the RLC mode, and an operational parameter corresponding to the RLC mode.

Referring to FIG. 15A, a UE1 1500 and UE2 1530 may perform a PC5 signaling procedure for configuring a sidelink-based unicast connection, in operation 1501. Information exchanged between the two UEs 1500 and 1530 in the PC5 signaling procedure may include at least one or a combination of a PC5 flow ID, a destination ID, a source ID, a PQI, QoS characteristics, and a PC5 unicast ID. The UE1 1500 and the UE2 1530 may perform a sidelink UE capability information exchange procedure in a PC5 RRC connection procedure, in operation 1503. The UE1 1500 may obtain an SLRB configuration including a bi-directional SLRB configuration or uni-directional SLRB configuration, in operation 1505. The UE2 1530 may obtain an SLRB configuration including a bi-directional SLRB configuration or uni-directional SLRB configuration, in operation 1507. For example, the SLRB configuration may include at least one or a combination of an RLC mode, a bi-directional RLC, a uni-directional RLC, a logical channel corresponding to the RLC mode, and an RLC operational parameter corresponding to the RLC mode. The SLRB configuration may be obtained through at least one of a dedicated RRC message, an SIB, and a preconfiguration.

In operation 1509, the UE1 1500 may transmit an AS configuration message to the UE2 1530 to perform an AS configuration procedure in the PC5 RRC connection procedure together with the UE2 1530. The AS configuration message may include at least one or a combination of a PC5 flow ID, a destination ID, a source ID, a PQI, QoS characteristics, a PC5 SLRB configuration, and a PC5 SLRB ID.

If the AS configuration message is received, the UE2 1530 may determine whether the SLRB configuration obtained in operation 1507 collides with the SLRB configuration included in the AS configuration message, in operation 1511. A target parameter determining whether the SLRB configurations collide with each other may include at least one or a combination of an RLC mode (RLC AM or RLC UM), a bi-directional RLC, a uni-directional RLC, a logical channel corresponding to the RLC mode, and a configuration parameter required for the operation of the RLC mode.

If it is determined that the SLRB configurations collide with each other in operation 1511, the UE2 1530 may identify information of a configuration parameter required to be adjusted due to a mismatch. The UE2 1530 may transmit an AS configuration message including the information of the configuration parameter required to be adjusted, in operation 1513. The AS configuration message of operation 1513 may include information of a configuration parameter required to be adjusted, corresponding to the at least one or combination of the PC5 flow ID, the destination ID, the source ID, the PQI, the QoS characteristics, the PC5 SLRB configuration, and the PC5 SLRB ID, which is received in operation 1509. The information of the configuration parameter required to be adjusted may include at least one of an adjustable RLC mode (RLC AM or RLC UM), a bi-directional RLC, a uni-directional RLC, a logical channel corresponding to the RLC mode, and a configuration parameter required for the operation of the RLC mode.

The UE1 1500 having received the AS configuration message of operation 1513 may determine that the SLRB configurations are required to be adjusted, in operation 1515. The UE1 1500 may perform a parameter adjustment of the configuration parameter determined to be required to be adjusted, and may transmit an AS configuration message including information relating to the parameter adjustment to the UE2 1530, in operation 1517. The AS configuration message of operation 1517 may include information of an adjusted configuration parameter, corresponding to the at least one or combination of the PC5 flow ID, the destination ID, the source ID, the PQI, the QoS characteristics, the PC5 SLRB configuration, and the PC5 SLRB ID, which is received in operation 1513. The information of the adjusted configuration parameter required to be adjusted may include at least one of an RLC mode (RLC AM or RLC UM), a bi-directional RLC, a uni-directional RLC, a logical channel corresponding to the RLC mode, and a configuration parameter required for the operation of the RLC mode.

If the AS configuration message of operation 1517 is received, the UE2 1530 may transmit an AS configuration complete message as a response to the above message (operation 1519). The AS configuration complete message may include at least one or a combination of a PC5 flow ID, a destination ID, a source ID, a PQI, QoS characteristics, a PC5 SLRB configuration, and a PC5 SLRB ID. In operation 1521, the UE1 1500 and the UE2 1530 may perform sidelink data transmission or reception by applying an AS configuration including the SLRB configuration.

Referring to FIG. 15B, a UE1 1540 and UE2 1560 may perform a PC5 signaling procedure for configuring a sidelink-based unicast connection, in operation 1541. Information exchanged between the two UEs 1540 and 4560 in the PC5 signaling procedure may include at least one or a combination of a PC5 flow ID, a destination ID, a source ID, a PQI, QoS characteristics, and a PC5 unicast ID. The UE1 1540 and the UE2 1560 may perform a sidelink UE capability information exchange procedure in a PC5 RRC connection procedure, in operation 1543. The UE1 1540 may obtain an SLRB configuration including a bi-directional SLRB configuration or uni-directional SLRB configuration, in operation 1545. The UE2 1560 may obtain an SLRB configuration including a bi-directional SLRB configuration or uni-directional SLRB configuration, in operation 1547. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

In operation 1549, the UE1 1540 may transmit an AS configuration message to the UE2 1560 to perform an AS configuration procedure in the PC5 RRC connection procedure together with the UE2 1560. The AS configuration message may include at least one or a combination of a PC5 flow ID, a destination ID, a source ID, a PQI, QoS characteristics, a PC5 SLRB configuration, and a PC5 SLRB ID.

If the AS configuration message is received, the UE2 1560 may determine whether the SLRB configuration obtained in operation 1547 collides with the SLRB configuration included in the AS configuration message, in operation 1551. A target parameter determining whether the SLRB configurations collide with each other may include at least one or a combination of an RLC mode (RLC AM or RLC UM), a bi-directional RLC, a uni-directional RLC, a logical channel corresponding to the RLC mode, and a configuration parameter required for operation of the RLC mode. If it is determined that the SLRB configurations collide with each other in operation 1551, the UE2 1560 may identify information of a configuration parameter required to be adjusted due to a mismatch.

The UE2 1560 may transmit an AS configuration message including the information of the configuration parameter required to be adjusted, in operation 1553. The AS configuration message of operation 1553 may include information of a configuration parameter required to be adjusted, corresponding to the at least one or combination of the PC5 flow ID, the destination ID, the source ID, the PQI, the QoS characteristics, the PC5 SLRB configuration, and the PC5 SLRB ID, which is received in operation 1549. The information of the configuration parameter required to be adjusted may include at least one of an adjustable RLC mode (RLC AM or RLC UM), a bi-directional RLC, a uni-directional RLC, a logical channel corresponding to the RLC mode, and a configuration parameter required for the operation of the RLC mode.

The UE1 1540 having received the AS configuration message of operation 1553 may determine whether the SLRB configuration is adjustable, based on the information of the configuration parameter of the AS configuration received in operation 1553, in operation 1555. If it is determined that the adjustment of the configuration parameter is possible, the UE1 1540 may transmit an AS configuration complete message to the UE2 1560, in operation 1557. The AS configuration complete message may include at least one or a combination of the PC5 flow ID, the destination ID, the source ID, the PQI, the QoS characteristics, the PC5 SLRB configuration, and the PC5 SLRB ID, which are included in the AS configuration message received in operation 1553. In operation 1559, the UE1 1540 and the UE2 1560 may perform sidelink data transmission or reception by applying an AS configuration including the SLRB configuration.

Referring to FIG. 15C, a UE1 1570 and UE2 1590 may perform a PC5 signaling procedure for configuring a sidelink-based unicast connection, in operation 1571. Information exchanged between the two UEs 1570 and 1590 in the PC5 signaling procedure may include at least one or a combination of a PC5 flow ID, a destination ID, a source ID, a PQI, QoS characteristics, and a PC5 unicast ID. The UE1 1570 and the UE2 1590 may perform a sidelink UE capability information exchange procedure in a PC5 RRC connection procedure, in operation 1573. The UE1 1570 may obtain an SLRB configuration including a bi-directional SLRB configuration or uni-directional SLRB configuration, in operation 1575. The UE2 1590 may obtain an SLRB configuration including a bi-directional SLRB configuration or uni-directional SLRB configuration, in operation 1577. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

In operation 1579, the UE1 1570 may transmit an AS configuration message to the UE2 1590 to perform an AS configuration procedure in the PC5 RRC connection procedure together with the UE2 1590. The AS configuration message may include at least one or a combination of a PC5 flow ID, a destination ID, a source ID, a PQI, QoS characteristics, a PC5 SLRB configuration, and a PC5 SLRB ID.

If the AS configuration message is received, the UE2 1590 may determine whether the SLRB configuration obtained in operation 1577 collides with the SLRB configuration included in the AS configuration message, in operation 1581. A target parameter determining whether the SLRB configurations collide with each other may include at least one or a combination of an RLC mode (RLC AM or RLC UM), a bi-directional RLC, a uni-directional RLC, a logical channel corresponding to the RLC mode, and a configuration parameter required for the operation of the RLC mode. If it is determined that the SLRB configurations collide with each other in operation 1581, the UE2 1590 may identify information of a configuration parameter required to be adjusted due to a mismatch.

The UE2 1590 may transmit an AS configuration message including the information of the configuration parameter required to be adjusted, in operation 1583. The AS configuration message of operation 1583 may include information of a configuration parameter required to be adjusted, corresponding to the at least one or combination of the PC5 flow ID, the destination ID, the source ID, the PQI, the QoS characteristics, the PC5 SLRB configuration, and the PC5 SLRB ID, which is received in operation 1579. The information of the configuration parameter required to be adjusted (or information of an adjustable configuration parameter) may include at least one of an adjustable RLC mode (RLC AM or RLC UM), a bi-directional RLC, a uni-directional RLC, a logical channel corresponding to the RLC mode, and a configuration parameter required for the operation of the RLC mode. The UE1 1570 having received the AS configuration message of operation 1583 may determine whether the SLRB configuration is adjustable, based on the information of the configuration parameter (or information of an adjustable configuration parameter) of the AS configuration received in operation 1583 (operation 1585).

If it is determined that the adjustment of the configuration parameter is not possible, the UE1 1570 may transmit an AS configuration complete message including AS configuration failure indication information to the UE2 1590, in operation 1587. The AS configuration complete message may include at least one or a combination of the PC5 flow ID, the destination ID, the source ID, the PQI, the QoS characteristics, the PC5 SLRB configuration, and the PC5 SLRB ID, which are included in the AS configuration message received in operation 1583.

In the embodiments illustrated in FIGS. 13, 14, 15A, 15B, and 15C, if after transmitting an AS configuration message, the UE1 fails to receive an AS configuration complete message from the UE2, or the UE1 receives an AS configuration complete message indicating an AS configuration failure from the UE2, the UE1 and the UE2 may not proceed with the AS configuration setup procedure any longer.

In the embodiment illustrated in FIGS. 15A, 15B, and 15C, if after transmitting an AS configuration message, the UE2 fails to receive an AS configuration complete message from the UE1, or the UE2 receives an AS configuration complete message indicating an AS configuration failure from the UE1, the UE1 and the UE2 may not proceed with the AS configuration setup procedure any longer.

According to various embodiments, if an initiating UE and/or a peer UE is an RRC_Connected UE, an operation of determining and/or processing a collision of a bi-directional SLRB configuration parameter or uni-directional SLRB configuration parameter between the two UEs may be performed using coordination between NWs of the UEs. For example, the peer UE may transfer (report), to its own NW, bi-directional SLRB configuration information or uni-directional SLRB configuration information received from the initiating UE. The NW may determine whether to accept and/or adjust the reported bi-directional SLRB configuration or uni-directional SLRB configuration, and may configure, for the peer UE, whether to accept the configuration, whether to adjust the configuration, information of an adjustable parameter, and/or information of a parameter decided by being adjusted. The NW may configure an SLRB configuration for the peer UE such that the SLRB configuration does not collide with the SLRB configuration of the initiating UE.

For example, the NW may configure the same RLC mode. For example, the NW may configure the same bi-directional RLC. For example, the NW may configure the same uni-directional RLC. If it is determined to be hard to coordinate the SLRB configurations between the two UEs, the NW may indicate an AS configuration failure to the peer UE. The peer UE may transfer AS configuration failure indication information to the initiating UE. The NW may determine information of a configuration parameter which can be coordinated between the two UEs. The NW may transfer information of an adjustable configuration parameter to the initiating UE through the peer UE.

The peer UE may transfer, to the initiating UE, whether to accept the configuration, whether to adjust the configuration, the information of the adjustable parameter, and/or the information of the parameter decided by being adjusted, which are described above. The initiating UE may report, to its own NW, information decided by being determined and processed by the NW of the peer UE. Information reported by the initiating UE to its own NW may include whether the peer UE accepts the bi-directional SLRB configuration or uni-directional SLRB configuration, whether the peer UE adjusts the above configuration, information of an adjustable parameter, and/or information of a parameter decided by being adjusted. If it is determined that the adjustment of a configuration parameter is possible, the initiating UE may configure a bi-directional SLRB configuration or uni-directional SLRB configuration. If it is determined that the adjustment of the configuration parameter is impossible, the initiating UE may determine an AS configuration failure.

Figure 16A:
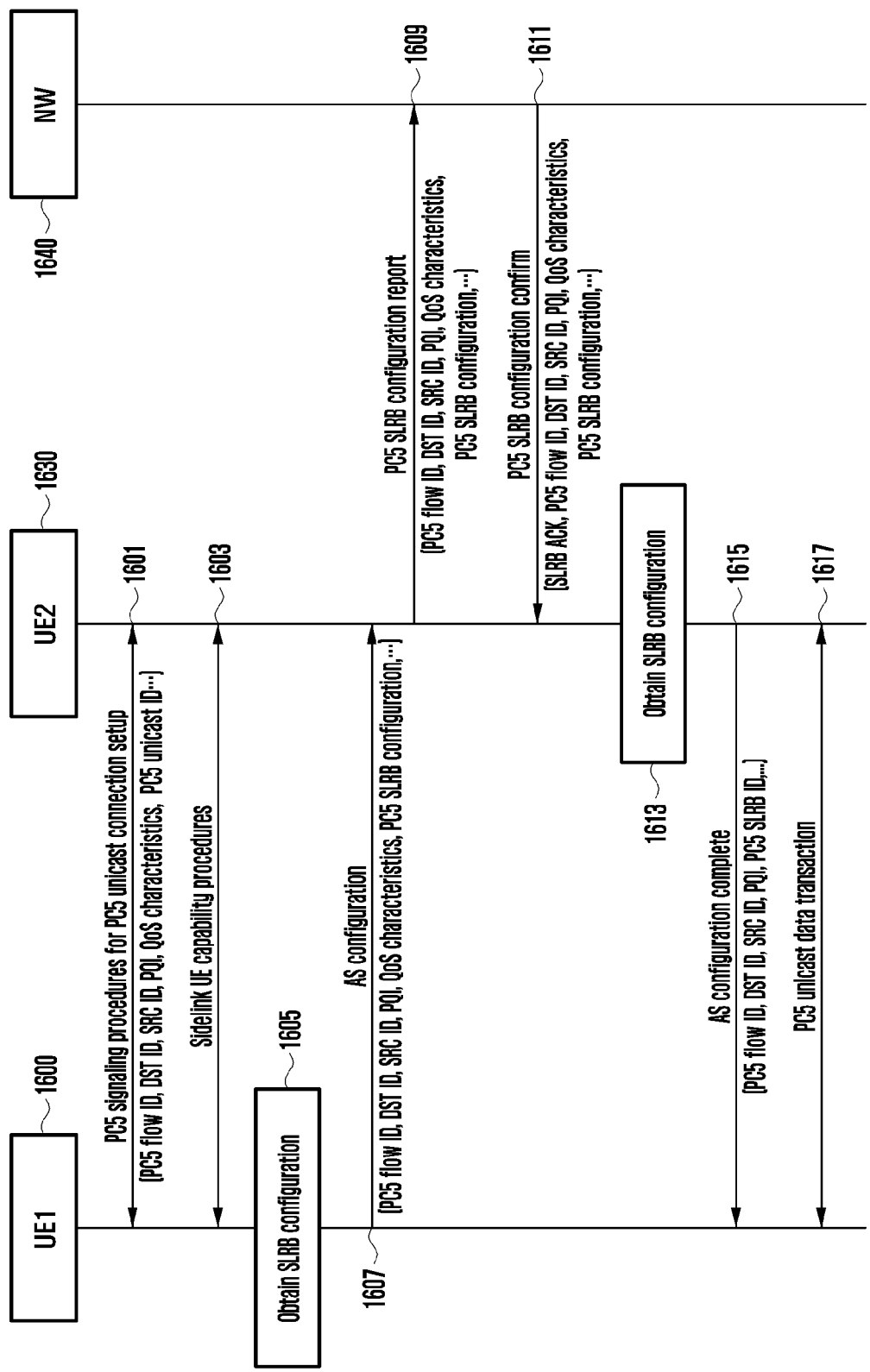
FIG. 16A illustrates an SLRB configuration coordination method using base station cooperation according to various embodiments.
Figure 16B:
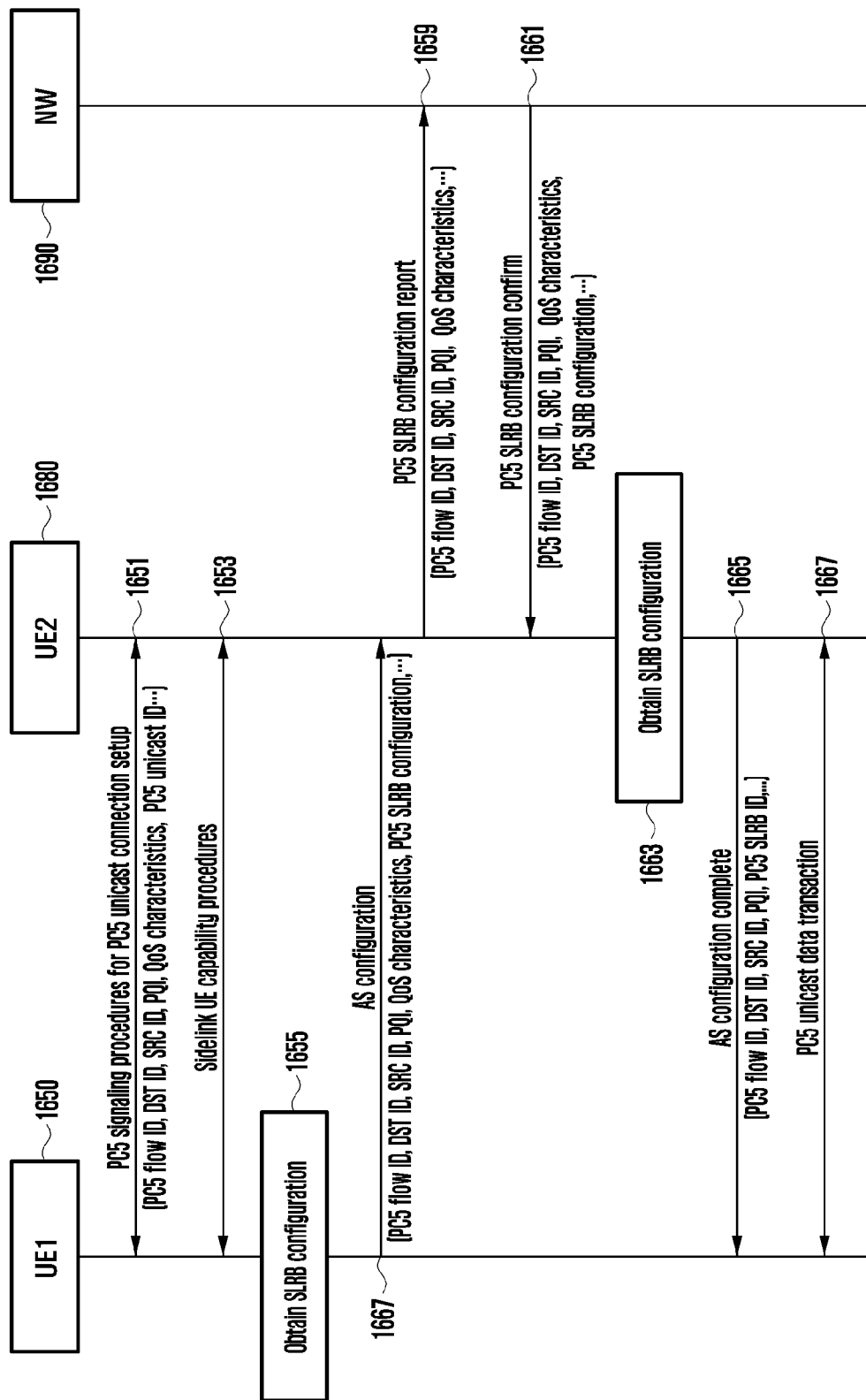
FIG. 16B illustrates an SLRB configuration coordination method using base station cooperation according to various embodiments.
Figure 17A:
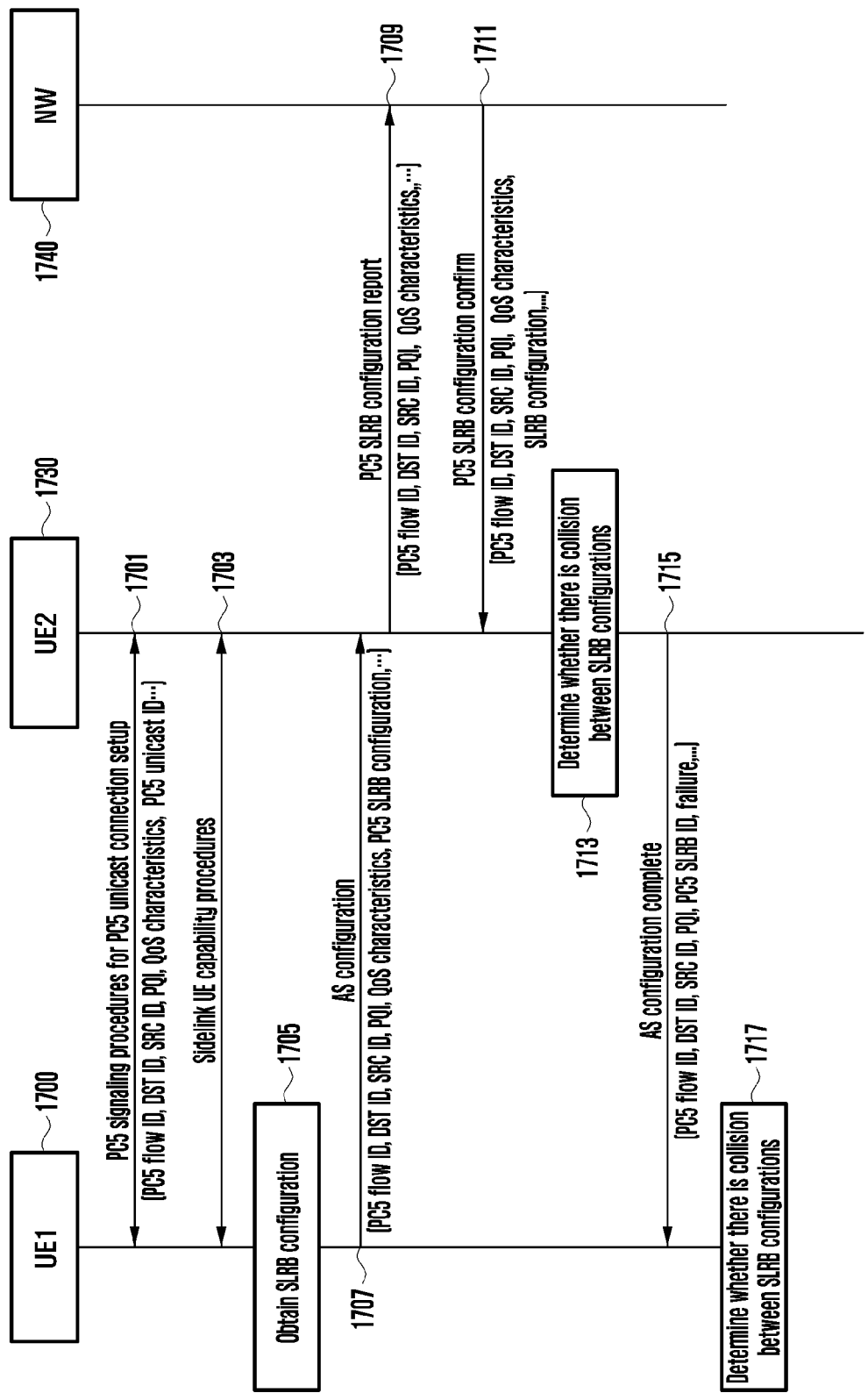
FIG. 17A illustrates an SLRB configuration coordination method using base station cooperation according to various embodiments.
Figure 17B:
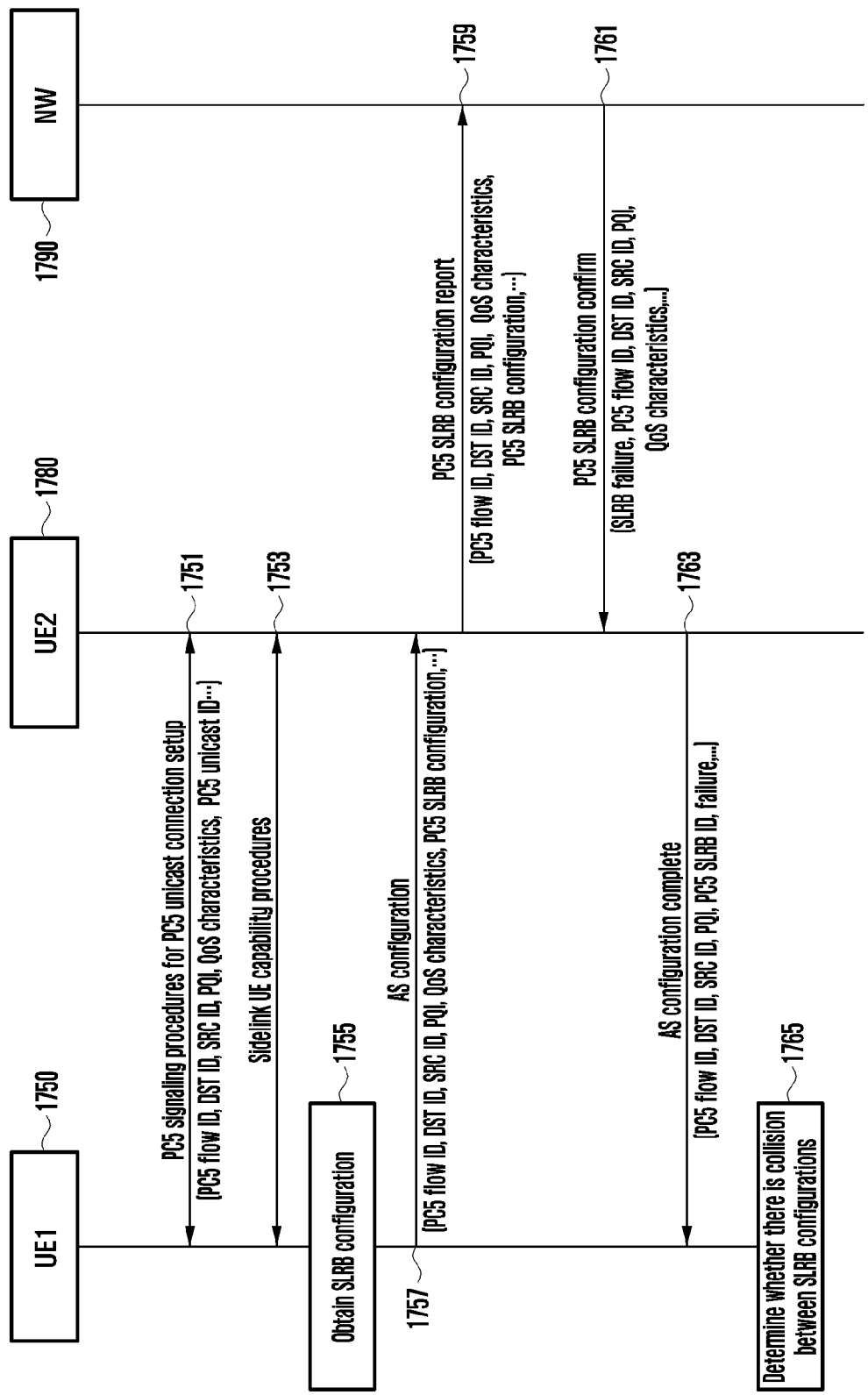
FIG. 17B illustrates an SLRB configuration coordination method using base station cooperation according to various embodiments.
Figure 18:
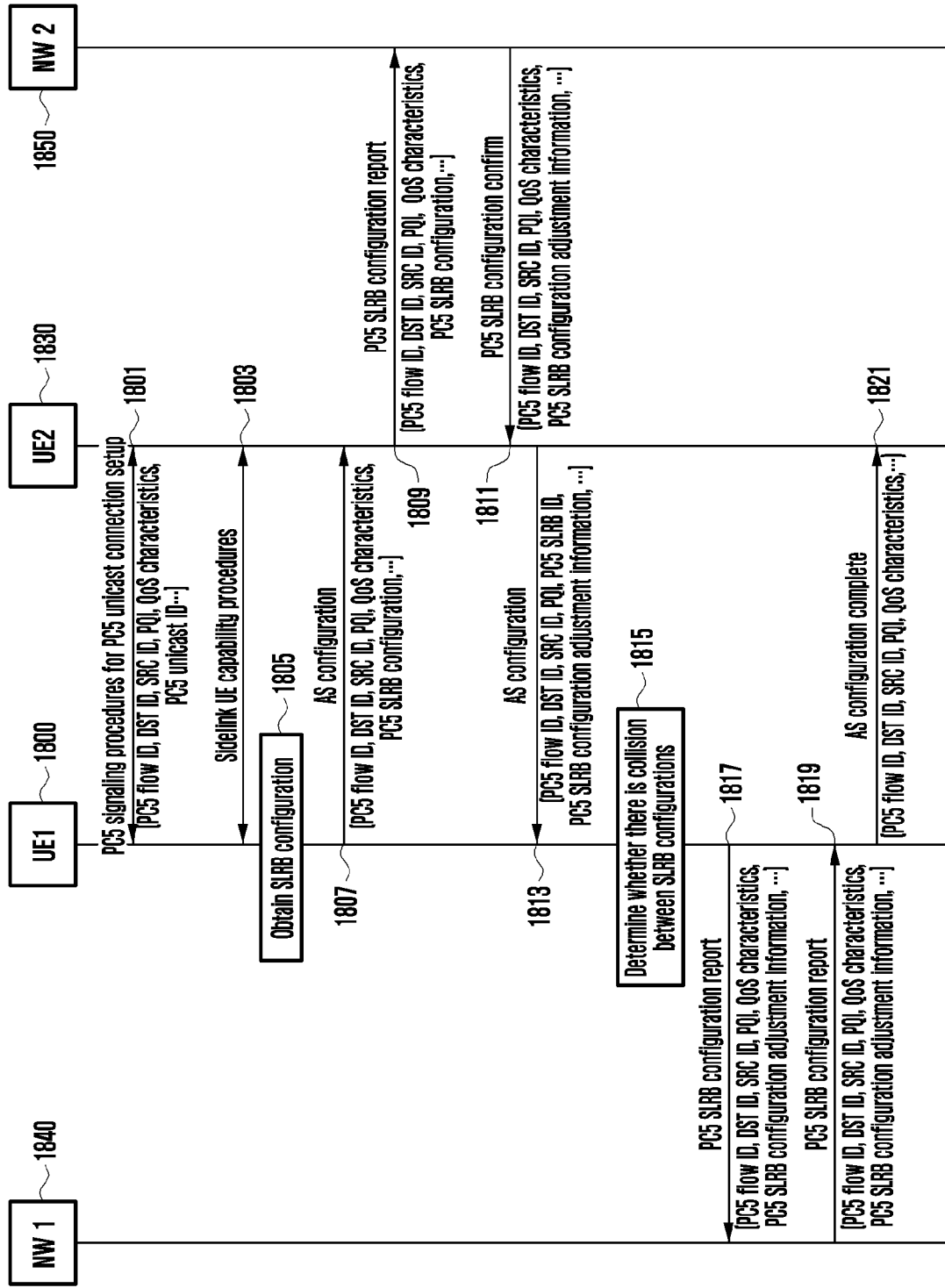
FIG. 18 illustrates an SLRB configuration coordination method using base station cooperation according to various embodiments.

FIG. 16A illustrates an SLRB configuration coordination method using base station cooperation according to various embodiments, FIG. 16B illustrates an SLRB configuration coordination method using base station cooperation according to various embodiments, FIG. 17A illustrates a SLRB configuration coordination method using base station cooperation according to various embodiments, FIG. 17B illustrates a SLRB configuration coordination method using base station cooperation according to various embodiments, and FIG. 18 illustrates an SLRB configuration coordination method using base station cooperation according to various embodiments. The NW1 s or NW2s illustrated in FIGS. 16 to 18 may correspond to the same NWs or different NWs.

Referring to FIG. 16A, a UE1 1600 and UE2 1630 may perform a PC5 signaling procedure for configuring a sidelink-based unicast connection, in operation 1601. Information exchanged between the two UEs 1600 and 1630 in the PC5 signaling procedure may include at least one or a combination of a PC5 flow ID, a destination ID, a source ID, a PQI, QoS characteristics, and a PC5 unicast ID. The UE1 1600 and the UE2 1630 may perform a sidelink UE capability information exchange procedure in a PC5 RRC connection procedure, in operation 1603. The UE1 1600 may obtain an SLRB configuration including a bi-directional SLRB configuration or uni-directional SLRB configuration, in operation 1605. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

In operation 1607, the UE1 1600 may transmit an AS configuration message to the UE2 1630 to perform an AS configuration procedure in the PC5 RRC connection procedure together with the UE2 1630. The AS configuration message may include at least one or a combination of a PC5 flow ID, a destination ID, a source ID, a PQI, QoS characteristics, a PC5 SLRB configuration, and a PC5 SLRB ID.

The UE2 1630 may transmit a PC5 SLRB configuration report message to an NW 1640 in order to obtain an SLRB configuration, in operation 1609. The PC5 SLRB configuration report message may be replaced with a SidelinkUEInformation message or a UEAssistanceInformation message. The PC5 SLRB configuration report message may include the at least one or combination of the PC5 flow ID, the destination ID, the source ID, the PQI, the QoS characteristics, the PC5 SLRB configuration, and the PC5 SLRB ID, which is received in operation 1607. PC5 SLRB configuration information reported by the above message may include at least one of an RLC mode (RLC AM or RLC UM), a bi-directional RLC, a uni-directional RLC, a logical channel corresponding to the RLC mode, and a configuration parameter required for the operation of the RLC mode.

The NW 1640 may determine an SLRB configuration of the UE2 1630, based on the information of the PC5 SLRB configuration report message. If it is determined to be possible to accept the SLRB configuration reported in operation 1609, the NW 1640 may transmit, to the UE2 1630, a PC5 SLRB configuration confirm message as a response to the message received in operation 1609, in operation 1611.

The PC5 SLRB configuration confirm message may be replaced with an RRCReconfiguration message. The PC5 SLRB configuration confirm message may include at least one or combination of information of an acknowledgement or failure for the SLRB configuration reported in operation 1609, a PC5 flow ID, a destination ID, a source ID, a PQI, QoS characteristics, a PC5 SLRB configuration, and a PC5 SLRB ID.

The UE2 1630 may determine the acquisition of the SLRB configuration from the NW 1640, in operation 1613, and may transmit an AS configuration complete message as a response to the AS configuration message of operation 1607 to the UE1 1600, in operation 1615. The AS configuration complete message may include at least one or a combination of information corresponding to the AS configuration message, a PC5 flow ID, a destination ID, a source ID, a PQI, and a PC5 SLRB ID. In operation 1617, the UE1 1600 and the UE2 1630 may perform sidelink data transmission or reception by applying an AS configuration including the SLRB configuration.

Referring to FIG. 16B, a UE1 1650 and UE2 1680 may perform a PC5 signaling procedure for configuring a sidelink-based unicast connection, in operation 1651. Information exchanged between the two UEs 1650 and 1680 in the PC5 signaling procedure may include at least one or a combination of a PC5 flow ID, a destination ID, a source ID, a PQI, QoS characteristics, and a PC5 unicast ID. The UE1 1650 and the UE2 1680 may perform a sidelink UE capability information exchange procedure in a PC5 RRC connection procedure, in operation 1653. The UE1 1650 may obtain an SLRB configuration including a bi-directional SLRB configuration or uni-directional SLRB configuration, in operation 1655. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

In operation 1657, the UE1 1650 may transmit an AS configuration message to the UE2 1680 to perform an AS configuration procedure in the PC5 RRC connection procedure together with the UE2 1680. The AS configuration message may include at least one or a combination of a PC5 flow ID, a destination ID, a source ID, a PQI, QoS characteristics, a PC5 SLRB configuration, and a PC5 SLRB ID.

The UE2 1680 may transmit a PC5 SLRB configuration report message to an NW 1690 in order to obtain an SLRB configuration, in operation 1659. The PC5 SLRB configuration report message may be replaced with a SidelinkUE-Information message or a UEAssistanceInformation message. The PC5 SLRB configuration report message may include the at least one or combination of the PC5 flow ID, the destination ID, the source ID, the PQI, and the QoS characteristics, which is received in operation 1657.

The NW 1690 may determine an SLRB configuration of the UE2 1680, based on information of the PC5 SLRB configuration report message. The NW 1690 may transmit a PC5 SLRB configuration confirm message to the UE2 1680 as a response to operation 1659, in operation 1661. The PC5 SLRB configuration confirm message may be replaced with an RRCReconfiguration message. The PC5 SLRB configuration confirm message may include at least one or a combination of a PC5 flow ID, a destination ID, a source ID, a PQI, QoS characteristics, a PC5 SLRB configuration, and a PC5 SLRB ID. The NW 1690 has a function of configuring a configuration parameter such that a collision between SLRB configurations, corresponding to at least one or a combination of a PC5 flow ID, a destination ID, a source ID, a PQI, and QoS characteristics is prevented. For example, the NW 1690 may adjust or control a collision related a bi-directional SLRB configuration parameter or a uni-directional SLRB configuration parameter by using a coordination procedure performed with another NW, or using a procedure of coordinating an SLRB configuration between systems related to the same PLMN, the same service provider, the same regulation, or the same NW, as in the embodiment illustrated in FIG. 8.

The UE2 1680 may determine the acquisition of the SLRB configuration from the NW 1690, in operation 1663, and may transmit an AS configuration complete message as a response to the AS configuration message of operation 1657 to the UE1 1650, in operation 1665. The AS configuration complete message may include at least one or a combination of information corresponding to the AS configuration message, a PC5 flow ID, a destination ID, a source ID, a PQI, and a PC5 SLRB ID. In operation 1667, the UE1 1650 and the UE2 1680 may perform sidelink data transmission or reception by applying an AS configuration including the SLRB configuration.

Referring to FIG. 17A, a UE1 1700 and UE2 1730 may perform a PC5 signaling procedure for configuring a sidelink-based unicast connection, in operation 1701. Information exchanged between the two UEs 1700 and 1730 in the PC5 signaling procedure may include at least one or a combination of a PC5 flow ID, a destination ID, a source ID, a PQI, QoS characteristics, and a PC5 unicast ID. The UE1 1700 and the UE2 1730 may perform a sidelink UE capability information exchange procedure in a PC5 RRC connection procedure, in operation 1703. The UE1 1700 may obtain an SLRB configuration including a bi-directional SLRB configuration or uni-directional SLRB configuration, in operation 1705. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

In operation 1707, the UE1 1700 may transmit an AS configuration message to the UE2 1730 to perform an AS configuration procedure in the PC5 RRC connection procedure together with the UE2 1730. The AS configuration message may include at least one or a combination of a PC5 flow ID, a destination ID, a source ID, a PQI, QoS characteristics, a PC5 SLRB configuration, and a PC5 SLRB ID.

The UE2 1730 may transmit a PC5 SLRB configuration report message to an NW 1740 in order to obtain an SLRB configuration, in operation 1709. The PC5 SLRB configuration report message may be replaced with a SidelinkUE-Information message or a UEAssistanceInformation message. The PC5 SLRB configuration report message may include the at least one or combination of the PC5 flow ID, the destination ID, the source ID, the PQI, and the QoS characteristics, which is received in operation 1707.

The NW 1740 may determine an SLRB configuration of the UE2 1730, based on information of the PC5 SLRB configuration report message. The NW 1740 may transmit a PC5 SLRB configuration confirm message to the UE2 1730 as a response to operation 1709, in operation 1711. The PC5 SLRB configuration confirm message may be replaced with an RRCReconfiguration message. The PC5 SLRB configuration confirm message may include at least one or a combination of a PC5 flow ID, a destination ID, a source ID, a PQI, QoS characteristics, a PC5 SLRB configuration, and a PC5 SLRB ID.

The UE2 1730 may determine the acquisition of the SLRB configuration from the NW 1740, in operation 1713. In operation 1713, the UE2 1730 may identify the SLRB configuration received in operation 1707 and the SLRB configuration obtained in operation 1711, to determine whether there is a collision of an SLRB configuration parameter. If it is determined that there is a collision of an SLRB configuration parameter, according to the determination of operation 1713, the UE2 1730 may determine an AS configuration failure, and transmit an AS configuration complete message to the UE1 1700 as a response to the AS configuration message of operation 1707, in operation 1715. The AS configuration complete message may include at least one or a combination of failure indication information, and a PC5 flow ID, a destination ID, a source ID, a PQI, and a PC5 SLRB ID, which correspond to the AS configuration message. If the AS configuration complete message indicates a failure, the AS configuration complete message may include information of the collided SLRB configuration parameter. The information of the collided SLRB configuration parameter may include at least one or a combination of an RLC mode, a bi-directional RLC, a uni-directional RLC, a logical channel relating to the RLC mode, and an RLC mode operational parameter.

If an AS configuration complete message including information indicating a failure caused by a collision between the SLRB configurations is received, the UE1 1700 may determine that there is a collision between the SLRB configurations (operation 1717). The UE1 1700 and the UE2 1730 may recognize an AS configuration failure and may not proceed with the AS configuration procedure any longer.

The embodiment is described under the assumption that the UE2 1730 is an RRC_Connected UE. If the UE2 1730 is an RRC_Idle UE or an RRC_Inactive UE, the UE2 may perform operation 1713, based on an SLRB configuration obtained by receiving an SIB message of the NW. If the UE2 1730 is an out-of-coverage UE, the UE2 may perform operation 1713, based on an SLRB configuration obtained from a preconfiguration.

Referring to FIG. 17B, a UE1 1750 and UE2 1780 may perform a PC5 signaling procedure for configuring a sidelink-based unicast connection, in operation 1751. Information exchanged between the two UEs 1750 and 1780 in the PC5 signaling procedure may include at least one or a combination of a PC5 flow ID, a destination ID, a source ID, a PQI, QoS characteristics, and a PC5 unicast ID. The UE1 1750 and the UE2 1780 may perform a sidelink UE capability information exchange procedure in a PC5 RRC connection procedure, in operation 1753. The UE1 1750 may obtain an SLRB configuration including a bi-directional SLRB configuration or uni-directional SLRB configuration, in operation 1755. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

In operation 1757, the UE1 1750 may transmit an AS configuration message to the UE2 1780 to perform an AS configuration procedure in the PC5 RRC connection procedure together with the UE2 1780. The AS configuration message may include at least one or a combination of a PC5 flow ID, a destination ID, a source ID, a PQI, QoS characteristics, a PC5 SLRB configuration, and a PC5 SLRB ID.

The UE2 1780 may transmit a PC5 SLRB configuration report message to an NW 1790 in order to obtain an SLRB configuration, in operation 1759. The PC5 SLRB configuration report message may be replaced with a SidelinkUEInformation message or a UEAssistanceInformation message. The PC5 SLRB configuration report message may include the at least one or combination of the PC5 flow ID, the destination ID, the source ID, the PQI, the QoS characteristics, the PC5 SLRB configuration, and the PC5 SLRB ID, which is received in operation 1757. PC5 SLRB configuration information reported by the above message may include at least one of an RLC mode (RLC AM or RLC UM), a bi-directional RLC, a uni-directional RLC, a logical channel corresponding to the RLC mode, and a configuration parameter required for the operation of the RLC mode.

The NW 1790 may determine an SLRB configuration of the UE2 1780, based on the information of the PC5 SLRB configuration report message. If it is determined to be possible to accept the SLRB configuration reported in operation 1759, the NW 1790 may transmit, to the UE2 1780, a PC5 SLRB configuration confirm message as a response to the message received in operation 1759, in operation 1761. The PC5 SLRB configuration confirm message may be replaced with an RRCReconfiguration message. The PC5 SLRB configuration confirm message may include at least one or combination of information of an acknowledgement or failure for the SLRB configuration reported in operation 1759, a PC5 flow ID, a destination ID, a source ID, a PQI, QoS characteristics, a PC5 SLRB configuration, and a PC5 SLRB ID.

If the SLRB configuration is received from the NW 1790, the UE2 1780 may transmit an AS configuration complete message as a response to the AS configuration message of operation 1757 to the UE1 1750, in operation 1763. If it is determined that SLRB configuration failure information is received from the NW 1790, the UE2 1780 may include, in the AS configuration complete message, at least one or a combination of a PC5 flow ID, a destination ID, a source ID, a PQI, and a PC5 SLRB ID, which corresponds to the AS configuration message, and failure indication information. If an AS configuration complete message including information indicating a failure caused by a collision between the SLRB configurations is received, the UE1 1750 may determine that there is a collision between the SLRB configurations (operation 1765). The UE1 1750 and the UE2 1780 may recognize an AS configuration failure and may not proceed with the AS configuration procedure any longer.

Referring to FIG. 18, a UE1 1800 and UE2 1830 may perform a PC5 signaling procedure for configuring a sidelink-based unicast connection, in operation 1801. Information exchanged between the two UEs 1800 and 1830 in the PC5 signaling procedure may include at least one or a combination of a PC5 flow ID, a destination ID, a source ID, a PQI, QoS characteristics, and a PC5 unicast ID. The UE1 1800 and the UE2 1830 may perform a sidelink UE capability information exchange procedure in a PC5 RRC connection procedure, in operation 1803. The UE1 1800 may obtain an SLRB configuration including a bi-directional SLRB configuration or uni-directional SLRB configuration, in operation 1805. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

In operation 1807, the UE1 1800 may transmit an AS configuration message to the UE2 1830 to perform an AS configuration procedure in the PC5 RRC connection procedure together with the UE2 1830. The AS configuration message may include at least one or a combination of a PC5 flow ID, a destination ID, a source ID, a PQI, QoS characteristics, a PC5 SLRB configuration, and a PC5 SLRB ID.

The UE2 1830 may transmit a PC5 SLRB configuration report message to an NW2 1850 in order to obtain an SLRB configuration, in operation 1809. The PC5 SLRB configuration report message may be replaced with a SidelinkUE-Information message or a UEAssistanceInformation message. The PC5 SLRB configuration report message may include the at least one or combination of the PC5 flow ID, the destination ID, the source ID, the PQI, the QoS characteristics, the PC5 SLRB configuration, and the PC5 SLRB ID, which is received in operation 1807. PC5 SLRB configuration information reported by the above message may include at least one or a combination of an RLC mode (RLC AM or RLC UM), a bi-directional RLC, a uni-directional RLC, a logical channel corresponding to the RLC mode, and a configuration parameter required for the operation of the RLC mode.

The NW2 1850 may determine an SLRB configuration of the UE2 1830, based on the information of the PC5 SLRB configuration report message. The NW2 1850 may determine whether to accept the SLRB configuration reported in operation 1809, and if it is determined that there is a collision of an SLRB configuration parameter, the NW2 may identify an SLRB configuration parameter determined to be adjustable. The SLRB configuration parameter determined to be adjustable may include at least one of an RLC mode, a bi-directional RLC, a uni-directional RLC, a logical channel corresponding to the RLC mode, and a configuration parameter required for the operation of the RLC mode. The NW2 1850 may transmit, to the UE2 1830, a PC5 SLRB configuration confirm message as a response to the message received in operation 1809, in operation 1811. The PC5 SLRB configuration confirm message may be replaced with an RRCReconfiguration message. The PC5 SLRB configuration confirm message may include at least one or combination of information of an acknowledgement or failure for the SLRB configuration reported in operation 1811, information of an SLRB configuration parameter determined to be adjustable, a PC5 flow ID, a destination ID, a source ID, a PQI, QoS characteristics, a PC5 SLRB configuration, and a PC5 SLRB ID.

The UE2 1830 may determine the acquisition of the SLRB configuration from the NW2 1850. If the obtained SLRB configuration includes information of an SLRB configuration parameter that is adjustable, the UE2 1830 may configure an AS configuration message including the information of the adjustable SLRB configuration parameter and transmit the message to the UE1 1800, in operation 1813. The AS configuration message of operation 1813 may include at least one or a combination of a PC5 flow ID, a destination ID, a source ID, a PQI, and a PC5 SLRB ID, which is information corresponding to the AS configuration message of operation 1807, and the information of the adjustable SLRB configuration parameter.

If the AS configuration message including the information of the adjustable SLRB configuration parameter is received, the UE1 1800 may determine that there is a collision between the SLRB configurations, in operation 1815. The UE1 1800 may report the collision between the SLRB configurations to a NW1 1840 accessed by the UE1 itself. The UE1 1800 may transmit a PC5 SLRB configuration report message, in operation 1817. The PC5 SLRB configuration report message may be replaced with a SidelinkUE-Information message or a UEAssistanceInformation message. The PC5 SLRB configuration report message may include at least one or a combination of a PC5 flow ID, a destination ID, a source ID, a PQI, QoS characteristics, a PC5 SLRB configuration, a PC5 SLRB ID, and an adjustable SLRB configuration parameter.

The UE1 1800 may receive a PC5 SLRB configuration confirm message from the NW1 1840, in operation 1819. The PC5 SLRB configuration confirm message may be replaced with an RRCReconfiguration message. The PC5 SLRB configuration confirm message may include at least one or a combination of a PC5 flow ID, a destination ID, a source ID, a PQI, QoS characteristics, a PC5 SLRB configuration, a PC5 SLRB ID, whether to approve the adjustment of an SLRB configuration parameter, and an adjustable SLRB configuration parameter.

The UE1 1800 may transmit an AS configuration complete message to the UE2 1830 as a response to the message received in operation 1813, in operation 1821. The AS configuration complete message may include at least one or a combination of a PC5 flow ID, a destination ID, a source ID, a PQI, QoS characteristics, a PC5 SLRB configuration, a PC5 SLRB ID, whether to approve the adjustment of an SLRB configuration parameter, and an adjustable SLRB configuration parameter.

When the adjustment of a PC5 SLRB configuration parameter is performed using the NW1 1840 and the NW2 1850, the NW2 1850 may provide at least one or a combination of an adjustable parameter set, an adjustable parameter, and a parameter to be adjusted, in the embodiment illustrated in FIG. 18. The NW1 1840 may check whether at least one or combination of the adjustable parameter set, the adjustable parameter, and the parameter to be adjusted is acceptable. If the adjustable parameter set is provided, the NW1 1840 may select one acceptable parameter. If the NW1 1840 determines that the adjustable parameter, or the parameter to be adjusted is acceptable, the NW1 may indicate the approval of a corresponding adjustment parameter through AS configuration complete signaling transferred by the UE1 1800 to the UE2 1830. The UE2 1830 may report, to the NW2 1850, information relating to the failure or acknowledgement for the adjustment of a PC5 SLRB configuration, or relating to which parameter has been adjusted.

In the embodiments illustrated in FIGS. 16A, 16B, 17A, 17B, and 18, if after transmitting an AS configuration message, the UE1 fails to receive an AS configuration complete message from the UE2, or the UE1 receives an AS configuration complete message indicating an AS configuration failure from the UE2, the UE1 and the UE2 may not proceed with the AS configuration setup procedure any longer.

In the embodiment illustrated in FIG. 18, if after transmitting an AS configuration message, the UE2 fails to receive an AS configuration complete message from the UE1, or the UE2 receives an AS configuration complete message indicating an AS configuration failure from the UE1, the UE1 and the UE2 may not proceed with the AS configuration setup procedure any longer.

Figure 19:
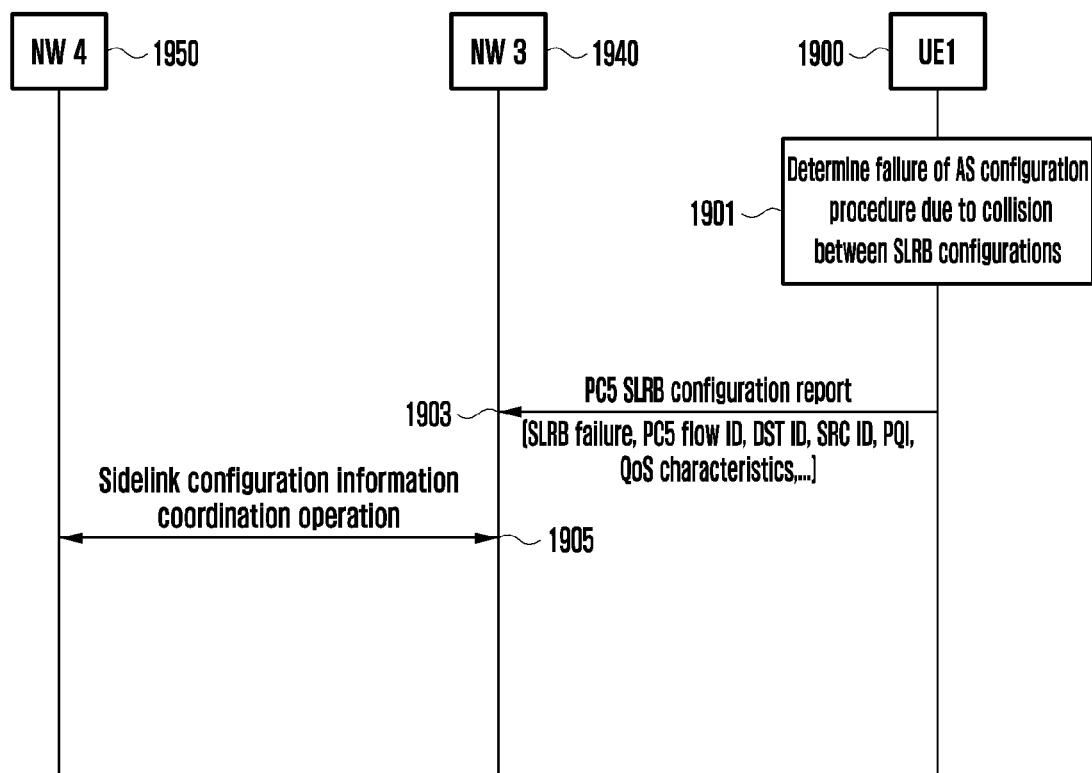
FIG. 19 is a signal flow diagram for processing SLRB configuration processing failure according to various embodiments.

FIG. 19 is a signal flow diagram for processing SLRB configuration processing failure according to various embodiments.

Referring to FIG. 19, a UE1 1900 may determine an AS configuration setup failure caused by a collision of an SLRB configuration to be applied to a sidelink unicast connection with an opponent UE, in operation 1901. The UE1 1900 corresponds to at least one of an initiating UE, a peer UE, or a designated UE.

The UE1 1900 may transmit a PC5 SLRB configuration report message to an NW3 1940 of the UE1 itself, in operation 1903. The PC5 SLRB configuration report message may be used to notify that an SLRB configuration obtained from the NW3 1940 and an SLRB configuration received from the opponent UE mismatch. The PC5 SLRB configuration report message may include at least one or a combination of a PQI, PC5 QoS characteristics, a PC5 flow ID, a PC5 SLRB ID, a destination ID, and a source ID, which are obtained from the NW3 1940. The PC5 SLRB configuration report message may include information of a configuration parameter determined to be mismatched, among SLRB configuration parameters corresponding to the PQI, the PC5 QoS characteristics, the PC5 flow ID, the PC5 SLRB ID, the destination ID, and the source ID (For example, the information is at least one of an RLC mode, a bi-directional RLC, a uni-directional RLC, information of a logical channel corresponding to the RLC mode, and an operational parameter corresponding to the RLC mode).

The NW3 1940 may perform a sidelink configuration information coordination operation together with an NW4 1950 illustrated in FIG. 19, which is another NW, based on the information received from the PC5 SLRB configuration report, in operation 1905. Information exchanged between the NW3 1940 and the NW4 1950 in the sidelink configuration information coordination operation may include at least one of an RLC mode, a bi-directional RLC, a uni-directional RLC, information of a logical channel for each RLC mode, and an operational parameter for each RLC mode, corresponding to at least one of a PQI, PC5 QoS characteristics, a PC5 flow ID, a PC5 SLRB ID, a destination ID, and a source ID. The coordination operation between the NWs in operation 1905 may be performed to configure the same SLRB configuration for at least one or a combination of the same PQI, PC5 QoS characteristics, destination ID, source ID, PC5 SLRB ID, and PC5 flow ID between the NWs.

According to various embodiments, if an initiating UE and/or a peer UE is an RRC_Inactive UE, an RRC_Idle UE, or an Out-of-coverage UE, an operation of determining and/or processing a collision of an SLRB configuration parameter between the two UEs may correspond to at least one or a combination of the embodiments illustrated in FIG. 10A, FIG. 10b, FIG. 11, FIG. 12, FIG. 13, FIG. 14, FIG. 15A, FIG. 15B, and FIG. 15C.

According to various embodiments, an operation of determining and processing a mismatch between SLRB configurations in consideration of an SLRB-configuration designated UE selected by the method illustrated in FIG. 9 may employ the embodiment illustrated in FIG. 10A or 10B. The designated UE may perform the same operation as that of the initiating UE, illustrated in FIG. 10A or 10B. The designated UE may perform an operation of obtaining a bi-directional SLRB configuration or a uni-directional SLRB configuration, and transferring the obtained configuration to the opponent UE.

In another embodiment, the designated UE may perform an operation of determining whether there is a mismatch between an SLRB configuration obtained by the designated UE itself, and an SLRB configuration received from the opponent, and processing the resultant mismatch or match. The designated UE may perform the same operation as that of the peer UE, illustrated in FIG. 13, 14, 15B, 16, 17, or 18, and may perform an operation of transferring, to the opponent UE, at least one of information of a match/mismatch, adjustment information relating to a configuration parameter determined to be mismatched, and adjusted configuration parameter information relating to a mismatched configuration parameter. If the designated UE is an RRC_Connected UE, the designated UE may perform at least one or a combination of the operations of: obtaining an SLRB configuration from an NW, reporting information of an SLRB configuration received from the opponent UE, to the NW, so as to identify the SLRB configuration; obtaining information of a mismatched configuration parameter from the NW; obtaining information of an adjustable configuration parameter from the NW; and obtaining adjusted SLRB configuration information from the NW.

If it is determined to be necessary to coordinate configuration information of an SLRB configuration between the UE1 and the UE2 as illustrated in FIG. 15A, 15B, 15C, or 18, the UE2 may provide, to the UE1, at least one or a combination of an RLC mode, a bi-directional RLC, a uni-directional RLC, a logical channel applicable to the RLC mode, and an operational parameter of the RLC mode, as an SLRB configuration parameter required to be adjusted. For example, a method for notifying of an applicable logical channel may use at least one of one or multiple logical channel values which are available, one or multiple logical channel values which are being used, and a bitmap of logical channel information which is available or being used.

Figure 20:
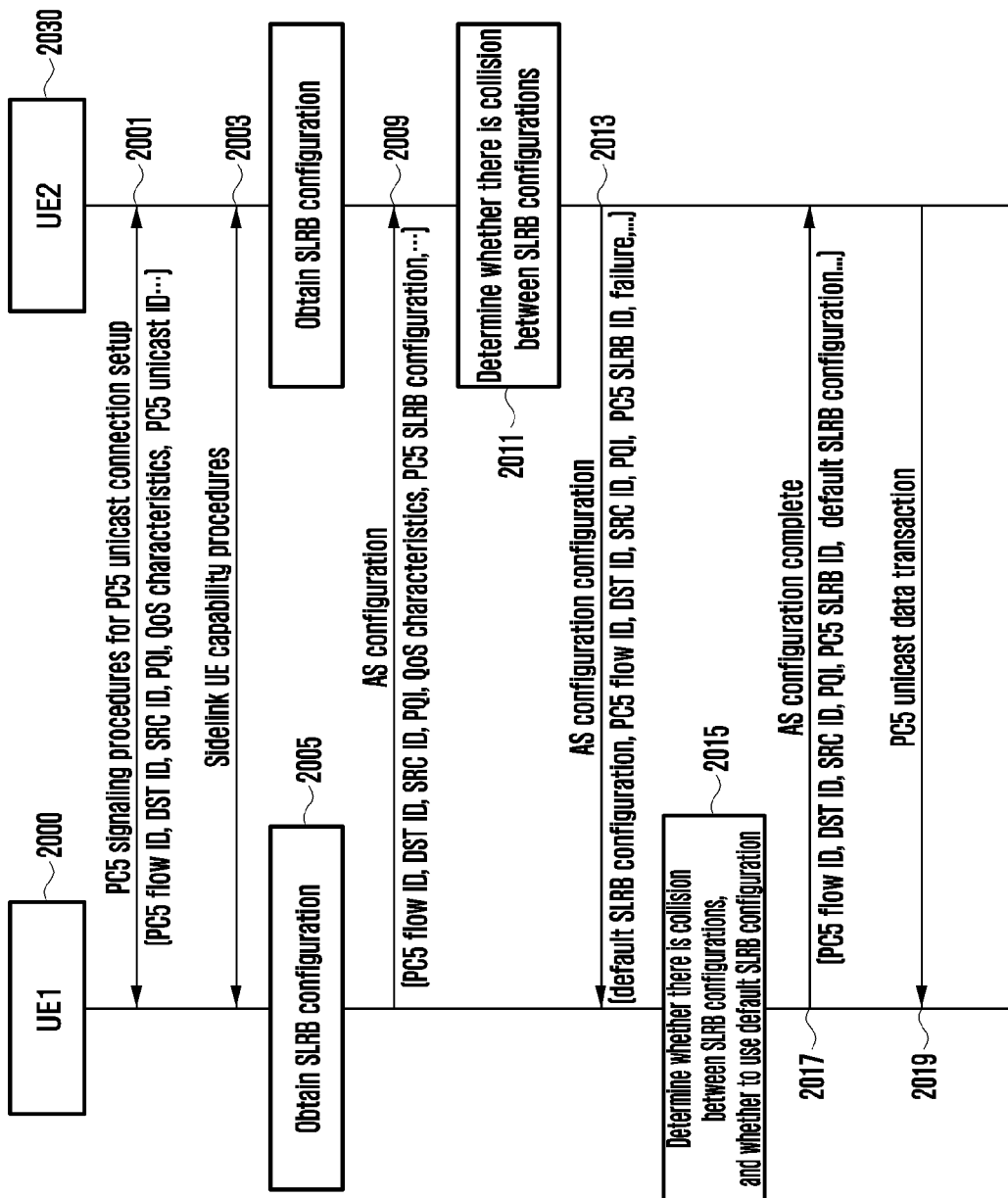
FIG. 20 is a signal flow diagram between terminals processing a collision between SLRB configurations according to various embodiments.

FIG. 20 is a signal flow diagram between UEs processing a collision between SLRB configurations according to various embodiments. The embodiment illustrated in FIG. 20 shows a signal procedure in which UEs having determined a collision between SLRB configurations determine to use a default SLRB configuration for a sidelink unicast connection, and exchange information relating to the configuration.

Referring to FIG. 20, a UE1 2000 and UE2 2030 may perform a PC5 signaling procedure for configuring a sidelink-based unicast connection, in operation 2001. Information exchanged between the two UEs 2000 and 2030 in the PC5 signaling procedure may include at least one or a combination of a PC5 flow ID, a destination ID, a source ID, a PQI, QoS characteristics, and a PC5 unicast ID. The UE1 2000 and the UE2 2030 may perform a sidelink UE capability information exchange procedure in a PC5 RRC connection procedure, in operation 2003. The UE1 2000 may obtain an SLRB configuration including a bi-directional SLRB configuration or uni-directional SLRB configuration, in operation 2005. The UE2 2030 may obtain an SLRB configuration including a bi-directional SLRB configuration or uni-directional SLRB configuration, in operation 2007. For example, the SLRB configuration may include at least one or a combination of an RLC mode, a bi-directional RLC, a uni-directional RLC, a logical channel corresponding to the RLC mode, and an operational parameter corresponding to the RLC mode. The SLRB configuration may be obtained through at least one of a dedicated RRC message, an SIB, and a preconfiguration.

In operation 2009, the UE1 2000 may transmit an AS configuration message to the UE2 2030 to perform an AS configuration procedure in the PC5 RRC connection procedure together with the UE2 2030. The AS configuration message may include at least one or a combination of a PC5 flow ID, a destination ID, a source ID, a PQI, QoS characteristics, a PC5 SLRB configuration, and a PC5 SLRB ID.

If the AS configuration message is received, the UE2 2030 may determine whether the SLRB configuration obtained in operation 2007 collides with the SLRB configuration included in the AS configuration message, in operation 2011. A target parameter determining whether the SLRB configurations collide with each other may include at least one of configuration parameters of RLC mode operations in addition to an RLC mode (RLC AM or RLC UM), a bi-directional RLC, a uni-directional RLC, a logical channel corresponding to the RLC mode, and the like.

If it is determined that the SLRB configurations collide with each other in operation 2011, the UE 2 2030 may determine an AS configuration failure, and transfer an AS configuration complete message to the UE1 2000 as a response to the AS configuration message received in operation 2009, in operation 2013. The AS configuration complete message may include at least one or a combination of information corresponding to the AS configuration message, a PC5 flow ID, a destination ID, a source ID, a PQI, a PC5 SLRB ID, failure indication information, and default SLRB configuration use indication information. For example, the UE2 2030 may include, in the AS configuration complete message, information of a parameter causing the collision between the SLRB configurations. If the AS configuration complete message including AS configuration failure indication and default SLRB configuration indication information is received from the UE2 2030, the UE1 2000 may determine use of a default SLRB configuration for a sidelink unicast corresponding to at least one or a combination of the PC5 flow ID, the destination ID, the source ID, and the PQI (operation 2015).

The UE1 2000 may transmit an AS configuration complete message corresponding to the message of operation 2013 to the UE2 2030 in operation 2017. The AS configuration complete message transmitted in operation 2017 may include at least one or a combination of a PC5 flow ID, a destination ID, a source ID, a PQI, and default SLRB configuration indication information. In operation 2019, the UE1 2000 and the UE2 2030 may perform sidelink data transmission or reception by applying a default SLRB configuration.

Another embodiment may use a procedure in which the UE1 2000 may transmit an AS configuration message including at least one or a combination of a PC5 flow ID, a destination ID, a source ID, a PQI, and default SLRB configuration indication information, in operation 2017, and the UE2 2030 transmits an AS configuration complete message as an response to the AS configuration message transmitted by the UE1 2000. After the procedure of transmission and reception of the AS configuration message and the AS configuration complete message, the UE1 2000 and the UE2 2030 may perform sidelink data transmission or reception by applying a default SLRB configuration.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first user equipment (UE) in a wireless communication system, the method comprising:
   receiving, from a second UE, a first message including a first sidelink radio bearer (SLRB) configuration;
   transmitting, to a base station, sidelink UE information including first information on a radio link control (RLC) mode included in the first SLRB configuration;
   receiving, from the base station, a radio resource control (RRC) reconfiguration message including a second SLRB configuration, the second SLRB configuration including second information on the RLC mode based on the first information; and
   transmitting, to the second UE, a second message including the second information on the RLC mode based on the second SLRB configuration,
   wherein the sidelink UE information is used for reporting the first information on the RLC mode received from the second UE for a unicast communication.

2. The method of claim 1, wherein the sidelink UE information includes at least one of a flow identity, a destination identity, or information on a quality of service (QOS).

3. The method of claim 1,
   wherein the RLC mode is associated with a logical channel of a data radio bearer (DRB), and
   wherein the first SLRB configuration is associated with a bi-directional SLRB configuration.

4. A method performed by a second user equipment (UE) in a wireless communication system, the method comprising:
  transmitting, to a first UE, a first message including a first sidelink radio bearer (SLRB) configuration; and
  receiving, from the first UE, a second message including second information on a radio link control (RLC) mode based on a second SLRB configuration included in a radio resource control (RRC) reconfiguration message transmitted from a base station to the first UE,
  wherein sidelink UE information including first information on the RLC mode included in the first SLRB configuration is transmitted from the first UE to the base station,
  wherein the second SLRB configuration includes the second information on the RLC mode based on the first information, and
  wherein the sidelink UE information is used for reporting the first information on the RLC mode received from the second UE for a unicast communication.

5. The method of claim 4,
  wherein the sidelink UE information includes at least one of a flow identity, a destination identity, or information on a quality of service (QOS).

6. The method of claim 4,
  wherein the RLC mode is associated with a logical channel of a data radio bearer (DRB), and
  wherein the first SLRB configuration is associated with a bi-directional SLRB configuration.

7. A method performed by a base station in a wireless communication system, the method comprising:
  receiving, from a first user equipment (UE) which received a first message including a first sidelink radio bearer (SLRB) configuration from a second UE, sidelink UE information including first information on a radio link control (RLC) mode that is included in the first SLRB configuration; and
  transmitting, to the first UE, a radio resource control (RRC) reconfiguration message including a second SLRB configuration, the second SLRB configuration including second information on the RLC mode based on the first information,
  wherein a second message including the second information on the RLC mode is transmitted to the second UE based on the second SLRB configuration, and
  wherein the sidelink UE information is used for reporting the first information on the RLC mode received from the second UE for a unicast communication.

8. The method of claim 7,
  wherein the sidelink UE information includes at least one of a flow identity, a destination identity, or information on a quality of service (QOS).

9. The method of claim 7,
  wherein the RLC mode is associated with a logical channel of a data radio bearer (DRB), and
  wherein the first SLRB configuration is associated with a bi-directional SLRB configuration.

10. A first user equipment (UE) in a wireless communication system, the first UE comprising:
  a transceiver; and
  a controller configured to:
    receive, from a second UE, a first message including a first sidelink radio bearer (SLRB) configuration,
    transmit, to a base station, sidelink UE information including first information on a radio link control (RLC) mode included in the first SLRB configuration,
    receive, from the base station, a radio resource control (RRC) reconfiguration message including a second SLRB configuration, the second SLRB configuration including second information on the RLC mode based on the first information, and
    transmit, to the second UE, a second message including the second information on the RLC mode based on the second SLRB configuration,
  wherein the sidelink UE information is used for reporting the first information on the RLC mode received from the second UE for a unicast communication.

11. The first UE of claim 10, wherein the sidelink UE information includes at least one of a flow identity, a destination identity, or information on a quality of service (QOS).

12. The first UE of claim 10,
  wherein the RLC mode is associated with a logical channel of a data radio bearer (DRB), and
  wherein the first SLRB configuration is associated with a bi-directional SLRB configuration.

13. A second user equipment (UE) in a wireless communication system, the second UE comprising:
  a transceiver; and
  a controller configured to:
    transmit, to a first UE, a first message including a first sidelink radio bearer (SLRB) configuration, and
    receive, from the first UE, a second message including second information on a radio link control (RLC) mode based on a second SLRB configuration included in a radio resource control (RRC) reconfiguration message transmitted from a base station to the first UE,
  wherein sidelink UE information including first information on the RLC mode included in the first SLRB configuration is transmitted from the first UE to the base station,
  wherein the second SLRB configuration includes the second information on the RLC mode based on the first information, and
  wherein the sidelink UE information is used for reporting the first information on the RLC mode received from the second UE for a unicast communication.

14. The second UE of claim 13,
  wherein the sidelink UE information includes at least one of a flow identity, a destination identity, or information on a quality of service (QOS).

15. The second UE of claim 13,
  wherein the RLC mode is associated with a logical channel of a data radio bearer (DRB), and
  wherein the first SLRB configuration is associated with a bi-directional SLRB configuration.

16. A base station in a wireless communication system, the base station comprising:
  a transceiver; and
  a controller configured to:
    receive, from a first user equipment (UE) which received a first message including a first sidelink radio bearer (SLRB) configuration from a second UE, sidelink UE information including first information on a radio link control (RLC) mode that is included in the first SLRB configuration, and
    transmit, to the first UE, a radio resource control (RRC) reconfiguration message including a second SLRB configuration, the second SLRB configuration including second information on the RLC mode based on the first information, wherein a second message including the second information on the RLC mode is transmitted to the second UE based on the second SLRB configuration, and wherein the sidelink UE information is used for reporting the first information on the RLC mode received from the second UE for a unicast communication.

17. The second UE of claim 16, wherein the sidelink UE information includes at least one of a flow identity, a destination identity, or information on a quality of service (QOS).

18. The second UE of claim 16, wherein the RLC mode is associated with a logical channel of a data radio bearer (DRB), and wherein the first SLRB configuration is associated with a bi-directional SLRB configuration.

* * * * *